(12) United States Patent
Merg et al.

(10) Patent No.: US 12,259,699 B2
(45) Date of Patent: *Mar. 25, 2025

(54) METHOD AND SYSTEM FOR TEST DRIVING MOBILE MACHINE

(71) Applicant: Snap-on Incorporated, Kenosha, WI (US)

(72) Inventors: Patrick S. Merg, Hollister, CA (US); Roy S. Brozovich, Campbell, CA (US); Jacob G. Foreman, Hollister, CA (US); Kahlil H. Cacabelos, San Jose, CA (US); Joseph R. Grammatico, San Jose, CA (US); Brett A. Kelley, San Jose, CA (US); Joshua C. Covington, San Juan Bautista, CA (US)

(73) Assignee: Snap-on Incorporated, Kenosha, WI (US)

( * ) Notice: Subject to any disclaimer, the term of this patent is extended or adjusted under 35 U.S.C. 154(b) by 183 days.

This patent is subject to a terminal disclaimer.

(21) Appl. No.: 18/048,107

(22) Filed: Oct. 20, 2022

(65) Prior Publication Data

US 2023/0063781 A1    Mar. 2, 2023

Related U.S. Application Data

(63) Continuation of application No. 16/785,585, filed on Feb. 8, 2020, now Pat. No. 11,520,303.

(51) Int. Cl.
*G05B 19/042*    (2006.01)
*G07C 5/00*    (2006.01)
*G07C 5/08*    (2006.01)

(52) U.S. Cl.
CPC .......... *G05B 19/042* (2013.01); *G07C 5/008* (2013.01); *G07C 5/085* (2013.01); *G05B 2219/2637* (2013.01)

(58) Field of Classification Search
None
See application file for complete search history.

(56) References Cited

U.S. PATENT DOCUMENTS

| | | |
|---|---|---|
| 6,640,166 B2 | 10/2003 | Liebl et al. |
| 8,370,016 B2 | 2/2013 | Webster et al. |

(Continued)

FOREIGN PATENT DOCUMENTS

| | | |
|---|---|---|
| CN | 105365708 A | 3/2016 |
| CN | 107278317 A | 10/2017 |

(Continued)

OTHER PUBLICATIONS

Mitchell Repair Information Company, LLC; Prodemand, Confirmation driving pattern for catalyst efficiency monitor of 2014 Toyota Camry 2.5L Eng VIN D Hybrid LE, print date Jan. 17, 2018.

(Continued)

*Primary Examiner* — Abdhesh K Jha
(74) *Attorney, Agent, or Firm* — McDonnell Boehnen Hulbert & Berghoff LLP

(57) ABSTRACT

A method includes determining a test drive script (TDS) to perform while a tool monitors an electronic system in a mobile machine during a test drive of the mobile machine. The TDS includes an ordered sequence of drive cycle procedures (DCPs). The ordered sequence of DCPs begins with an initial DCP and ends with a final DCP. Each DCP is indicative of a respective mobile machine state. The TDS includes a first particular DCP associated with both a first particular mobile machine state and a first condition pertaining to the first particular mobile machine state. The method also includes outputting a representation of at least a portion of the TDS. Additionally, the method includes determining and outputting one or more of: status information corresponding to achieving the first particular mobile machine state or status information corresponding to achiev- (Continued)

ing the first condition pertaining to the first particular mobile machine state.

20 Claims, 33 Drawing Sheets

(56) References Cited

U.S. PATENT DOCUMENTS

| | | |
|---|---|---|
| 11,203,372 B2 | 12/2021 | Aerts et al. |
| 2007/0088472 A1 | 4/2007 | Ganzhorn, Jr. et al. |
| 2016/0050315 A1 | 2/2016 | Malhotra et al. |
| 2016/0124605 A1 | 5/2016 | Covington et al. |
| 2016/0247331 A1 | 8/2016 | Cacabelos et al. |
| 2017/0132576 A1 | 5/2017 | Merg et al. |
| 2017/0169629 A1 | 6/2017 | Sugihara |
| 2018/0247469 A1 | 8/2018 | Cacabelos et al. |
| 2018/0349975 A1 | 12/2018 | Lee |
| 2019/0171187 A1 | 6/2019 | Cella et al. |
| 2020/0134933 A1 | 4/2020 | Covington et al. |
| 2020/0134934 A1 | 4/2020 | Covington et al. |
| 2020/0168009 A1 | 5/2020 | Jingle et al. |
| 2020/0257304 A1 | 8/2020 | Moshchuk et al. |
| 2021/0133290 A1 | 5/2021 | Makke et al. |
| 2021/0247729 A1 | 8/2021 | Merg et al. |
| 2022/0001454 A1 | 1/2022 | Greenwald et al. |

FOREIGN PATENT DOCUMENTS

| | | |
|---|---|---|
| CN | 108351997 A | 7/2018 |
| CN | 110568835 A | 12/2019 |
| EP | 2866230 A1 | 4/2015 |
| EP | 2990774 A1 | 3/2016 |
| GB | 2521377 A | 6/2015 |
| JP | 2020142642 A | 9/2020 |

OTHER PUBLICATIONS

Mitchell Repair Information Company, LLC; Prodemand, Confirmation driving pattern for EGRDriveCycle on 2014 Toyota Camry 2.5L Eng VIN D Hybrid LE, (graph shows 75 km/h (47mph) [Engine Running] on vertical axis), print date Jan. 17, 2018.
Mitchell Repair Information Company, LLC; Prodemand, Confirmation driving pattern for key-off monitor confirmation and purge flow monitor confirmation of 2014 Toyota Camry 2.5L Eng VIN D Hybrid LE, print date Jan. 17, 2018.
The OBD II Home Page, Ford Motor Company Driving Cycle, archived on the world wide web at https://web.archive.org/web/20110714135728/http://www.obdii.com/drivecycleford.html on Jul. 14, 2011.
The OBD II Home Page, General Motors Driving Cycle, archived on the world wide web at https://web.archive.org/web/20110714223703/http://www.obdii.com/drivecycle.html on Jul. 14, 2011.
NYVIP2 Opus Inspection, OBD II Readiness Monitors; downloaded from the world wide web at https://www.nyvip.org/PublicSite/OBDII/helping-set-monitors.html on Apr. 20, 2018.
Ohio Environmental Protection Agency, On Board Diagnostic (OBD) Readiness and Drive Cycle Information; Sep. 9, 2019.
New York Vehicle Inspection Program (NYVIP); Readiness Failure Fact Sheet, Are your ready for diagnostic monitors?; Jul. 18, 2011.
Bosch Automotive Service Solutions Inc.; Ready Scan Readiness Monitor Tool, SKU 3358; 2018.
Gaffary, Yoren et al.; Frontiers in ICT; The Use of Haptic and Tactile Information in the Car to Improve Driving Safety: A Review of Current Technologies, Review, Published Mar. 26, 2018.
2011 Powertrain Control/Emissions Diagnosis, Section 2, Diagnostic Methods, downloaded from the world wide web at http://juchems.com/ServiceManuals/viewfileb892.pdf, Aug. 2010.
Mitchell Repair Information Company, LLC; Prodemand, Confirmation driving pattern for VVT Drive Cycle on 2014 Toyota Camry 2.5L Eng VIN D Hybrid LE, (graphs shows vehicle speed on vertical axis), print date Jan. 17, 2018.
International Searching Authority of World Intellectual Property Office; Notification of transmittal of the international search report and the written opinion of the International Searching Authority or the Declaration, International Search Report, and Written Opinion of the International Searching Authority for International Application No. PCT/US2020/060105 mailed Feb. 3, 2021.
OTC; A Drive Cycle is Required after any Emissions Related Repair, 33558PRO Diagnostics, downloaded from the world wide web at https://www.otctools.com/sites/default/files/16-30_3358pro_otc_ready_scan.pdf; Nov. 6, 2018; 1 page.
Blue Star Inspections Inc.; Don't Be Deceived—OBD Readiness Monitors Status; Jan. 15, 2018; 4 pages.
Creosys Ltd; OBD2 Car Diagnostics Blog, OBD2 Readiness monitors Explained, Jan. 14, 2014, 12 pages.
OSCH Automotive Service Solutions Inc.; OBD1150 Info Scan, User guide, Rev. B, Mar. 2016; 42 pages.
Just Smogs and Repair, OBD II Monitor Drive Cycle Service; downloaded from the world wide web at http://justsmogs.com/2016/12/obd-ii-monitor-drive-cycle-service/; dated Dec. 13, 2016, 5 pages.
Unity Technologies; Manual, Scripting API, version Mar. 2018; downloaded from the world wide web at https://docs.unity3d.com/2018.3/Documentation/ScriptReference/GUI.Box.html; Mar. 2018; 5 pages.
OBD Auto Doctor: Tutorial, OBD2 Readiness monitors Explained, Learn everything about Readiness Monitors; downloaded from the world wide web at https://www.obdautodoctor.com/tutorials/obd-readiness-monitors-explained/; Mar. 2020.
Just Smogs and Repair, OBD II Montior Drive Cycle Service; downloaded from the world wide web at http://justsmogs.com/2016/12/obd-ii-monitor-drive-cycle-service/; dated Dec. 13, 2016, 5 pages.
Unity Technologies; Manual, Scripting API, version Mar. 2018; downloaded from the world wide web at https://docs.unity3d.com/2018.3/Documentation/ScriptReference/gGUI.Box.hmtl; Mar. 2018; 5 pages.
Auto Techcelerators, LLC; Test Drive CoPilot; downloaded from the World Wide Web at https://www.testdrivecopilot.com/ on Sep. 17, 2020.
Auto Techcelerators, LLC; Test Drive CoPilot Features list; downloaded from the World Wide Web at https://www.testdrivecopilot.com/features on Sep. 17, 2020.
Auto Techcelerators, LLC; Test Drive CoPilot Features list; downloaded from the World Wide Web at https://www.testdrivecopilot.com/FAQ on Sep. 17, 2020.
Auto Techcelerators, LLC; Test Drive CoPilot Features list; downloaded from the World Wide Web at https://s3.amazonaws.com/kajabi-storefronts-production/sites/65478/themes/1499168/downloads/mO4kAZQkXUpMth48igw_Test_Drive_Report_124546.pdf on Sep. 17, 2020.
Australian Patent Office; Examination Report for related Australian patent application No. 2020427556, dated Aug. 1, 2023, 3 pages.
Australian Patent Office; Notice of Acceptance for related Australian patent application No. 2020427556, dated Nov. 1, 2023, 3 pages.
Canadian Intellectual Property Office; Examination Report for related Canadian application No. 3,170,148, dated Mar. 7, 2024, 5 pages.
PRC National Intellectual Property Administration; Notice of Completing Formalities for Patent Registration in connection with related Chinese patent application No. 2020800991544; dated Dec. 23, 2024, 8 pages.
PRC National Intellectual Property Administration; Office Action for related Chinese patent application No. 2020800991544; dated Aug. 30, 2024; 13 pages.
European Patent Office; Communication pursuant to Article 94(3) EPC for related European patent application No. 208206466; dated Apr. 22, 2024, 3 pages.

| DCP | Test Drive Script (TDS) Instruction | Timer | PID | Monitor ID |
|---|---|---|---|---|
| 1 | Cold start with engine coolant temperature below 50°C (122°F) and within 6°C (11°F) of ambient air temperature when starting vehicle. <u>161</u> | 0:00 <u>175</u> | 61, 77, 78, 79 <u>311</u> | 25, 27, 30, 33, 34 <u>309</u> |
| 2 | Cruise at 64 Km/h (40 MPH) up to 4 minutes. <u>163</u> | 4:00 <u>177</u> | 64, 66, 68, 69, 70, 71, 76 | 25, 27, 30, 33 <u>315</u> |
| 3 | Cruise at 72 to 104 Km/h (45 to 65 MPH) for 10 minutes (avoid sharp turns and hills) Note, to initiate the monitor: TP MODE should = PT.EVAPDC must be 75>%, and FLI must be between 15 and 85%. <u>165</u> | 10:00 <u>179</u> | 64, 66, 67, 68, 69, 70, 71, 76 <u>317</u> | 25, 30, 33 <u>313</u> <u>319</u> |
| 4 | Decelerate by removing foot from accelerator pedal or turn <u>167</u> cruise control off. Do not manually shift transmission. Do not apply brake. Allow vehicle to slow down to 32 Km/h (20 MPH). | 2:00 <u>181</u> | 64, 68, 69, 70, 71, 72, 73 74, 75 | 26, 32, 35, 36, 37 |
| 5 | Accelerate at 75% throttle until cruising at 72 to 104 Km/h (45 to 65 MPH) for 3 minutes. <u>169</u> | 3:00 <u>183</u> | 64, 73, 74, 75, 79 | 32, 35, 36, 37 |
| 6 | Cruise at 64 Km/h (55 MPH) for 5 minutes. <u>171</u> | 5:00 | 64, 76 | 33 |
| 7 | Decelerate by removing foot from accelerator pedal or turn <u>173</u> cruise control off. Do not manually shift transmission. Do not apply brake. Allow vehicle to slow down to 32 Km/h (20 MPH). | 2:00 <u>187</u> | 64, 68, 69, 70, 71, 72, 73 74, 75 | 26, 30, 32, 35, 36 |

FIG. 8

186 → | Vehicle Type: A | ← 180

| PID | Parameter Name | PPI |
|---|---|---|
| 61 | Engine Coolant Temperature (ECT) Sensor | 111 |
| 62 | Intake Ambient Air Temperature Sensor 1 (1AT) | 113 |
| 63 | Intake Ambient Air Temperature Sensor 2 (1AT) | 115 |
| 64 | Vehicle Speed | 117 |
| 65 | Engine Load | 119 |
| 66 | Fuel Level Indicator (FLI) | 121 |
| 67 | Evaporator Emissions Purge Valve Duty Cycle (EVAPDC) | 123 |
| 68 | Oxygen sensor 1 - bank 1 | 125 |
| 69 | Oxygen sensor 2 - bank 1 | 127 |
| 70 | Oxygen sensor 1 - bank 2 | 129 |
| 71 | Oxygen sensor 1 - bank 2 | 131 |
| 72 | Exhaust Gas Recirculation (EGR) | 133 |
| 73 | Purge Flow | 135 |
| 74 | Misfire | 137 |
| 75 | Fuel Trim | 139 |
| 76 | Catalyst Monitor | 141 |
| 77 | Engine Speed | 143 |
| 78 | Ambient Air Temperature (AAT) | 145 |
| 79 | Throttle Position Sensor (TPS) | 147 |
| 80 | Mass Air Flow Sensor - Mass Flow | 149 |
| 81 | Mass Air Flow Sensor - Frequency | 151 |
| 82 | Mass Air Flow Sensor - Voltage | 153 |

FIG. 9

| Vehicle Type: A | | |
|---|---|---|
| Monitor ID | Monitor Name | RMI |
| 25 | Fuel System | 83 |
| 26 | Exhaust Gas Recirculation (EGR) | 85 |
| 27 | Oxygen (O2) Sensor Heater | 87 |
| 28 | CCM (Engine) | 89 |
| 29 | CCM (Transmission) | 91 |
| 30 | Oxygen (O2) Sensor | 93 |
| 31 | EVAP Monitor Bypass | 95 |
| 32 | Misfire and Deceleration Fuel Shut Off | 97 |
| 33 | Catalyst | 99 |
| 34 | Heated Catalyst | 101 |
| 35 | Fuel Trim | 103 |
| 36 | Misfire | 105 |
| 37 | Purge Flow | 107 |
| 38 | Components | 109 |

FIG. 10

| TDS | Vehicle | System | Component | Code |
|---|---|---|---|---|
| 41 | A | Engine | O2 sensor - Bank 1 | P0171 |
| 42 | A | Engine | MAF sensor | P0172 |
| 43 | A | Engine | ECT sensor | P0212 |
| 44 | B | Engine | O2 sensor | P0171 |
| 45 | B | Engine | EGR valve | P0228 |
| 46 | B | Engine | IAT sensor | P0311 |
| 41 | C | Engine | O2 sensor | P0171 |
| 42 | C | Engine | MAF sensor | P0172 |
| 43 | C | Engine | ECT sensor | P0215 |
| 52 | A | Engine | All | Any or none |
| 54 | B | Engine | All | Any or none |
| 56 | C | Engine | All | Any or none |

| DCP | Status | PID - Para. | M/P | M/F |
|---|---|---|---|---|
| 1 | Not started | None | None | None |
| 2 | Not started | None | None | None |
| 3 | Not started | None | None | None |
| 4 | Not started | None | None | None |
| 5 | Not started | None | None | None |
| 6 | Not started | None | None | None |
| 7 | Not started | None | None | None |

| DCP | Status | PID - Para. | M/P | M/F |
|---|---|---|---|---|
| 1 | On-going | 61 - 0<br>77 - 78<br>78 - 78<br>79 - 0 | None | None |
| 2 | Not started | None | None | None |
| 3 | Not started | None | None | None |
| 4 | Not started | None | None | None |
| 5 | Not started | None | None | None |
| 6 | Not started | None | None | None |
| 7 | Not started | None | None | None |

| DCP | Status | PID - Para. | M/P | M/F |
|---|---|---|---|---|
| 1 | Comp. | 61 - 0<br>77 - 78<br>78 - 78<br>79 - 0 | 34 | None |
| 2 | On-going | 64 - 64<br>66 - 95<br>68 - 1.8<br>69 - 3.2<br>70 - 0.8<br>71 - 4.7<br>76- 366 | None | 25<br>27<br>30<br>33 |
| 3 | Not started | None | None | None |
| 4 | Not started | None | None | None |
| 5 | Not started | None | None | None |
| 6 | Not started | None | None | None |
| 7 | Not started | None | None | None |

| DCP | Status | PID - Para. | M/P | M/F |
|---|---|---|---|---|
| 1 | Comp. | 61 - 0<br>77 - 78<br>78 - 78<br>79 - 0 | 34 | None |
| 2 | Comp. | 64 - 64<br>66 - 95<br>68 - 1.8<br>69 - 3.2<br>70 - 0.8<br>71 - 4.7<br>76 - 366 | 27 | 25<br>27<br>30<br>33 |
| 3 | On-going | 64 - 45<br>66 - 93<br>67 - 38<br>68 - 1.7<br>69 - 3.2<br>70 - 2.2<br>71 - 4.0<br>76 - 417 | None | 25<br>30<br>33 |
| 4 | Not started | None | None | None |
| 5 | Not started | None | None | None |
| 6 | Not started | None | None | None |
| 7 | Not started | None | None | None |

SYMPTOM 1 (P0171): PID: 61, 64, 66, 67, 68, 69, 70, 71, 72, ← 551
73, 74, 75, 76, 77, 78, 79
SYMPTOM 2 (P0173, P0174): PID: 66, 69, 74
SYMPTOM 3 (FOULED SPARK PLUG): PID: 72 75
SYMPTOM 4 (P0174): PID: 62, 79

SYMPTOM 1 (P0171): CT1, CT4 ← 553
SYMPTOM 2 (P0171, P0174): CT1, CT4
SYMPTOM 3 (FOULED SPARK PLUG): NULL
SYMPTOM 4 (P0174): CT1, CT4

SYMPTOM 1 (P0171): FT1, FT2, FT3, FT4 ← 555
SYMPTOM 2 (P0171, P0174): FT5, FT6, FT7, FT8
SYMPTOM 3 (FOULED SPARK PLUG): FT5, FT6, FT7, FT8
SYMPTOM 4 (P0174): FT5, FT6, FT7, FT8

SYMPTOM 1 (P0171): RP5 ← 557
SYMPTOM 2 (P0171, P0174): RP5
SYMPTOM 3 (FOULED SPARK PLUG): NULL
SYMPTOM 4 (P0174): RP5
SYMPTOM 5 (THEFT DETERRENT – NO START): RP2, RP3

COMPONENT TEST 1: 601 – FREQUENCY TEST
COMPONENT TEST 2: 603 – SIGNATURE TEST
COMPONENT TEST 3: 605 – OUT OF RANGE NO SIGNAL TEST
COMPONENT TEST 4: 607 – VOLTAGE TEST
COMPONENT TEST 5: 609 – CURRENT TEST
COMPONENT TEST 6: 611 – RESISTANCE TEST
COMPONENT TEST 7: 613 – CAPACITANCE TEST
COMPONENT TEST 8: 615 – TEMPERATURE TEST
COMPONENT TEST 9: 617 – PRESSURE TEST
COMPONENT TEST 10: 619 – TAIL PIPE EMISSION TEST
COMPONENT TEST 11: 621 – CONTINUITY TEST
COMPONENT TEST 12: 623 – RESERVED
COMPONENT TEST 13: 625 – RESERVED
COMPONENT TEST 14: 627 – RESERVED
COMPONENT TEST 15: 629 – RESERVED
COMPONENT TEST 16: 631 – RESERVED       ← 570 FIG. 37

COMPONENT 1 (EGR VALVE): PID13, PID14, PID24  ─552
COMPONENT 2 (FUEL TANK): PID6, PID15, PID17
COMPONENT 3 (THERMOSTAT): PID3, PID27
COMPONENT 4 (VEHICLE SPEED SENSOR): PID9

COMPONENT 1 (EGR VALVE): CT1, CT4  ─554
COMPONENT 2 (FUEL TANK): CT1, CT4, CT5
COMPONENT 3 (THERMOSTAT): CT5, CT8, CT11
COMPONENT 4 (VEHICLE SPEED SENSOR): CT1, CT4
COMPONENT 5 (CATALYTIC CONVERTER): CT10

COMPONENT 1 (EGR VALVE): FT13, FT14  ─556
COMPONENT 2 (FUEL TANK): NULL
COMPONENT 3 (THERMOSTAT): FT3, FT4
COMPONENT 4 (VEHICLE SPEED SENSOR): NULL
COMPONENT 5 (CATALYTIC CONVERTER): NULL
COMPONENT 6 (FUEL PUMP): FT1

COMPONENT 1 (EGR VALVE): NULL  ─558
COMPONENT 2 (FUEL TANK): NULL
COMPONENT 3 (THERMOSTAT): NULL
COMPONENT 4 (VEHICLE SPEED SENSOR): NULL
COMPONENT 5 (CATALYTIC CONVERTER): NULL
COMPONENT 6 (FUEL PUMP): NULL
COMPONENT 7 (THEFT DETERRENT): RP2, RP3
COMPONENT 8 (ENGINE CONTROL ECU): RP5, RP10

FUNCTIONAL TEST 1: 635 – FUEL PUMP ENGAGEMENT
FUNCTIONAL TEST 2: 637 – CLOSE EVAPORATOR CANISTER VENT VALVE
FUNCTIONAL TEST 3: 639 – ENGINE COOLING FAN HIGH
FUNCTIONAL TEST 4: 641 – ENGINE COOLING FAN LOW
FUNCTIONAL TEST 5: 643 – FUEL INJECTOR #1 ON
FUNCTIONAL TEST 6: 645 – FUEL INJECTOR #2 ON
FUNCTIONAL TEST 7: 647 – FUEL INJECTOR #3 ON
FUNCTIONAL TEST 8: 649 – FUEL INJECTOR #4 ON
FUNCTIONAL TEST 9: 651 – FUEL INJECTOR #5 ON
FUNCTIONAL TEST 10: 653 – FUEL INJECTOR #6 ON
FUNCTIONAL TEST 11: 655 – FUEL INJECTOR #7 ON
FUNCTIONAL TEST 12: 657 – FUEL INJECTOR #8 ON
FUNCTIONAL TEST 13: 659 – EGR VALVE OPEN
FUNCTIONAL TEST 14: 661 – EGR VALVE CLOSED
FUNCTIONAL TEST 15: 663 – RESERVED
FUNCTIONAL TEST 16: 665 – RESERVED

RESET PROCEDURE 1: 671 – OIL CHANGE INTERVAL RESET
RESET PROCEDURE 2: 673 – VEHICLE THEFT DETERRENT RESET
RESET PROCEDURE 3: 675 – IGNITION KEY IDENTIFIER RESET
RESET PROCEDURE 4: 677 – VIN LEARN RESET
RESET PROCEDURE 5: 679 – CALIBRATE ENGINE CONTROL ECU
RESET PROCEDURE 6: 681 – CALIBRATE ANTI-LOCK BRAKE ECU
RESET PROCEDURE 7: 683 – CALIBRATE TRACTION CONTROL ECU
RESET PROCEDURE 8: 685 – CALIBRATE AIRBAG SYSTEM ECU
RESET PROCEDURE 9: 687 – CALIBRATE POWERTRAIN CONTROL ECU
RESET PROCEDURE 10: 689 – CLEAR ENGINE CONTROL ECU DTC
RESET PROCEDURE 11: 691 – CLEAR ANTI-LOCK BRAKE ECU DTC
RESET PROCEDURE 12: 693 - CLEAR TRACTION CONTROL ECU DTC
RESET PROCEDURE 13: 695 - CLEAR AIRBAG SYSTEM ECU DTC
RESET PROCEDURE 14: 697 - CLEAR POWERTRAIN CONTROL ECU DTC
RESET PROCEDURE 15: 699 – RESERVED
RESET PROCEDURE 16: 701 – RESERVED

METHOD AND SYSTEM FOR TEST DRIVING MOBILE MACHINE

REFERENCE TO RELATED APPLICATION

This application is a continuation application of U.S. patent application Ser. No. 16/785,585, which was filed on Feb. 8, 2020 and was published as U.S. Patent Application Publication No. 2021/0247729 A1 on Aug. 12, 2021. U.S. patent application Ser. No. 16/785,585 and U.S. Patent Application Publication No. 2021/0247729 A1 are incorporated herein by reference.

BACKGROUND

Due to an increasing average number of components and systems in a mobile machine being computer-controlled, the skill and knowledge required to service the mobile machine has also increased. In at least some mobile machines, the computers that control the components and systems are electronic control units (ECUs). Moreover, for at least some types of repairs made to a mobile machine, a technician that repaired the mobile machine will typically test drive the mobile machine after completing the repairs to ensure that the repairs were made correctly. For example, after replacing brake pads on a mobile machine that was brought to a repair shop with a complaint of brakes making grinding sound, the technician that replaced the brake pads will typically drive the mobile machine and apply the brakes one or more times to make sure the brakes are not making the grinding sound. That type of test drive typically does not require use of a tool. In contrast, however, after repairing a computer-controlled component or system or an ECU within a mobile machine, a technician may feel compelled to bring with him/her during the test drive, a tool that communicates with the ECU. Due to the complexity of ECU controlled systems in a mobile machine, it would be beneficial if the tool used during the test drive would provide the technician with drive cycle procedures so that the technician can control the mobile machine in an efficient manner to insure the mobile machine was properly repaired.

Overview

In a first implementation, a method is provided. The method includes determining, by one or more processors, a test drive script to perform while a tool monitors an electronic system in a mobile machine during a test drive of the mobile machine. The test drive script includes an ordered sequence of drive cycle procedures. The ordered sequence of drive cycle procedures begins with an initial drive cycle procedure and ends with a final drive cycle procedure. Each drive cycle procedure is indicative of a respective mobile machine state. The test drive script includes a first particular drive cycle procedure associated with both a first particular mobile machine state and a first condition pertaining to the first particular mobile machine state. The method also includes outputting, by the one or more processors, a representation of at least a portion of the test drive script. Additionally, the method includes determining, by the one or more processors, one or more of: status information corresponding to achieving the first particular mobile machine state or status information corresponding to achieving the first condition pertaining to the first particular mobile machine state. Furthermore, the method includes outputting, by the one or more processors, one or more of: the status information corresponding to achieving the first particular mobile machine state or the status information corresponding to achieving the first condition pertaining to the first particular mobile machine state.

In a second implementation, a computing system is provided. The computing system includes one or more processors and computer readable data storage storing executable instructions. Execution of the executable instructions by the one or more processors causes computing system to perform functions. The functions comprise determining a test drive script to perform while a tool monitors an electronic system in a mobile machine during a test drive of the mobile machine. The test drive script includes an ordered sequence of drive cycle procedures. The ordered sequence of drive cycle procedures begins with an initial drive cycle procedure and ends with a final drive cycle procedure. Each drive cycle procedure is indicative of a respective mobile machine state. The test drive script includes a first particular drive cycle procedure associated with both a first particular mobile machine state and a first condition pertaining to the first particular mobile machine state. The functions also include outputting a representation of at least a portion of the test drive script. In addition, the functions include determining one or more of: status information corresponding to achieving the first particular mobile machine state or status information corresponding to achieving the first condition pertaining to the first particular mobile machine state. Also, the functions include outputting one or more of: the status information corresponding to achieving the first particular mobile machine state or the status information corresponding to achieving the first condition pertaining to the first particular mobile machine state.

In a third implementation, a computer-readable medium is provided. The computer readable medium has stored therein instructions executable by one or more processors to cause a computing system to perform functions. The functions include determining a test drive script to perform while a tool monitors an electronic system in a mobile machine during a test drive of the mobile machine. The test drive script includes an ordered sequence of drive cycle procedures. The ordered sequence of drive cycle procedures begins with an initial drive cycle procedure and ends with a final drive cycle procedure. Each drive cycle procedure is indicative of a respective mobile machine state. The test drive script includes a first particular drive cycle procedure associated with both a first particular mobile machine state and a first condition pertaining to the first particular mobile machine state. The functions also include outputting a representation of at least a portion of the test drive script. Furthermore, the functions include determining one or more of: status information corresponding to achieving the first particular mobile machine state or status information corresponding to achieving the first condition pertaining to the first particular mobile machine state. Furthermore still, the functions include outputting one or more of: the status information corresponding to achieving the first particular mobile machine state or the status information corresponding to achieving the first condition pertaining to the first particular mobile machine state.

In a fourth implementation, a computing system is provided. The computing system includes means for determining a test drive script to perform while a tool monitors an electronic system in a mobile machine during a test drive of the mobile machine. The test drive script includes an ordered sequence of drive cycle procedures. The ordered sequence of drive cycle procedures begins with an initial drive cycle procedure and ends with a final drive cycle procedure. Each drive cycle procedure is indicative of a respective mobile machine state. Wherein the test drive script includes a first particular drive cycle procedure associated with both a first particular mobile machine state and a first condition pertaining to the first particular mobile machine state. The computing system also includes means for outputting a representation of at least a portion of the test drive script. In addition, the computing system includes means for determining one or more of: status information corresponding to achieving the first particular mobile machine state or status information corresponding to achieving the first condition pertaining to the first particular mobile machine state. Also the computing system includes means for outputting one or more of: the status information corresponding to achieving the first particular mobile machine state or the status information corresponding to achieving the first condition pertaining to the first particular mobile machine state.

Other implementations will become apparent to those of ordinary skill in the art by reading the following detailed description, with reference where appropriate to the accompanying drawings.

BRIEF DESCRIPTION OF THE DRAWINGS

Example implementations are described herein with reference to the drawings.

FIG. 8 shows a test drive script in accordance with one or more example implementations.

FIG. 9 shows a parameter identifier (PID) map in accordance with one or more example implementations.

FIG. 10 shows a monitor map in accordance with one or more example implementations.

FIG. 11 shows a test drive script map in accordance with one or more example implementations.

FIG. 12, FIG. 13, FIG. 14, and FIG. 15 show test drive status data in accordance with one or more example implementations.

FIG. 36 is a diagram showing mapping data in accordance with the example implementations.

FIG. 37 shows a component test index in accordance with the example implementations.

FIG. 39 is a diagram showing example mapping data in accordance with the example implementations.

FIG. 41 shows a functional test index in accordance with the example implementations.

FIG. 42 shows a reset procedure index in accordance with the example implementations.

All the figures are schematic, not necessarily to scale, and generally only show parts which are necessary to elucidate example embodiments, wherein other parts may be omitted or merely suggested.

DETAILED DESCRIPTION

I. Introduction

This description describes several example implementations, at least some which pertain to using a test drive script while test driving a mobile machine, or more simply, a vehicle. In particular, the description describes example implementations in which a processor determines the test drive script to perform while a tool monitors an electronic system in the mobile machine. The processor can output a representation of at least a portion of test drive script. For instance, the processor can display at least a portion of the test drive script and/or play at least a portion of the test drive script through a speaker. The processor can determine and output status information that corresponds to a particular operating state of the mobile machine being test driven. Likewise, the processor can determine and output status information that corresponds to a achieving a condition that pertains to the particular operating state of the mobile machine being test driven. The outputting of the foregoing status information can include information that that can guide the driver how to drive the mobile machine during the test drive. Such information may indicate that the driver should continue driving the mobile machine without any changes or that the driver should change how the mobile machine is being driven, such as increasing or decreasing a speed of the mobile machine.

II. Example Systems

Figure 1:
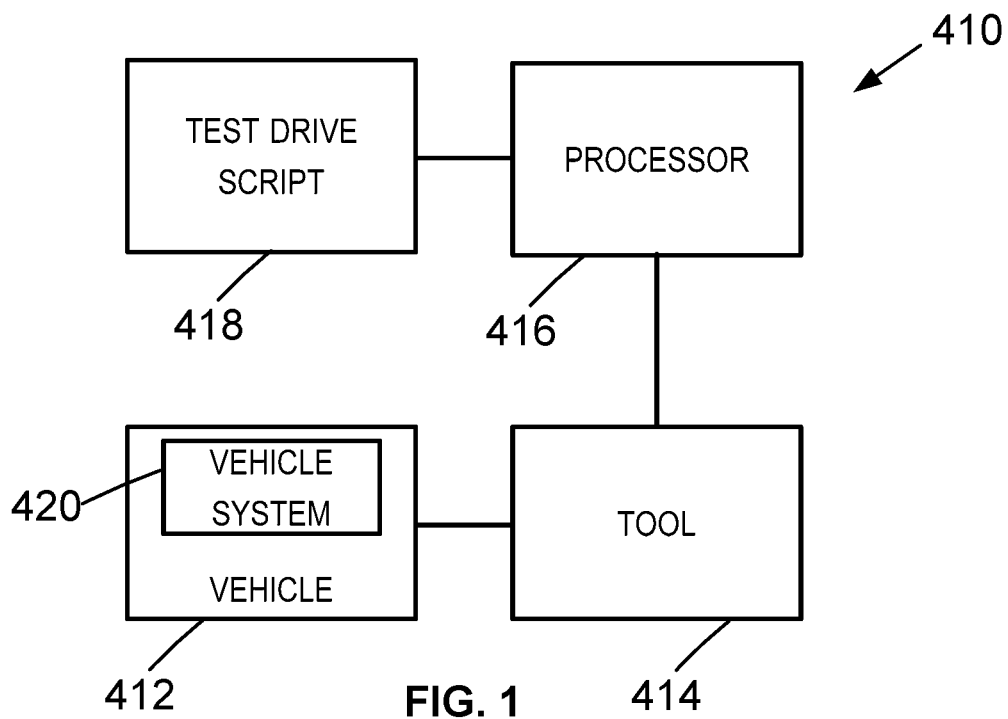
FIG. 1 is a block diagram of a system in accordance with one or more example implementations.

FIG. 1 is a block diagram of a system 410 including a vehicle 412, a tool 414, a processor 416, and a test drive script 418. The vehicle 412 includes a vehicle system 420. The test drive script 418 includes multiple drive cycle procedures. The processor 416 is configured to communicate with and/or within the tool 414. The processor 416 is also configured to access the test drive script 418 and to output the test drive script 418 to the tool 414 and/or to another component of the tool 414. The tool 414 is configured to communicate with the vehicle 412 electrically (i.e., using an electrical current and/or using electromagnetic waves). The tool 414 communicating with the vehicle 412 can include communicating with the vehicle system 420 and/or any component within the vehicle system 420. The tool 414 can determine and output status information that corresponds to a particular operating state of the vehicle 412 as the vehicle 412 is being test driven based on the drive cycle procedures of the test drive script 418. The tool 414 can also determine and output status information that corresponds to a achieving a condition that pertains to the particular operating state of the vehicle 412 during the test drive.

Figure 2:
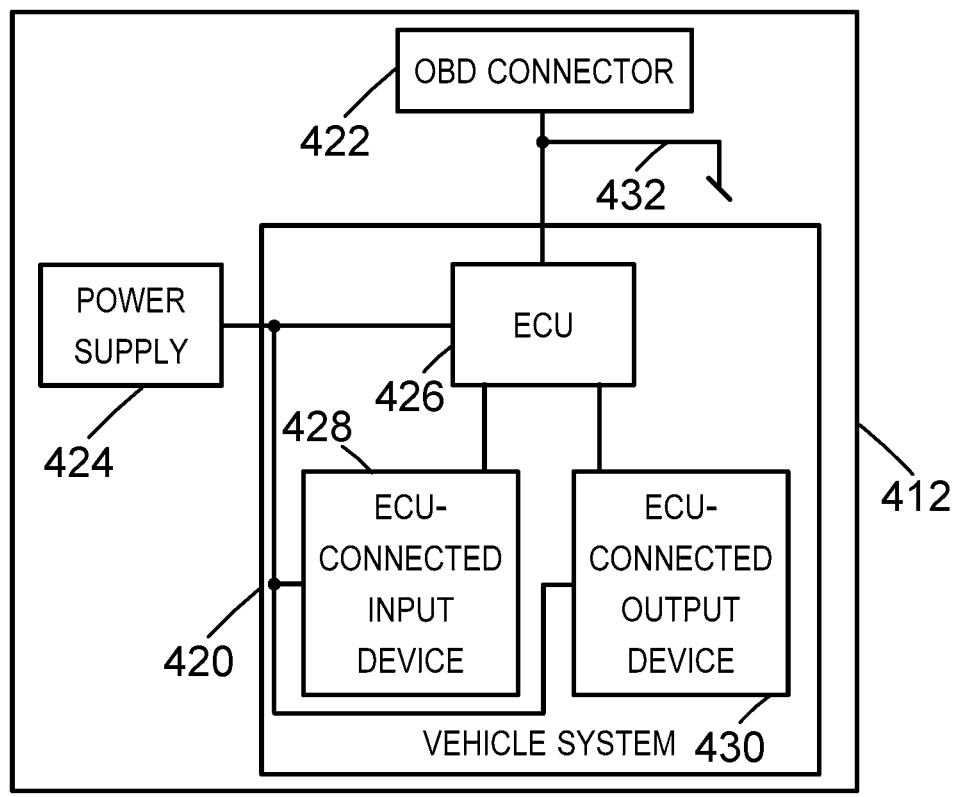
FIG. 2 shows details of a vehicle and a vehicle system shown in FIG. 1, in accordance with one or more example implementations.

Next, FIG. 2 is a block diagram showing example details of the vehicle 412 and example details of the vehicle system 420. As shown in FIG. 2, the vehicle 412 includes the vehicle system 420, an on-board diagnostics connector (OBDC) 422, a power supply 424, and a vehicle network 432. FIG. 2 also shows that the vehicle system 420 includes an electronic control unit (ECU) 426, an ECU-connected input device 428, and an ECU-connected output device 430. The power supply 424 can include a battery or a battery pack. The tool 414 is configured to be operatively coupled to the OBDC 422. The tool 414 is also configured to be operatively uncoupled from the OBDC 422 such that the tool 414 can be operatively coupled to an OBDC in another vehicle (not shown).

The ECU-connected input device 428 includes one or more input devices. As an example, the ECU-connected input device 428 includes a sensor, a relay, or a switch. The ECU-connected output device 430 includes one or more output devices. As an example, the ECU-connected output device 430 includes a pump, a motor, a solenoid, a valve, a relay, an injector, a horn, a light, a display, or an aural output device (e.g., speaker). Examples of vehicle data message (VDM) protocols used to communicate on the vehicle network 432 are listed in Section VI of this description. Examples of the ECU 426 are shown in FIG. 3 and examples of the vehicle system 420 are listed in Section VI of this description.

As another example, the ECU-connected output device 430 can include a haptic feedback component of the vehicle. In at least some implementations, the haptic feedback component of the vehicle includes a component typically in contact with an occupant of the vehicle during a test drive of the vehicle, such as a steering wheel, a seat belt, a seat, a dashboard, or a pedal, such as an accelerator pedal, a clutch pedal, or a brake pedal.

Figure 3:
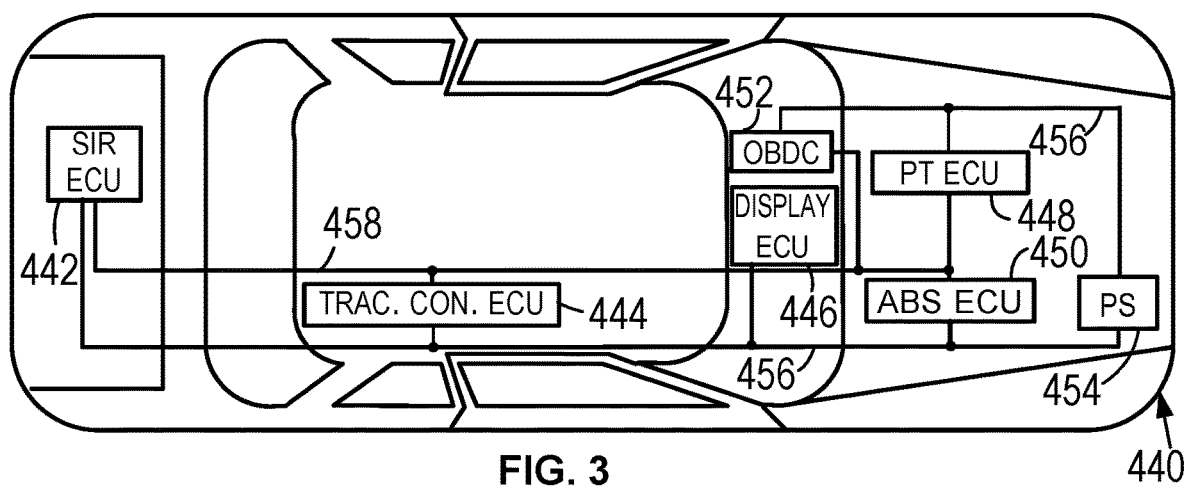
FIG. 3 and FIG. 4 show example vehicles.

Next, FIG. 3 shows a vehicle 440 in accordance with the example implementations. The vehicle 440 includes a supplemental inflatable restraint (SIR) system ECU 442, a traction control system ECU 444, a display ECU 446, a powertrain system ECU 448, an anti-lock brake system (ABS) ECU 450, and an OBDC 452, each of which is connected to both a power supply 454 using a power bus 456 and to a vehicle network 458. Other examples of an ECU within the vehicle 440 are also possible.

The display ECU 446 includes a display, such as a liquid crystal display (LCD). The display ECU 446 can, but need not necessarily, display audio system controls, heating, ventilation, and air conditioning (HVAC) controls, and/or navigation information, and/or other content as well or instead. Similar to the ECU 426 shown in FIG. 2, each ECU of the vehicle 440 can be connected to one or more ECU-connected input device 428 and one or more ECU-connected output device 430. The display ECU 446 can display at least a portion of a test drive script provided to it from the tool 100.

The OBDC 452 can be located within a passenger compartment of the vehicle 440, within a powertrain compartment (e.g., an engine compartment) of the vehicle 440, or within a storage compartment within the vehicle 440. Additional details regarding vehicles, ECUs, OBDCs, and vehicle communication buses are located within Section VI of this description. The vehicle 412, shown in FIG. 1 and in FIG. 2, can be arranged like the vehicle 440. The system 410 shown in FIG. 1 can include the vehicle 440 in place of the vehicle 412.

Figure 4:
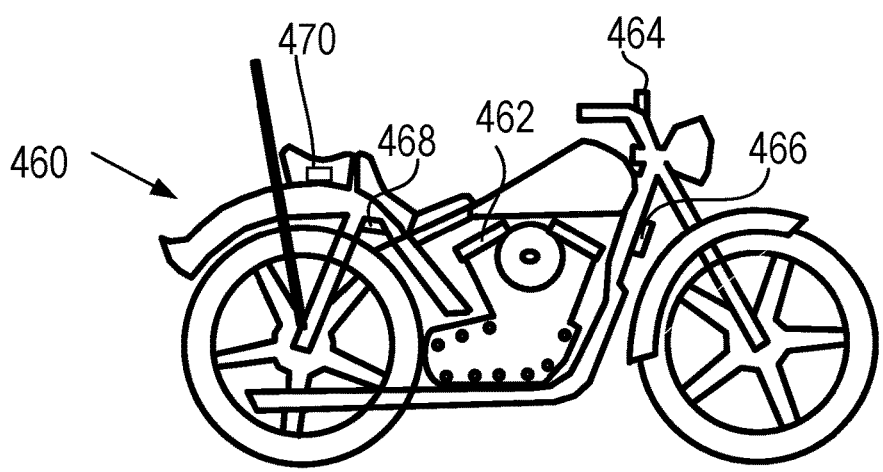

Next, FIG. 4 shows a vehicle 460 in accordance with the example implementations. The vehicle 460 can be arranged as a motorcycle that includes a fuel injection ECU 462, an instrument cluster ECU 464, an ABS ECU 466, an ignition ECU 468, and/or an OBDC 470. The ECUs on the vehicle 460 are connected to a power supply (not shown) and can be connected to the OBDC 470 via a vehicle network (not shown). Similar to the ECU 426 shown in FIG. 2, each ECU of the vehicle 460 can be connected to one or more ECU-connected input device 28 and one or more ECU-connected output device 430. The vehicle 412, shown in FIG. 1, can be arranged like the vehicle 460. The system 410 shown in FIG. 1 can include the vehicle 460 in place of the vehicle 412.

Figure 5:
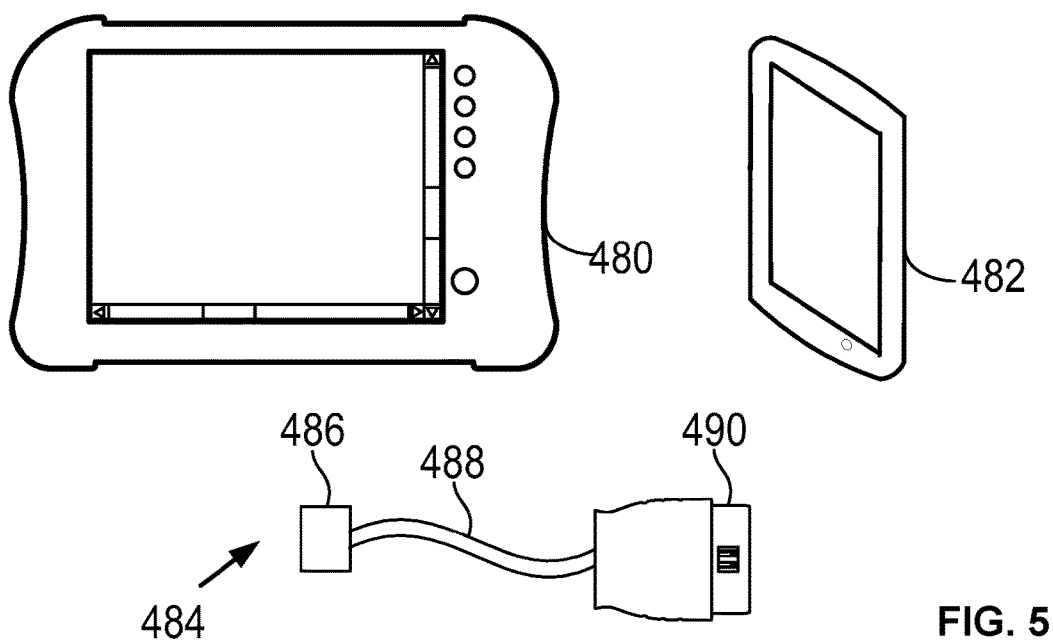
FIG. 5 shows examples of a tool in accordance with one or more example implementations.

Next, FIG. 5 shows a tablet device 480 and a smartphone 482. In accordance with the example implementations, the tool 414 and/or a tool 100 (shown in FIG. 7) can include and/or be arranged as a tablet device 480. The tablet device 480 can, but need not necessarily, include an IPAD® tablet device from Apple Inc. of Cupertino, California or a SAMSUNG GALAXY TAB tablet device from Samsung Electronics Co., Ltd. of Maetan-Dong, Yeongtong-Gu Suwon-Si, Gyeonggi-Do, Republic of Korea. In accordance with some other example implementations, the tool 414 and/or the tool 100 can include and/or be arranged as a smartphone 482 (e.g., an IPHONE® smartphone from Apple Inc., or a GALAXY® smartphone from Samsung Electronics Co., Ltd.). In accordance with the foregoing example implementations, at least a portion of the computer-readable data stored in the memory can be include computer-readable data downloaded to a transceiver (not shown in FIG. 5) from the APP STORE® online retail store, from the GOOGLE PLAY® online retail store, or another source of the applications or computer-readable data. In accordance with at least some of the foregoing implementations, the tablet device or smart phone can be programmed to include one or more applications for executing a CRPI to perform a function described in this description and/or to display a GUI in accordance with the example implementations described in this description.

FIG. 5 also shows a vehicle-to-tool link 484 in accordance with the example implementations. The vehicle-to-tool link 484 includes a connector 486, a harness 488, and an OBDC mating connector 490. The connector 486 can include a USB connector configured to connector to a USB port, a DB9 connectable to a port, such as a serial port arranged according to the EIA/TIA 232 serial interface standard, or some other connector. In some implementations, the tool 414 (e.g., the tablet device 480 or the smartphone 482) can include a port arranged to connect to the connector 486. The OBDC mating connector 490 is configured to operatively connect to an OBDC (e.g., the OBDC 422 or the OBDC 452) in a vehicle so as to allow a tool (e.g., the tool 414 or the tool 100) and a vehicle (e.g., the vehicle 412, the vehicle 440, or the vehicle 460) to communicate with each other.

Figure 6:
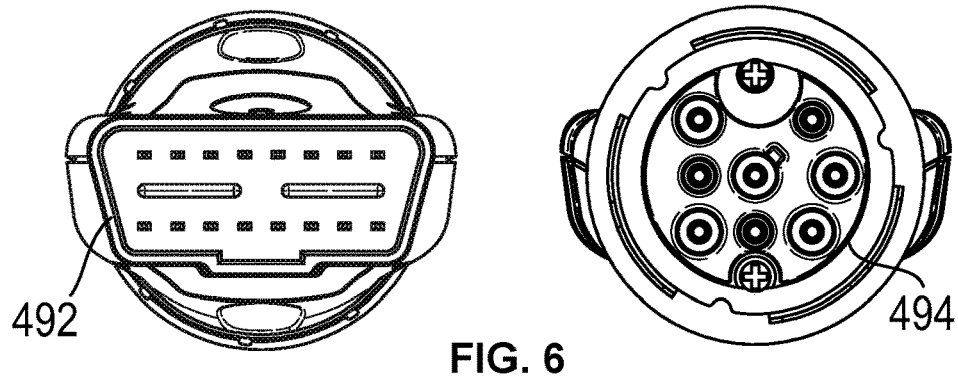
FIG. 6 shows examples of a vehicle-to-tool link device in accordance with one or more example implementations.

Next, FIG. 6 shows a vehicle-to-tool link device 492 and a vehicle-to-tool link device 494. Each of the vehicle-to-tool link device 492 and the vehicle-to-tool link device 494 include a transceiver to communicate wirelessly with a transceiver in a tool, such as a transceiver 106 in the tool 100 shown in FIG. 7. The vehicle-to-tool link device 492 includes a connector that meets the SAE® J1962 standard and/or that is configured to connect to an OBDC in compliance with the SAE® J1962 standard. The vehicle-to-tool link device 494 includes a connector that meets the SAE®

J1939_13 standard and/or that is configured to connect to an OBDC in compliance with the SAE® J1939_13 standard. In an alternative implementation, the vehicle-to-tool link device 492 and/or the vehicle-to-tool link device 494 can include a connector that meets a different vehicle data message protocol and/or that is configured to connect to an OBDC in compliance with the different vehicle data message protocol.

A. Tool

Figure 7:
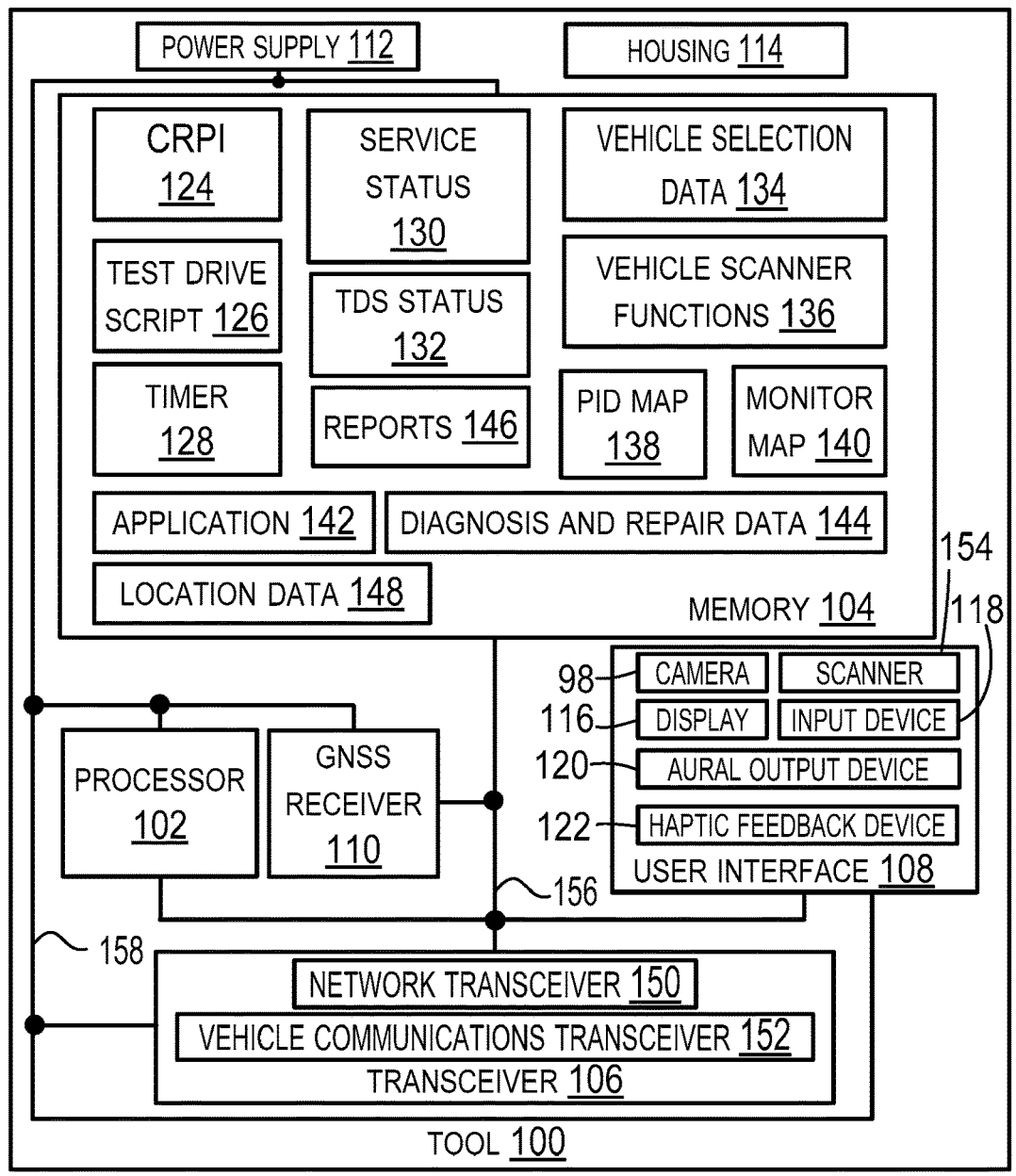
FIG. 7 is a block diagram of a tool in accordance with one or more example implementations.

FIG. 7 is a block diagram of a tool 100. The tool 100 includes a processor 102, a memory 104, a transceiver 106, a user interface 108, a global navigation satellite system (GNSS) receiver 110, and/or a data bus 156. The data bus 156 operatively connects the processor 102, the memory 104, the transceiver 106, the user interface 108 and/or the GNSS receiver 110 to one another. In other words, the data bus 156 provides an operative connection between two or more of the processor 102, the memory 104, the transceiver 106, the user interface 108, and/or the GNSS receiver 110. In at least some implementations, the tool 100 also includes a power supply 112 and a housing 114.

The operative connection provided by the data bus 156 allows the processor 102 to request and receive data from the memory 104. The operative connection provided by the data bus 156 allows the processor 102 to provide and store data within the memory 104. The operative connection provided by the data bus 156 allows the processor 102 to receive data input using the user interface 108 and to output data to the user interface 108 for outputting by the user interface 108. The operative connection provided by the data bus 156 allows the processor 102 to receive data received by the transceiver 106 and to provide the transceiver 106 with data that is to be transmitted by the transceiver 106.

1. Processor

A processor, such as the processor 102 or any other processor discussed in this description, can include one or more processors. Any processor discussed in this description can thus be referred to as "at least one processor" or "one or more processors." Furthermore, any processor discussed in this description can include a general purpose processor (e.g., an INTEL® single core microprocessor or an INTEL® multicore microprocessor), and/or a special purpose processor (e.g., a digital signal processor, a graphics processor, an embedded processor, or an application specific integrated circuit (ASIC) processor). Furthermore still, any processor discussed in this description can include or be operatively connected to a memory controller that controls a flow of data going to and from a memory, such as the memory 104.

Any processor discussed in this description can be configured to execute computer-readable program instructions (CRPI). Any CRPI discussed in this description can, for example, include assembler instructions, machine instructions, machine dependent instructions, microcode, firmware instructions, state-setting data, and/or either source code or object code written in one or any combination of two or more programming languages. As an example, a programming language can include an object oriented programming language such as Java, Python, or C++, or a procedural programming language, such as the "C" programming language. Any processor discussed in this description can be configured to execute hard-coded functionality in addition to or as an alternative to software-coded functionality (e.g., via CRPI). In at least some implementations of the tool 100, the processor 102 can be programmed to perform any function(s) described in this description as being performed by the tool 414 or by the tool 100.

An embedded processor refers to a processor with a dedicated function or functions within a larger electronic, mechanical, pneumatic, and/or hydraulic device, and is contrasted with a general purpose computer. The embedded processor can include a central processing unit chip used in a system that is not a general-purpose workstation, laptop, or desktop computer. In some implementations, the embedded processor can execute an operating system, such as a real-time operating system (RTOS). As an example, the RTOS can include the SMX® RTOS developed by Micro Digital, Inc., such that the embedded processor can, but need not necessarily, include (a) an advanced RISC (reduced instruction set computer) machine (ARM) processor (e.g., an AT91SAM4E ARM processor provided by the Atmel Corporation, San Jose, California), or (b) a COLDFIRE® processor (e.g., a 52259 processor) provided by NXP Semiconductors N.V., Eindhoven, Netherlands. A general purpose processor, a special purpose processor, and/or an embedded processor can perform analog signal processing and/or digital signal processing.

2. Memory

A memory, such as the memory 104 or any other memory discussed in this description, can include one or more memories. Any memory discussed in this description can thus be referred to as "at least one memory" or "one or more memories." A memory can include a non-transitory memory, a transitory memory, or both a non-transitory memory and a transitory memory. A non-transitory memory, or a portion thereof, can be located within or as part of a processor (e.g., within a single integrated circuit chip). A non-transitory memory, or a portion thereof, can be separate and distinct from a processor.

A non-transitory memory can include a volatile or non-volatile storage component, such as an optical, magnetic, organic or other memory or disc storage component. Additionally or alternatively, a non-transitory memory can include or be configured as a random-access memory (RAM), a read-only memory (ROM), a programmable read-only memory (PROM), an erasable programmable read-only memory (EPROM), a flash memory, an electrically erasable programmable read-only memory (EEPROM), or a compact disk read-only memory (CD-ROM). The RAM can include static RAM or dynamic RAM. A non-transitory memory can be configured as a removable storage device, a non-removable storage device, or a combination thereof. A removable storage and/or a non-removable storage device can, but need not necessarily, include a magnetic disk device such as a flexible disk drive or a hard-disk drive (HDD), an optical disk drive such as a compact disc (CD) drive and/or a digital versatile disk (DVD) drive, a solid state drive (SSD), or a tape drive.

Figure 16:
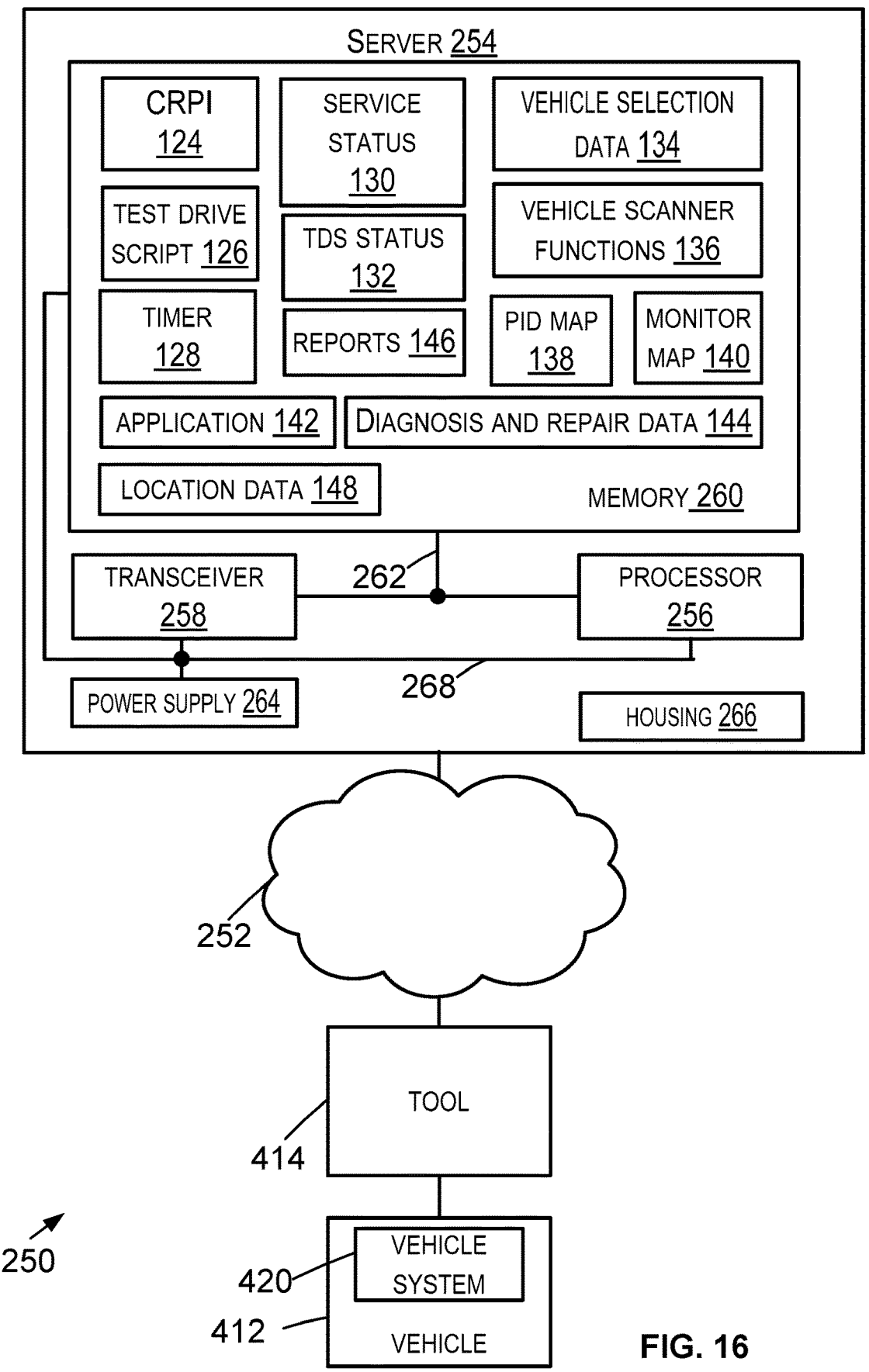
FIG. 16 is a block diagram of a system including a server in accordance with one or more example implementations.

A transitory memory can include, for example, CRPI provided over a communication network, such as the data bus 156 and/or the network 252 shown in FIG. 16.

A "memory" can be referred to by other terms such as a "computer-readable memory," a "computer-readable medium," a "computer-readable storage medium," a "data storage device," a "memory device," "computer-readable media," a "computer-readable database," "at least one computer-readable medium," or "one or more computer-readable mediums." Any of those alternative terms can be preceded by the prefix "transitory" if the memory is transitory or "non-transitory" if the memory is non-transitory. For a memory including multiple memories, two or more of the multiple memories can be the same type of memory or different types of memories.

3. Transceiver

A transceiver, such as the transceiver 106 or any other transceiver discussed in this description, can include one or more transceivers. Each transceiver includes one or more transmitters configured to transmit data onto a network and/or a data bus within the device (e.g., the tool 100) including the transceiver. Each transceiver includes one or more receivers configured to receive data or a communication carried over a network and/or a data bus within the device (e.g., the tool 100) including the transceiver. Unless stated differently, any data described as being transmitted to a device or system is considered to be received by that device or system. Similarly, unless stated differently, any data described as being received from a device or system is considered to be transmitted by that device or system directly or indirectly to the receiving device or system. For some implementations, a transceiver can include a transmitter and a receiver in a single semiconductor chip. In at least some of those implementations, the semiconductor chip can include a processor.

For purposes of this description and with respect to a particular vehicle (e.g., the vehicle 412, the vehicle 440, or the vehicle 460), a network can be configured as a vehicle network, a non-vehicle network, or a multi-purpose network. The vehicle network is at least partly on-board the particular vehicle and has an OBDC and one or more electronic controls units interconnected to the OBDC and/or to each other. In at least some implementations, the tool 100 includes a harness that operatively connects to the OBDC in the particular vehicle and allows the tool 100 to be disposed outside of the particular vehicle. In those or in other implementations, the tool 100 is configured to communicate with the OBDC and can be disposed within or outside of the particular vehicle. The non-vehicle network is off-board of the particular vehicle and includes one or more network nodes outside of the particular vehicle. The multi-purpose network is contained at least partly within the particular vehicle and at least partly off-board the particular vehicle. The multi-purpose network can include a vehicle network and a non-vehicle network.

In at least some of the example implementations, a transmitter, such as a transmitter within any transceiver described in this description, transmits radio signals carrying data, and a receiver, such as a receiver within any transceiver described in this description, receives radio signals carrying data. A transceiver with a radio transmitter and radio receiver can include one or more antennas and can be referred to as a "radio transceiver," an "RF transceiver," or a "wireless transceiver." "RF" represents "radio frequency."

A radio signal transmitted or received by a radio transceiver can be arranged in accordance with one or more wireless communication standards or protocols such as an IEEE® standard, such as (i) an IEEE® 802.11 standard for wireless local area networks (wireless LAN) (which is sometimes referred to as a WI-FI® standard) (e.g., 802.11a, 802.11b, 802.11g, or 802.11n), (ii) an IEEE® 802.15 standard (e.g., 802.15.1, 802.15,3, 802.15.4 (ZIGBEE®), or 802.15.5) for wireless personal area networks (PANs), (iii) a BLUETOOTH® version 4.1 or 4.2 standard developed by the Bluetooth Special Interest Group (SIG) of Kirkland, Washington, (iv) a cellular wireless communication standard such as a long term evolution (LTE) standard, (v) a code division multiple access (CDMA) standard, (vi) an integrated digital enhanced network (IDEN) standard, (vii) a global system for mobile communications (GSM) standard, (viii) a general packet radio service (GPRS) standard, (ix) a universal mobile telecommunications system (UMTS) standard, (x) an enhanced data rates for GSM evolution (EDGE) standard, (xi) a multichannel multipoint distribution service (MMDS) standard, (xii) an International Telecommunication Union (ITU) standard, such as the ITU-T G.9959 standard referred to as the Z-Wave standard, (xiii) a 6LoWPAN standard, (xiv) a Thread networking protocol, (xv) an International Organization for Standardization (ISO/International Electrotechnical Commission (IEC) standard such as the ISO/IEC 18000-3 standard for Near Field Communication (NFC), (xvi) the Sigfox communication standard, (xvii) the Neul communication standard, (xviii) the LoRaWAN communication standard, or a 5G new radio (5G NR) communication standard by the $3^{rd}$ Generation Partnership Project (3GPP) standards organization, such as the 5G NR, phase 1 or 5G NR, phase 2 communication standard. Other examples of the wireless communication standards or protocols are possible.

In at least some of the implementations, a transmitter, such as a transmitter within any transceiver described in this description, can be configured to transmit a signal (e.g., one or more signals or one or more electrical waves) carrying or representing data onto an electrical circuit (e.g., one or more electrical circuits). Similarly, a receiver, such as a receiver within any transceiver described in this description, can be configured to receive via an electrical circuit a signal carrying or representing data over the electrical circuit. The electrical circuit can be part of a non-vehicle network, a vehicle network, or a multi-purpose network. The signal carried over an electrical circuit can be arranged in accordance with a wired communication standard such as a Transmission Control Protocol/Internet Protocol (TCP/IP), an IEEE® 802.3 Ethernet communication standard for a LAN, a data over cable service interface specification (DOCSIS standard), such as DOCSIS 3.1, a universal serial bus (USB) specification, a vehicle data message (VDM) protocol, or some other wired communication standard or protocol. Examples of a VDM protocol are listed in Section VI of this description. An electrical circuit can include a wire, a printed circuit on a circuit board, and/or a network cable (e.g., a single wire, a twisted pair of wires, a fiber optic cable, a coaxial cable, a wiring harness, a power line, a printed circuit, a CAT5 cable, and/or CAT6 cable). The wire can be referred to as a "conductor". Transmission of data over the conductor can occur electrically and/or optically.

In accordance with at least some implementations, the transceiver 106 includes a network transceiver 150 and/or a vehicle communications transceiver 152. The network transceiver 150 is configured to communicate over a non-vehicle network and/or a multi-purpose network. The vehicle communications transceiver 152 is configured to communicate over a vehicle network and/or a multi-purpose network. The transceiver 106 can be configured as a gateway to communicate over a multi-purpose network. The transceiver 106 is also configured to communicate over the data bus 156.

In at least some implementations, the network transceiver 150 includes a modem, a network interface card, a local area network (LAN) on motherboard (LOM), and/or a chip mountable on a circuit board. As an example, the chip can include a CC3100 Wi-Fi® network processor available from Texas Instruments, Dallas, Texas, a CC256MODx Bluetooth® Host Controller Interface (HCI) module available from Texas instruments, or a different chip for communicating via Wi-Fi®, Bluetooth® or another communication protocol.

A network node that is within and/or coupled to a non-vehicle network and/or that communicates via a non-vehicle network or a multi-purpose network using a packet-switched technology can be locally configured for a next 'hop' in the network (e.g., a device or address where to send data to, and where to expect data from). As an example, a device (e.g., a transceiver) configured for communicating using an IEEE® 802.11 standard can be configured with a network name, a network security type, and a password. Some devices auto-negotiate this information through a discovery mechanism (e.g., a cellular phone technology).

The network transceiver 150 can be arranged to transmit a request and/or receive a response using a transfer protocol, such a hypertext transfer protocol (i.e., HTTP), an HTTP over a secure socket link (SSL) or transport layer security (TLS) (i.e., HTTPS), a file transfer protocol (i.e., FTP), or a simple mail transfer protocol (SMTP). The network transceiver 150 can be arranged to transmit an SMS message using a short message peer-to-peer protocol or using some other protocol.

The data transmitted by the transceiver 106 can include a destination identifier or address of a computing device to which the data is to be transmitted. The data or communication transmitted by the transceiver 106 can include a source identifier or address of the tool 100. The source identifier or address can be used to send a response to the tool 100. This described data can include a test drive script or other date instead or as well.

4. User Interface

In at least some implementations, the user interface 108 includes a display 116 and an input device 118. In those or in other implementations, the user interface 108 also includes an aural output device 120 or a haptic feedback device 122. In still other implementations, the user interface 108 includes the display 116, the input device 118, the aural output device 120, and the haptic feedback device 122. Any of the aforementioned implementations of the user interface 108 can include a camera 98, a scanner 154, or both the camera 98 and the scanner 154.

The display 116 can include one or more displays. As an example, each display of the one or more displays includes a capacitive touch screen display, a resistive touch screen display, a plasma display, a light emitting diode (LED) display, a cathode ray tube display, an organic light-emitting diode (OLED) display (such as an active-matrix OLED or a passive-matrix OLED), a liquid crystal display (LCD) (such as include a backlit, color LCD), a touch screen display with the LCD, a capacitive touch screen display, or a resistive touch screen display. The display 116 can include a different type of display as well or instead.

In at least some implementations, a display of the display 116 is affixed (e.g., removably affixed) to a substrate of the housing 114 and/or to the housing 114. In those or in other implementations, a display of the display 116 is one and/or within a wearable device, such as a pair of glasses or goggles, a head-mountable display, or a wrist display, such as a wristwatch (e.g., a smartwatch).

The display 116 is configured to display a test drive script and/or a representation of a test drive script stored in the memory 104. The display 116 can also be configured to display a still image (such as a visible light image, a thermal image, and/or a blended image based on a visible light image and a thermal image), a video, a text file (such as a text file with a PDF file extension or an XML file extension), a hypertext markup language file, a web page (such as a web page including a search bar, a cursor, and/or a test drive script), or a graphical user interface (GUI). In at least some implementations, the display 116 is configured to display a horizontal scroll bar and/or a vertical scroll bar. The horizontal scroll bar and the vertical scroll bar can be used to cause the display 116 to display content not currently displayed on the display 116. A web page displayable on the display 116 can include any content shown in or described with respect to any one or more of FIG. 17 to FIG. 33. Other examples of content displayable on the display 116 are also possible.

The input device 118 is configured to receive user inputs from a user of the tool 100. As an example, the input device 118 includes a keyboard or keypad including one or more keys configured to be pressed or otherwise manipulated by the user. As another example, the input device 118 includes a microphone configured for receiving sound waves, such as sound waves produced by the user speaking words in a vocabulary of the tool 100. The display 116 configured as a touch screen display can also receive user inputs from a user of the tool 100. Accordingly, the input device 118 can include the display 116 when configured as a touch screen display.

In the implementations that include the aural output device 120, the aural output device 120 includes one or more speakers configured to convert electrical signals to audible sounds. In those or in other implementations, the aural output device 120 includes wired headphones and/or wireless headphones. The wired headphones can connect to an audio plug operatively connectable to an audio jack. The wireless headphones can include in-ear headphones, such as the AIRPODS PRO® in-ear headphones by Apple Inc.

In the implementations that include the haptic feedback device 122, the haptic feedback device 122 can include an eccentric rotating mass motor, a linear resonant actuator, a piezoelectric actuator, and/or a forced impact (accelerated ram) device. In at least some of those implementations or other implementations, the haptic feedback device 122 can be configured as a wearable haptic feedback device. As an example, the wearable haptic feedback device can include an article of clothing, a wristwatch, a glove, or eyewear. Other examples of the haptic feedback device 122 are also possible.

The camera 98 can include a visible light camera, a thermal camera, or both a visible light camera and a thermal camera. The scanner 154 can include a light source, such as a light emitting diode or a laser, a sensor, such as one or more photoelectric cells, and a decoder. The decoder can be used to decode a code, such as a linear, one dimensional bar code, or a matrix code, such as a quick response (QR) code. As an example, the decoder can decode a code to determine a vehicle identification number of a mobile machine, or a serial number or model number of a mobile machine component (e.g., an ECU).

Figure 43:
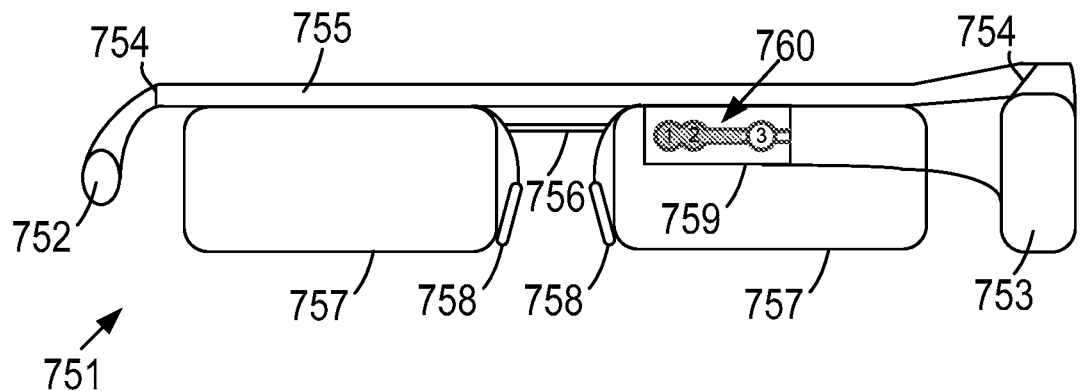
FIG. 43 and FIG. 44 show a wearable device in accordance with the example implementations.

Turning to FIG. 43, a wearable device 751 is shown. The wearable device 751 includes a temple 572, a temple housing 753, hinges 754, a top bar 755, a bridge 756, lenses 757, nose pads 758, and a display 759. The display 759 can include a prism display. The content described in this description as being displayed on the display 116, a portion of that content, and/or other content can be displayed on the display 759.

Figure 27:
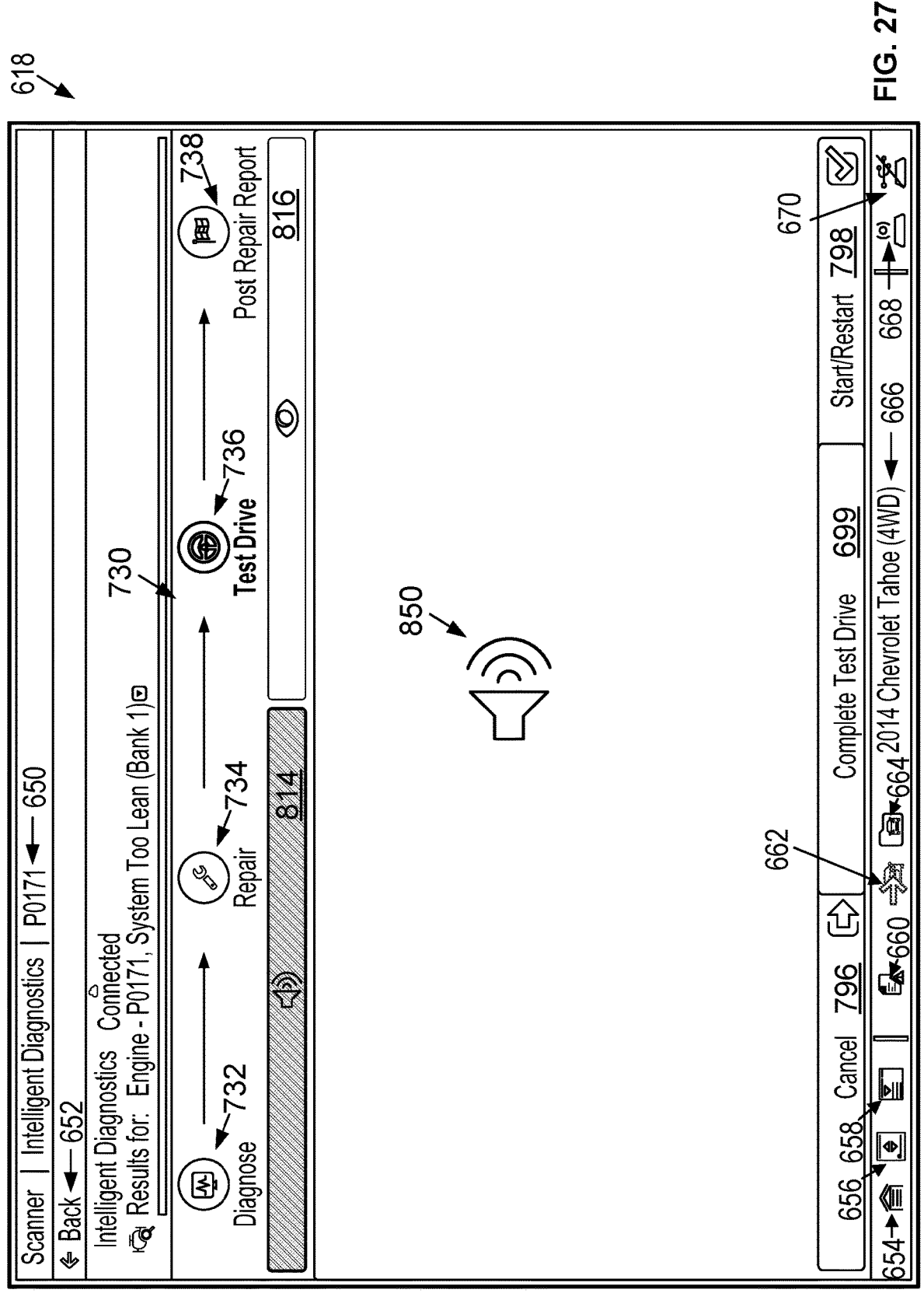
Figure 28:
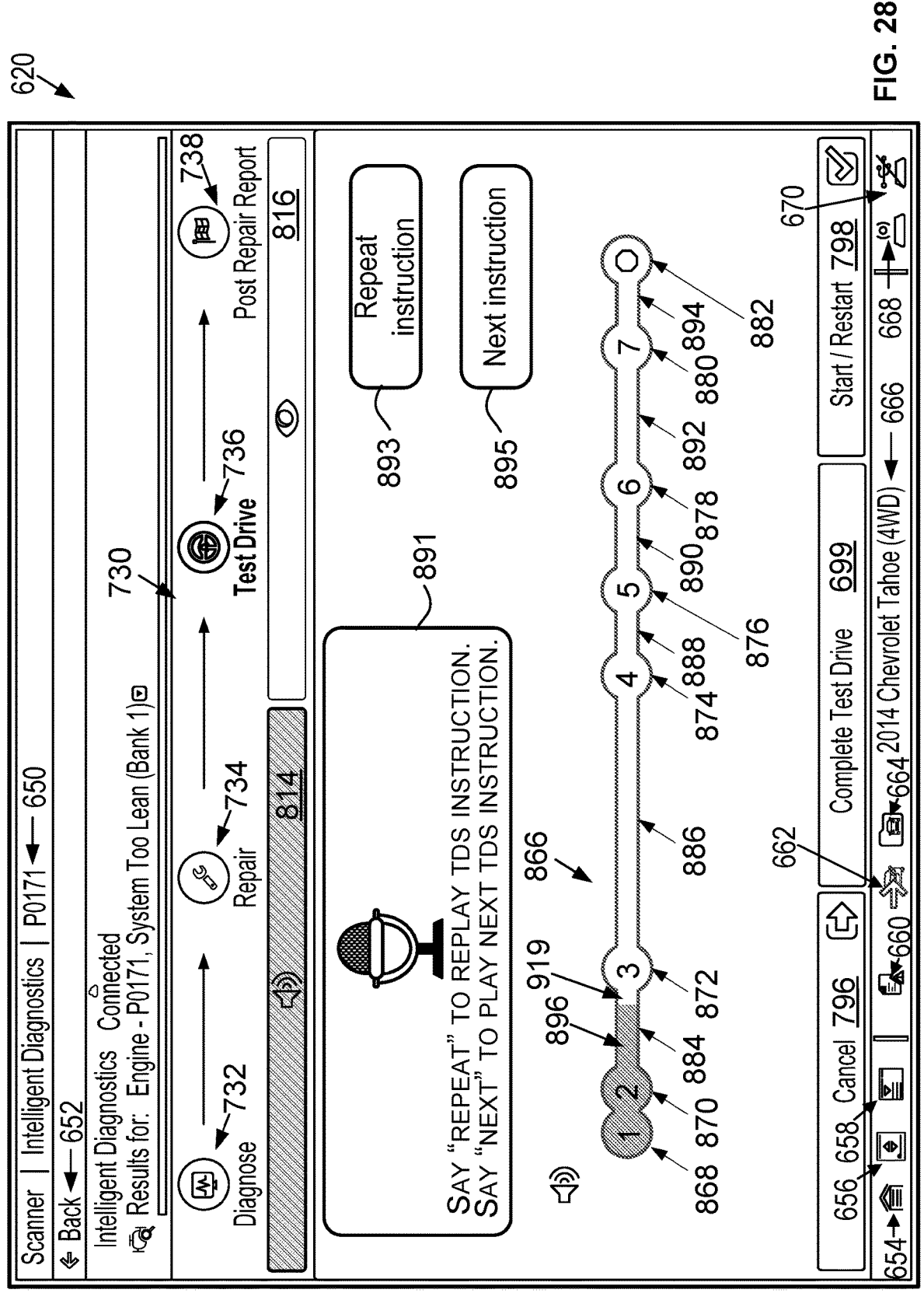

The temple housing 753 can contain various components (not shown) of the wearable device 751. For example, the temple housing 753 can include a transceiver, a camera, a microphone, and/or a power supply. The transceiver within the temple housing is configured to receive content that is to be shown on the display 759 and to transmit signals to the tool 100, such as signals indicative of a cancel command, a start/restart command, and/or a complete test drive script command. The processor 102 can respond to those commands in the same way that the processor 102 responds to determining a cancel USC, a start/restart USC, and a complete test drive script USC 699, respectively, shown in FIG. 22 to FIG. 25 and FIG. 27 to FIG. 29 is selected. Additionally alternatively, the signals can be indicative of a repeat command or a next command. The processor 102 can respond to those commands in the same way that the processor 102 responds to determining a repeat instruction USC 893 and a next instruction USC 895, respectively, shown in FIG. 28 is selected. The transceiver within the temple housing can be configured to communicate with the network transceiver 150 and/or another transceiver.

FIG. 43 shows content 760 displayed on the display 759. The content 760 is part of a progress meter 866 shown in FIG. 28. Other examples of content displayable on the display 759 are also possible.

Figure 44:
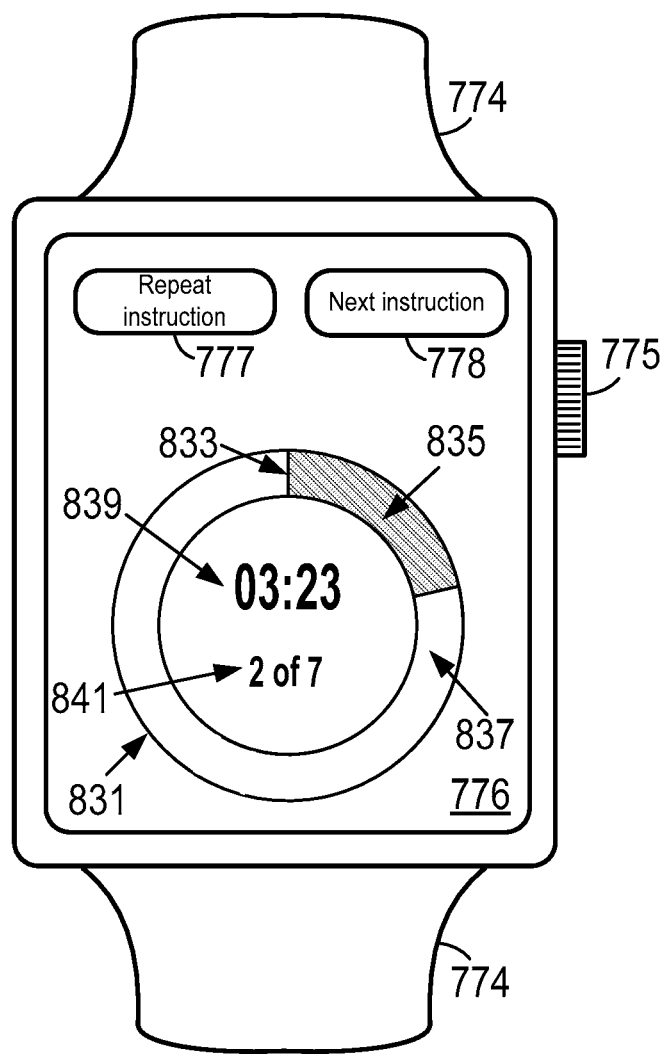

Turning to FIG. 44, a wearable device 773 is shown. The wearable device 773 can be configured as a wristwatch having a band 774, a crown 775, and a display 776. The content described in this description as being displayed on the display 116, a portion of that content, and/or other content can be displayed on the display 776. The wearable device 773 can include a processor. The wearable device can include a transceiver configured to communicate with the network transceiver 150 and/or another transceiver.

Figure 29:
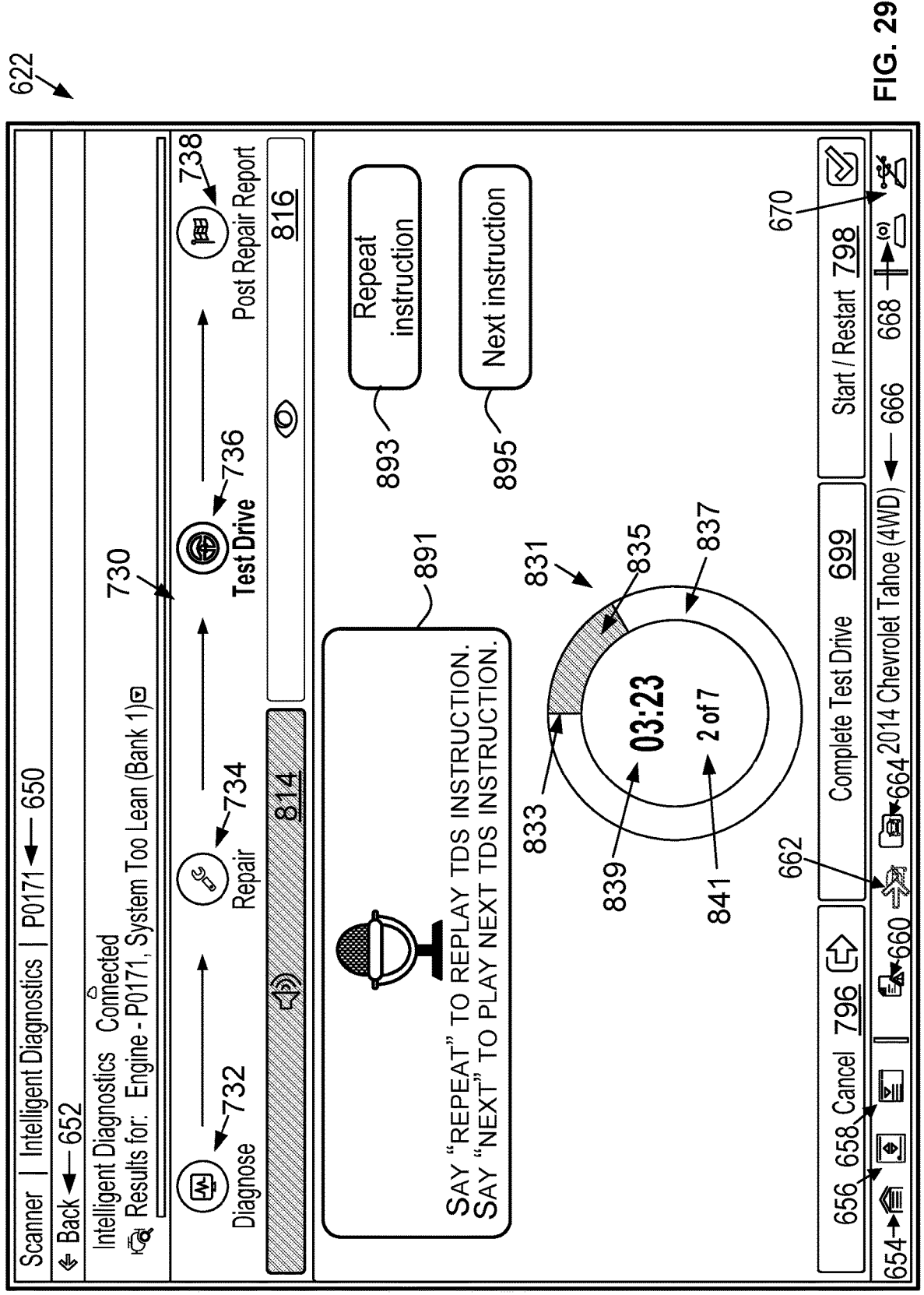

FIG. 44 shows content displayed on the display 776. The content displayed on the display 776 includes a progress meter 831, a repeat instruction USC 777, and a next instruction USC 778. The progress meter 831, which is also shown in FIG. 29, includes a meter start/end indicator 833, a completed-segment indicator 835, an uncompleted-segment indicator 837, a timer value 839, and a DCP indicator 841. Further details regarding those aspects of the progress meter 831 are described with respect to FIG. 29 and are applicable to FIG. 44.

In response to the determining the repeat instruction USC 777 has been selected, a processor of the wearable device 773 is configured to cause an aural output device of the wearable device 773 to output the TDS instruction most-recently output by that aural output device. In response to the determining the next instruction USC 778 has been selected, the processor of the wearable device 773 is configured to cause the aural output device of the wearable device 773 to output a TDS instruction that the processor of the wearable device 773 is scheduled to output using the aural output device of the wearable device 773 upon completion of the DCP currently being performed. Other examples of content displayable on the display 759 are also possible.

Additionally, the processor of the wearable device 773 can control a haptic feedback device within the wearable device 773 to notify a user of the wearable device of an occurrence of a drive cycle procedure event, such as transitioning to a next drive cycle procedure, completing a drive cycle procedure, passing a drive cycle procedure, or failing a drive cycle procedure.

5. Additional Components

Returning to FIG. 7, the GNSS receiver 110 is configured to receive signals from GNSS satellites and to generate GNSS data representative of those received signals. The processor 102 can use the GNSS data to determine a location, such as a latitude and longitude, of the tool 100. As an example, the GNSS data can be configured as GNSS data provided by the Global Positioning System associated with the United States of America, the Galileo system associated with Europe, the BeiDou system associated with the People's Republic of China, the Global Navigation Satellite System, sometimes referred to as GLONASS, associated with the Russian Federation, or the Quazi-Zenith Satellite System, sometimes referred to as QZSS, associated with Japan.

A power supply, such as the power supply 112 or any other power supply discussed in this description, can be arranged in any of a variety of configurations. As an example, the power supply can be configured to include circuitry to receive AC current from an AC electrical supply (e.g., electrical circuits operatively connected to an electrical wall outlet) and convert the AC current to a DC current for supplying to one or more of the components connected to the power supply 112. As another example, the power supply can be configured to include a battery or be battery operated. As yet another example, the power supply can be configured to include a solar cell or be solar operated. Moreover, a power supply can be configured to include electrical circuit(s) to distribute electrical current throughout the device or system including that power supply. As an example, those electrical circuit(s) include an electrical bus 158 that connects to the processor 102, the memory 104, the transceiver 106, the user interface 108, and the GNSS receiver 110. Other examples of a power supply are also possible.

In at least some implementations, the tool 100 includes a housing 114. The housing 114 surrounds at least a portion of the following: the processor 102, the memory 104, the transceiver 106, the user interface 108, the data bus 156, and/or the power supply 112. The housing 114 can support a substrate. In at least some example implementations, at least a portion of the following: the processor 102, the memory 104, the transceiver 106, the user interface 108, the data bus 156, and/or the power supply 112 is/are mounted on and/or connected to a substrate of the housing 114. The housing 114 can be made from various materials. For example, the housing 114 can be made from a plastic material (e.g., acrylonitrile butadiene styrene (ABS)) and a thermoplastic elastomer used to form a grip on the housing 114.

B. Memory Content

The example implementations can determine, generate, store, and/or use a variety of computer-readable data. At least some of the computer-readable data can be stored in a memory, such as the memory 104 and/or a memory 260 shown in FIG. 16. As an example, the memory 104 contains computer-readable programming instructions (CRPI) 124, a test drive script 126, a timer 128, a service status 130, a test drive script (TDS) status 132, vehicle selection data 134, vehicle scanner functions 136, a PID map 138, a monitor map 140, an application 142, diagnosis and repair data 144, reports 146, and/or location data 148.

The CRPI 124 includes program instructions executable by a processor, such as the processor 102 and/or the processor 256 shown in FIG. 16. As an example, the CRPI 124 can include program instructions that are executable to cause the tool 100 to perform any function described as being performed by the tool 100 or the processor 102. As another example, the CRPI 124 can include program instructions that are executable to cause a server 254 shown in FIG. 16 to perform any function described as being performed by the server 254 or the processor 256. In at least some implementations, the timer 128 is implemented using program instructions of the CRPI 124. In at least some of those implementations or in other implementations, the processor 102 operatively communicates with one or more hardware timers to receive inputs for use by the timer 128. The CRPI 124 can include program instructions arranged as the application 142.

The test drive script 126 includes one or more test drive scripts. As an example, the test drive script 126 includes a test drive script that can be performed while the tool 100 monitors an electronic system in the vehicle 412. A test drive script of the test drive script 126 includes an ordered sequence of drive cycle procedures. The ordered sequence of drive cycle procedures begins with an initial drive cycle procedure and ends with a final drive cycle procedure. Each drive cycle procedure is indicative of a respective vehicle state. In at least some implementations, the test drive script 126 includes a first particular drive cycle procedure that is associated with both a first particular vehicle state and a first condition pertaining to the first particular vehicle state. The test drive script 418 (shown in FIG. 1) can, but need not necessarily, be stored in the test drive script 126. The test drive script 126 can include the test drive script 160 shown in FIG. 8.

As an example, the vehicle state indicated by a drive cycle procedure can include an acceleration rate, a vehicle speed, a temperature of a vehicle component (e.g., a temperature of a particular vehicle fluid), an engine load (representing a transmission being in a particular gear or the vehicle being driven on a path with a particular grade/incline), a fluid level, or a particular state of a vehicle component (e.g., a particular throttle position, such as throttle open fifty percent; a brake switch state open or closed; air conditioning compressor on or off; window defroster on or off; a powertrain ECU operating in open or closed loop, or a malfunction indicator lamp on or off). As another example, the vehicle state can include the occurrence of a vehicle state identical to a vehicle state for a previously-performed drive cycle procedure in the test drive script. Accordingly, some test drive scripts may include identical drive cycle procedures at different locations within the ordered sequence of drive cycle procedures.

The timer 128 includes one or more timers. As an example, the timer 128 can include a count-up timer that is started when a drive cycle procedure of the test drive script 126 begins. The count-up timer can stop when the drive cycle procedure of the test drive script 126 ends. As another example, the timer 128 can include a count-down timer that is started when a drive cycle procedure of the test drive script 126 begins. The count-down timer can stop when the drive cycle procedure of the test drive script 126 ends. The processor 102, 256 can be configured to output a time indicated by the timer 128 to the user interface 108. The processor 102, 256 can be configured to pause or reset the timer 128, such as pausing the timer 128 if the vehicle changes vehicle states or resetting the timer 128 if the vehicle changes from operating in the vehicle state required for a drive cycle procedure to a different vehicle state and then back to the vehicle state required for the drive cycle procedure.

The service status 130 includes data indicative of a status of servicing the vehicle 412. In one respect, the status of servicing the vehicle can be a particular vehicle service mode. The particular vehicle service mode can be one vehicle service mode of multiple vehicle service modes arranged in a sequence of vehicle service modes. As an example, the multiple vehicle service modes arranged in a sequence of vehicle service modes can include a diagnostic mode, a repair mode, a test drive mode, and a post-repair report mode. The processor 102 can be configured to determine the particular vehicle service mode is the diagnostic mode upon determining a new vehicle type or a new particular vehicle has been selected. Additionally or alternatively, the processor 102 can be configured to recall a prior vehicle service mode that was previously used for a particular vehicle. A benefit of tracking the status of servicing the vehicle 412 is that the processor 102 can cause the display 116 to display an indicator of the status. A user seeing that indicator is able to see how far along he/she has progressed in servicing the vehicle and/or that other information displayed with the indicator of the status is applicable to the indicated vehicle service mode.

The TDS status 132 includes data indicative of a status of performing a test drive script. In accordance with implementations in which the test drive script includes one or more drive cycle procedures, the TDS status 132 can include data indicative of a status of performing each of the one or more drive cycle procedures. In accordance with those or other implementations, the test drive script status 132 can include measurement values for measurements performed by the tool 100 during performance of the test drive script and/or parameter values for PID(s) received by the tool 100 during performance of the test drive script. The TDS status 132 can include a time value output by the timer 128. A benefit of storing the TDS status 132 is that the processor 102 can output to the user interface 108 at least a portion of the TDS status so that a user of the tool 100 can be made aware whether any change to operating the vehicle 412 during performance of the test drive script 126 should be carried out by a driver of the vehicle 412.

Figure 18:
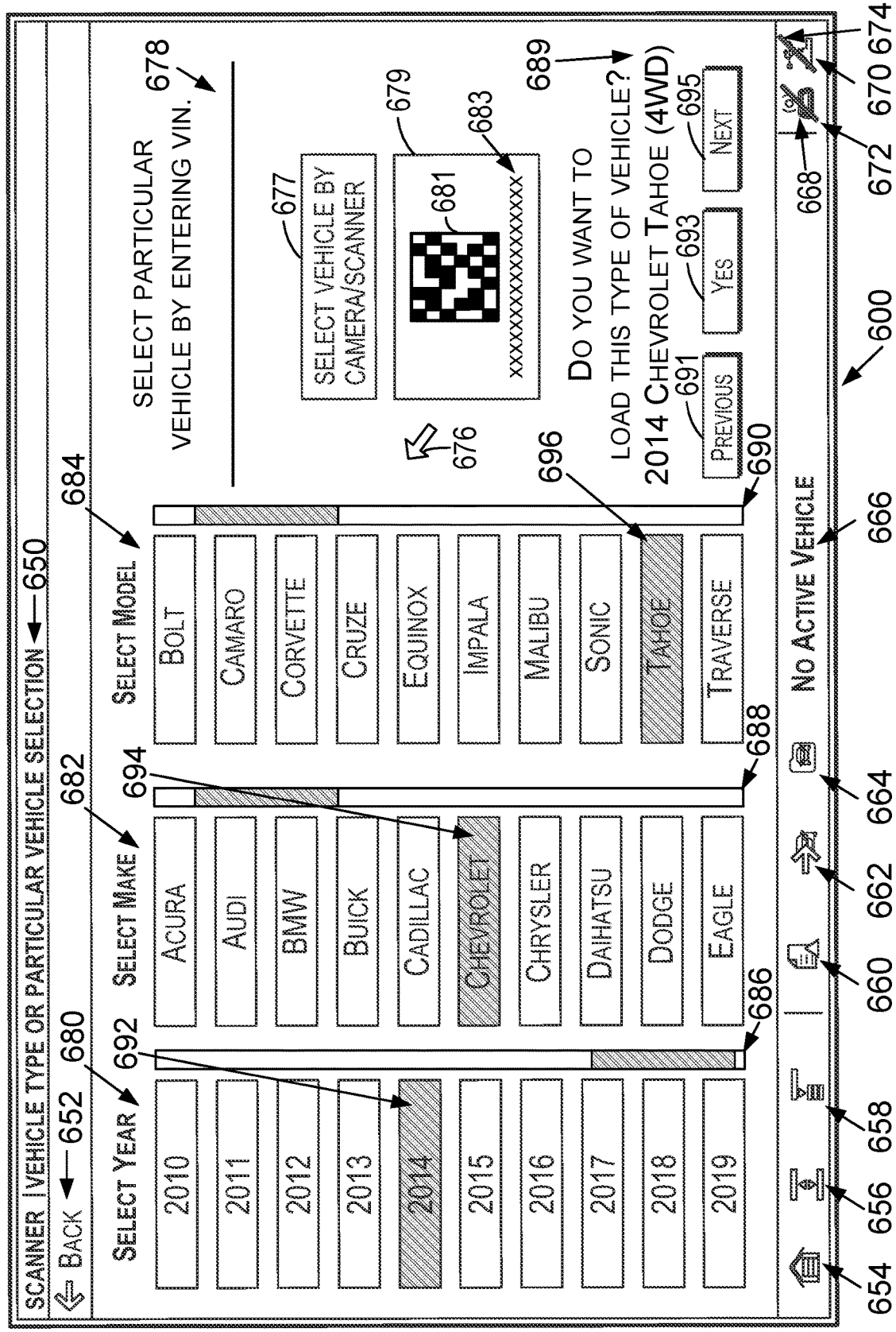
FIG. 18, FIG. 19, FIG. 20, FIG. 21, FIG. 22, FIG. 23, FIG. 24, FIG. 25, FIG. 26, FIG. 27, FIG. 28, FIG. 29, FIG. 30, FIG. 31, FIG. 32, and FIG. 33 show graphical user interfaces (GUIs) in accordance with one or more example implementations.

The vehicle selection data 134 can include one or more vehicle selection menus. The processor 102, 256 can output a vehicle selection menu to allow a user of the tool 100 to select a type of vehicle or a particular vehicle. FIG. 18 shows an example of a GUI 600 that includes a vehicle selection menu. The vehicle selection data 134 may also include data that represents relationships between vehicle model years and the types of vehicles that were built for and/or during each model year. For instance, for a given model year, the vehicle selection data 134 can include data that indicates all vehicle makes that include at least one type of vehicle for the given model year, and for each of those vehicle makes, the vehicle selection data 134 can include data that indicates all vehicle models that correspond to one of the vehicle makes that built at least one type of vehicle for the given model year. The processor 102, 256 can generate a vehicle selection menu based on the other data within the vehicle selection data 134.

The vehicle scanner functions 136 include one or more functions that include the tool 100 transmitting a vehicle data message to the vehicle 412 and/or receiving a vehicle data message from the vehicle 412. As an example, the vehicle scanner functions 136 includes a function that includes the vehicle communication transceiver 152 transmitting a vehicle data message to the vehicle and/or receiving a vehicle data message from the vehicle 412. Examples pertaining to a vehicle data message are described in Section VI below. In at least some implementations, a vehicle data message received from the vehicle 412 can include data indicative of a type of vehicle and/or a particular vehicle. In those or other implementations, a vehicle data message received from the vehicle 412 can include data indicative of a DTC set in the vehicle 412.

In at least some implementations, a vehicle data message transmitted to a vehicle includes a PID and a vehicle data message transmitted to the tool 100 from the vehicle in response to vehicle data message transmitted to the vehicle including a PID includes a parameter value associated with the PID. That response message can, but need not necessarily, include the PID or an identifier representative of the PID.

Table 1 shows an example of a request and response message including a PID according to an example vehicle data protocol referred to as a controller area network protocol. In this example, the node identifier is an eleven bit identifier written as an octal and two hexadecimal numbers, and the remaining data bytes (DB) are written as hexadecimal. For instance the PID $4D equates to PID 77 (in decimal format) for engine speed shown in at least FIG. 9. To determine an engine speed to show in a PID parameter indicator 143 shown in FIG. 25, the hexadecimal parameter values $3C90 can be converted to decimal and then divided by four to arrive at an engine speed of 3,876 revolutions per minute. The node identifier can indicate which device sent the vehicle data message. The $55 values indicate that the data bytes are not used. Other examples of a request and response message including a PID and/or a formula for converting a hexadecimal PID parameter value to a decimal PID parameter value using the same or another data protocol are possible.

TABLE 1

| Node ID | No. of DB | OBD II Mode | PID | DB #1 | DB #2 | DB #3 | DB #4 | DB #5 |
|---|---|---|---|---|---|---|---|---|
| 4A1 | 02 | 01 | 4D | 55 | 55 | 55 | 55 | 55 |
| 7F0 | 03 | 41 | 4D | 3C | 90 | 55 | 55 | 55 |

The tool 100 can monitor an electronic system, such as the vehicle system 20, in a vehicle by requesting PID parameter values from the vehicle system, receiving the PID parameter values, and comparing the PID parameter values to one or more PID parameter thresholds to determine whether the PID parameter value is within an expected operating range for the vehicle system to be operating correctly. Monitoring the electronic system can also include the tool 100 storing PID parameter values in the memory. In at least some implementations, the tool 100 monitors the electronic system in multiple vehicle service modes of the tool 100, such as the diagnostic mode, the repair mode, the test drive mode, and the post-repair report mode. The tool 100 may store the PID parameter values as test drive status data 206, as shown in FIGS. 13 to 15.

The PID map 138 includes a mapping of PIDs to parameter names. A processor, such as the processor 102, can determine PIDs contained in the test drive script 126 (e.g., PIDs associated with a particular drive cycle procedure of the test drive script) and determine corresponding parameter names from the PID map 138. The processor 102 can then populate a parameter display section, such as the parameter display section 760 shown in at least FIG. 22, within a GUI containing a representation of at least a portion of a test drive script. The parameter display section can include parameter names corresponding to PIDs that relate to a particular drive cycle procedure while the particular drive cycle procedure is being performed. The processor 102 can request and receive parameters associated with the determined PIDs and display the received parameters within the parameter display section.

The monitor map 140 of monitor identifiers to monitor names. A processor, such as the processor 102, can determine monitor identifiers contained in the test drive script 126 (e.g., monitor identifiers associated with a particular drive cycle procedure of the test drive script) and determine corresponding monitor names from the monitor map 140. The processor 102 can then populate a readiness monitor display section, such as a readiness monitor display section 772 shown in at least FIG. 22, within a GUI containing a representation of at least a portion of a test drive script. The readiness monitor display section can include monitor names corresponding to monitor identifiers that relate to the particular drive cycle procedure while the particular drive cycle procedure is being performed. The processor 102 can request and receive monitor status data associated with the determined monitor identifiers and display the received monitor status data within the readiness monitor display section.

The application 142 includes one or more applications executable by the processor 102. In at least some implementations, the one or more applications include a web browser application (or more simply, a web browser). The web browser application is arranged for retrieving information from the World Wide Web using a non-vehicle network or a multi-purpose network, such as the network 252 shown in FIG. 16. The web browser application can display a web page on the display 116. In at least some implementations, the web page includes a GUI including content within a GUI shown in FIG. 17 to FIG. 33.

The repair data 144 includes data that the tool 100 is configured to use in one or more of the service modes described herein as being used by the tool 100. As an example, the tool 100 can use the repair data 144 in one or more of a diagnose service mode, a repair service mode, a test drive service mode, and/or a post-repair report service mode. Each of those service modes is described further below. Examples of the repair data are shown in FIG. 34 to FIG. 42 and are described in detail within Section V of this description.

As an example, for a particular symptom (e.g., a DTC P0171) exhibited by a vehicle, the processor 102, 256 can refer to symptom-to-PID mapping data 551 shown in FIG. 36 to determine a set of PIDs corresponding to the particular symptom. During a service mode, such as the diagnose service mode, the tool 100 can transmit vehicle data messages to request the set of PIDs and display the set of PIDs with parameter values on the display 116 to provide information a user can use to determine how to proceed with servicing the vehicle.

As another example, for a particular symptom (e.g., a DTC P0171) exhibited by a vehicle, the processor 102, 256 can refer to symptom-to-component-test mapping data 553 shown in FIG. 36 to determine a set of component tests corresponding to the particular symptom. During a service mode, such as the diagnose service mode, the tool 100 can display a respective component test user selectable control (USC) for each component test of the set of component tests. In response to determining a particular component test USC has been selected, the processor 102 can cause the tool 100 to automatically configure the tool 100 for performing the component test and/or automatically initiate performance of the component test.

In any implementation in which the processor 256 refers to the symptom-to-component-test mapping data 553, the server 254 can transmit index value(s) within the symptom-to-component-test mapping data 553 for an identified symptom to the tool 100 and the processor 102 can refer to the symptom-to-component-test mapping data 553 within the memory 104 to determine which component test(s) are to be performed by determining which component test(s) are associated with the index value(s) provided by the server 254. The processor 102 can then cause the display 116 to display component test USC(s) to allow selection of the component test(s).

As yet another example, for a particular symptom (e.g., a DTC P0171) exhibited by a vehicle, the processor 102, 256 can refer to symptom-to-functional-test mapping data 555 shown in FIG. 36 to determine a set of functional tests corresponding to the particular symptom. In accordance with this example, the functional tests are referred to as FT1, FT2, FT3, FT4 (where FT represents "functional test"). During a service mode, such as the diagnose service mode, the tool 100 can display a respective functional test USC for each functional test of the set of functional tests.

In response to determining a particular functional test USC has been selected, the processor 102 can cause the tool 100 to automatically configure the tool 100 for performing the functional test and/or automatically initiate performance of the functional test. In at least some implementations, configuring the tool 100 to perform a functional test includes loading the vehicle communications transceiver 152 with a vehicle data message including an identifier to the functional test associated with the selected functional test USC and transmitting the vehicle data message to the vehicle. In any implementation in which the processor 256 refers to the symptom-to-functional-test mapping data 555, the server 254 can transmit index value(s) within the symptom-to-functional-test mapping data 555 for an identified symptom to the tool 100 and the processor 102 can refer to the symptom-to-functional-test mapping data 555 within the memory 104 to determine which functional test(s) are to be performed by determining which functional test(s) are associated with the index value(s) provided by the server 254. The processor 102 can then cause the display 116 to display functional test USC(s) to allow selection of the functional test(s).

As yet another example, for a particular symptom (e.g., a DTC P0171) exhibited by a vehicle, the processor 102, 256 can refer to symptom-to-reset-procedure mapping data 557 shown in FIG. 36 to determine a set of reset procedures corresponding to the particular symptom. During a service mode, such as the repair service mode, the tool 100 can display a reset procedure USC for each reset procedure of the set of reset procedures.

In response to determining a particular reset procedure USC has been selected, the processor 102 can cause the tool 100 to automatically configure the tool 100 for performing the reset procedure and/or automatically initiate performance of the reset procedure. In at least some implementations, configuring the tool 100 to perform a reset procedure includes loading the vehicle communications transceiver 152 with a vehicle data message including an identifier to the reset procedure associated with the selected reset procedure USC and transmitting the vehicle data message to the vehicle. In any implementation in which the processor 256 refers to the symptom-to-reset-procedure mapping data 557, the server 254 can transmit index value(s) within the symptom-to-reset-procedure mapping data 557 for an identified symptom to the tool 100 and the processor 102 can refer to the symptom-to-reset-procedure mapping data 557 within the memory 104 to determine which reset procedure(s) are to be performed by determining which reset procedure(s) are associated with the index value(s) provided by the server 254.

The repair data 144 can include data suggest a component to service (e.g., adjust or replace) on a vehicle. The processor 102, 256 can determine which component to suggest based on outcomes of component test(s) and/or functional test(s) performed during the diagnose service mode. That determination can also be based on whether, during a test drive of the vehicle containing the serviced component, a monitor failed and/or a malfunction indicator lamp within the vehicle turned on. The processor 102, 256 can be configured to lower a confidence rate in suggesting the component to alleviate a particular symptom in the vehicle if the monitor failed and/or a malfunction indicator lamp within the vehicle turned on during the test drive a threshold number or percentage of times for the particular symptom and servicing of the vehicle component. In contrast, the processor 102, 256 can be configured to raise the confidence rate in suggesting the component to alleviate the particular symptom in the vehicle if the monitor did not fail and the malfunction indicator lamp within the vehicle did not turn on during the test drive a threshold number or percentage of times for the particular symptom and servicing of the vehicle component.

Figure 31:
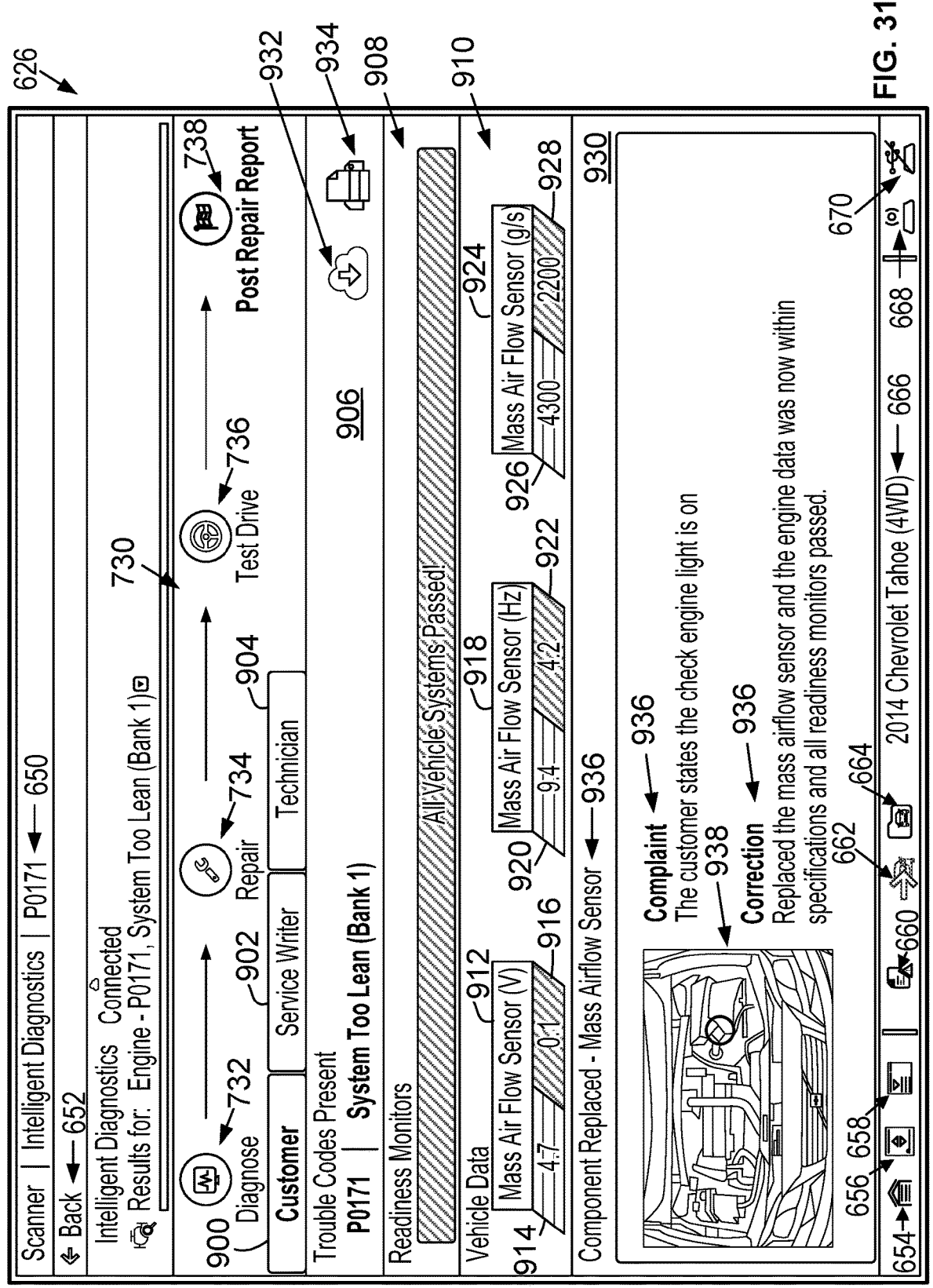
Figure 32:
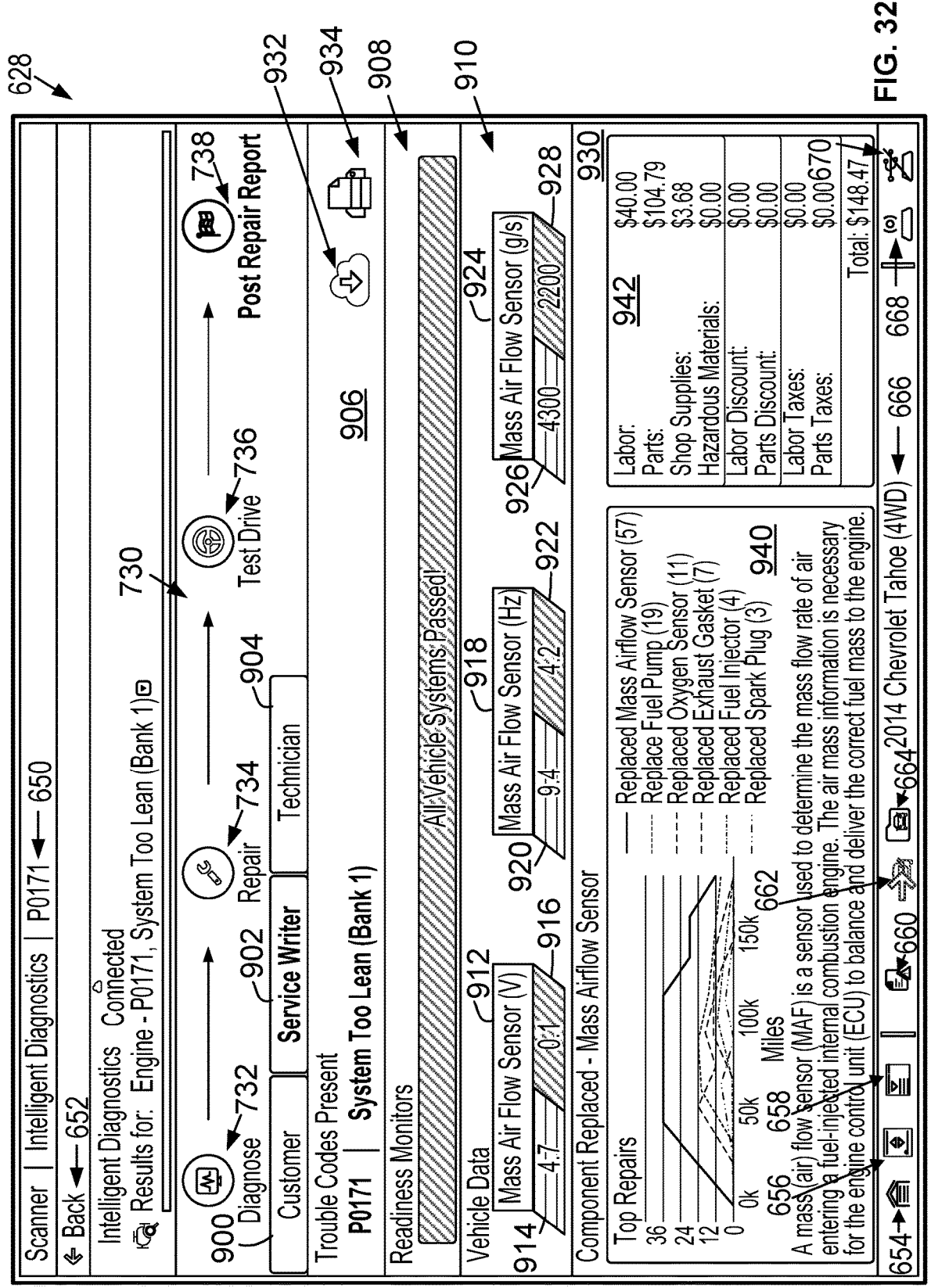
Figure 33:
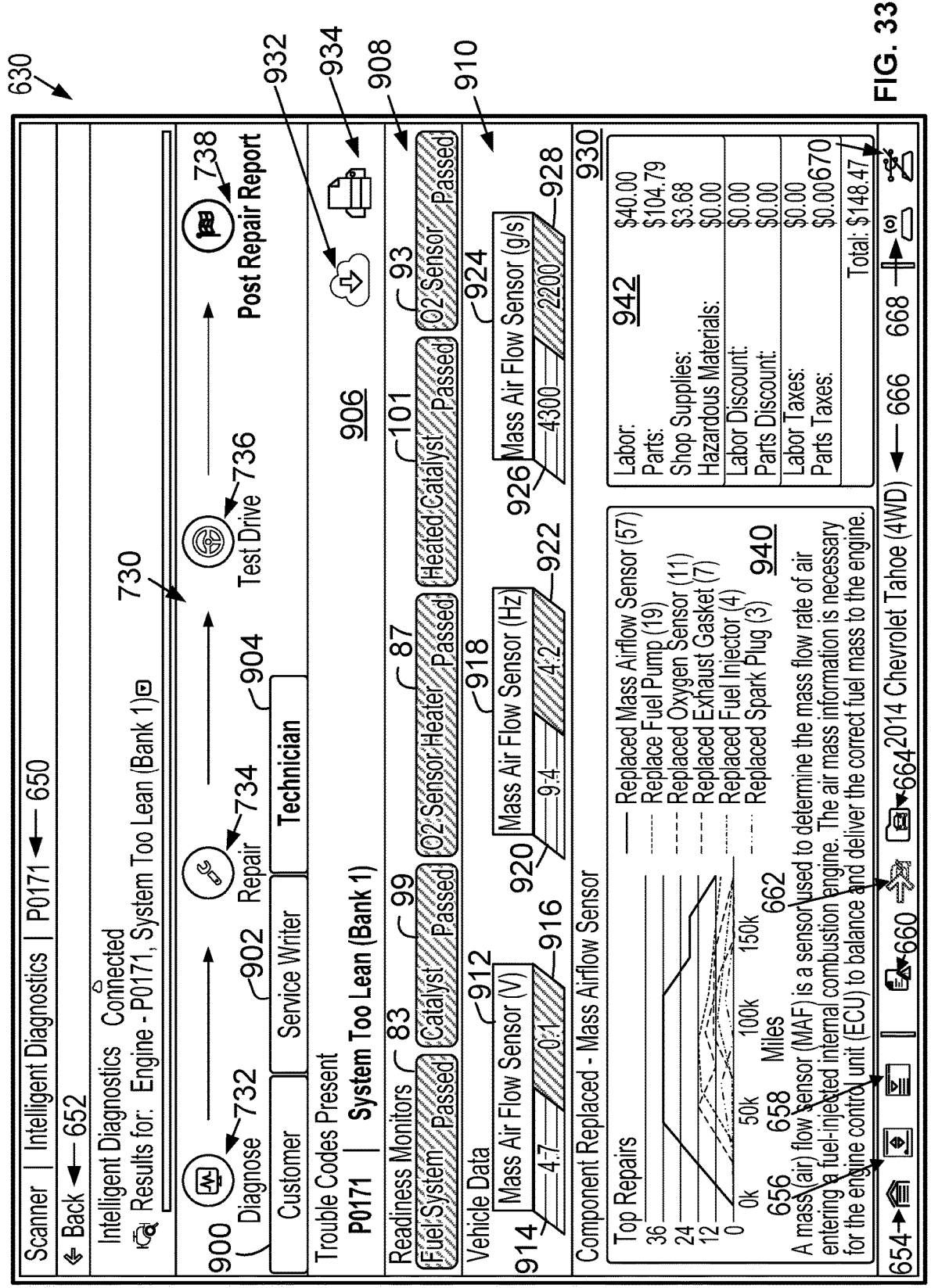

The reports 146 include one or more reports generated by a processor, such as the processor 102, 256. A report within the reports 146 includes report content. The processor 102 can output a report to the display 116, and the display 116 can display the report output by the processor 102. Examples of report content are shown in FIG. 31 to FIG. 33. Those figures are discussed in Section IV.

The location data 148 can include the GNSS data representative of GNSS signals received by the GNSS receiver 110 and/or a location determined by the processor 102 based on the GNSS data. The processor 102 can transmit the determined location to the server 254.

The CRPI 124 can include program instructions executable by a processor to output vehicle selection data 134 on the display 116 and to determine a type of vehicle or a particular vehicle via use of the vehicle selection data 134. Additionally or alternatively, the CRPI 124 can include program instructions executable by a processor to determine a type of vehicle or a particular vehicle via use of the vehicle scanner function 136.

The CRPI 124 can include program instructions executable by a processor to determine a service condition (e.g., a symptom) of the vehicle. As an example, the service condition can include a DTC determined by the processor executing the CRPI to request and receive the DTC from the vehicle. As another example, the service condition can include a vehicle system identifier, a vehicle component identifier, a DTC, and/or a customer complaint entered via a GUI, such as the GUI 602 shown in FIG. 19.

Next, FIG. 8 shows a test drive script 160 in accordance with the example implementations. The test drive script 160 includes drive cycle procedure numbers 162, test drive script (TDS) instructions 164, timer values 166, PIDs 168, and monitor identifiers 170. The TDS instructions 164 include instructions indicating how the vehicle should be operated during the test drive. As an example, the drive cycle procedures numbered 1, 2, 3, 4, 5, 6, 7 in FIG. 8 are associated with TDS instructions 161, 163, 165, 167, 169, 171, 173, respectively. The timer values 166 can include timer values to be counted using the timer 128. As an example, the drive cycle procedures numbered 1, 2, 3, 4, 5, 6, 7 in FIG. 8 are associated with timer values 175, 177, 179, 181, 183, 185, 187, respectively. One or more of the timer values 166 can include a timer value that indicates an estimate of how long it will take to perform the drive cycle procedure associated with that timer value. Additionally or alternatively, one or more of the timer values 166 can include a timer value that indicates how long an ECU requires the drive cycle procedure associated with that timer value to be performed.

Although FIG. 8 shows that each drive cycle procedure is associated with a single timer, in at least some implementations, a drive cycle procedure of a test drive script may be associated with multiple timers or no timers at all. The provision of monitor identifiers with a drive cycle procedure allows the processor 102 to request and receive monitor status data while the drive cycle procedure is being performed. In at least some implementations, if the processor 102 determines that the monitor status data indicates the monitor has failed during performance of the drive cycle procedure, the processor 102 can output via the user interface an indication that the monitor has failed. Receiving such an indication during performance of the test drive script is beneficial, because the driver can end the test drive script early and return to the repair shop in order to continue repairing the vehicle before performing the test drive script in its entirety.

Additionally, the processor 102 can use the timer values 166 and the monitor identifiers 170 to determine when to transmit a vehicle data message to the vehicle 12 to determine whether a monitor has passed or failed. In at least some implementations, the processor 102 begins transmitting the vehicle data message to request the monitor status a threshold amount of time before the timer for the drive cycle procedure expires. As an example, the threshold amount of time can be a fixed amount of time, such as one minute. As another example, the threshold amount of time can be a fixed percentage of the timer for the drive cycle procedure, such as twenty-five percent of the timer value for the drive cycle procedure. A benefit of waiting to send the vehicle data messages to request the monitor status until a time period closer to when the monitor status is likely to change is that the vehicle network 432 is not loaded with vehicle data messages to request the monitor status during a time period when the monitor status is not likely to change. Additionally, if the monitor status changes to pass or fail before the timer expires, then the processor 102 can determine that the next drive cycle procedure of the test drive script can begin.

Next, FIG. 9 shows a PID map 180 in accordance with the example implementations. The PID map 180 can be contained within the PID map 138 alone or with one or more other PID maps. The PID map 180 includes one or more PIDs 182 and respective parameter names 184. In accordance with at least some implementations, the PIDs are numeric only and the parameter names are alpha-numeric. A PID map can be associated with one or more different types of vehicles. A different PID map (not shown) can be associated with one or more other different types of vehicles. The PID map 180 can include a vehicle type identifier 186 so that the processor 102 can locate the PID map 180 for a particular type of vehicle being serviced using the tool 100. For purposes of this description, the vehicle type "A" in the drawings can represent the vehicle type "2014 Chevrolet Tahoe (4WD)" as shown in at least some of the drawings.

In accordance with an example implementation, the processor 102 can determine a PID from the PIDs 168 in the test drive script 160 and determine a parameter name for the determined PID. The processor 102 can request and receive a parameter value from the vehicle 412 by transmitting at least the PID associated with the parameter value. Thereafter, the processor 102 can populate a GUI with at least a portion of the test drive script and a parameter display section including the parameter name and the parameter value, both of which are associated with the PID sent to the vehicle.

Next, FIG. 10 shows a monitor map 189 in accordance with the example implementations. The monitor map 189 can be contained within the monitor map 140 alone or with one or more other monitor maps. The monitor map 189 includes one or more monitor identifiers 190 and respective monitor names 191 and readiness monitor indicator (RMI) identifiers 192. In accordance with at least some implementations, the monitor identifiers 190 are numeric only and the monitor names 191 are alpha-numeric. The processor 102 can include a monitor identifier among the monitor identifiers 190 in a VDM to request a status of a readiness monitor associated with the respective monitor name. A monitor map can be associated with one or more different types of vehicles. A different monitor map (not shown) can be associated with one or more other different types of vehicles. The monitor map 189 can include a vehicle type identifier 193 so that the processor 102 can locate the monitor map 189 for a particular type of vehicle being serviced using the tool 100.

In accordance with an example implementation, the processor 102 can determine a monitor identifier from the monitor identifiers 170 in the test drive script 160 and determine a monitor name from the monitor names 191 for the determined monitor identifier. The processor 102 can request and receive a status value of a monitor from the vehicle 412 by transmitting at least the monitor identifier associated with the monitor. Thereafter, the processor 102 can populate a GUI with a readiness monitor display section including the monitor name and the monitor status, both of which are associated with the monitor identifier sent to the vehicle.

Figure 19:
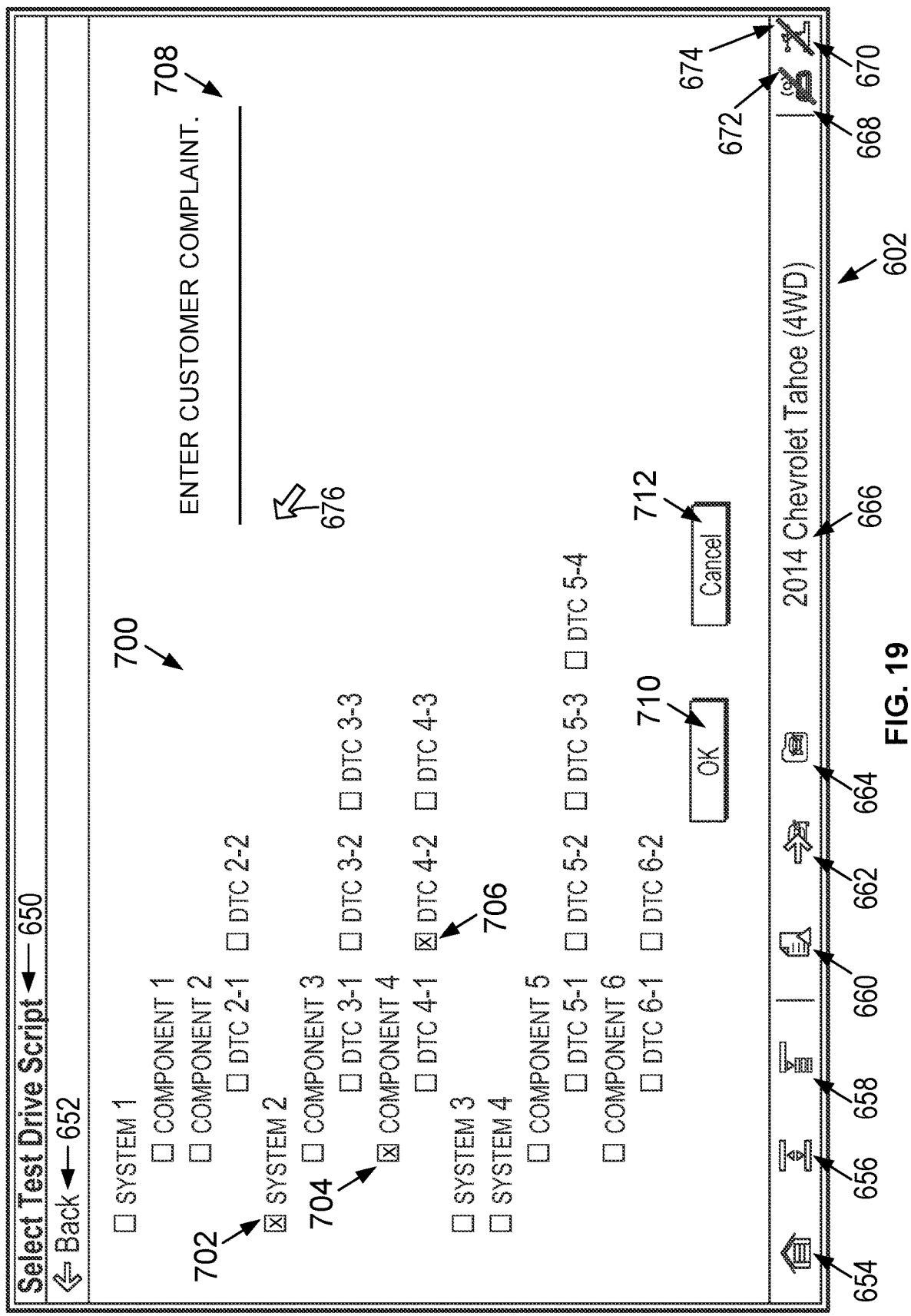

Next, FIG. 11 shows a test drive script map 194 in accordance with the example implementations. The test drive script map 194 can be contained within a memory, such as the memory 104, 260. In particular, the test drive script map 194 can be contained within the test drive script 126. The processor 102 can request and receive a test drive script by determining a test drive script associated with one or more identifiers associated with that test drive script. As an example, the one or more identifiers associated with a test drive script 195 can include a type of vehicle identifier 196, a system identifier 197, a component identifier 198, and/or a diagnostic trouble code (DTC) identifier 199. In some implementations, one or more test drive scripts can be associated with multiple components. Those one or more test drive scripts could be used when multiple components were repaired on the vehicle or for other reasons. FIG. 19 shows a GUI 602 configured to allow a user of the tool 100 to enter a system identifier, a component identifier, and a DTC. In the implementations using the GUI 602, a vehicle type has already been entered.

Next, FIG. 12 shows test drive status data 200 pertaining to the test drive script 160. The test drive status data 200 can be stored in the TDS status 132. As shown in FIG. 12, the test drive status data 200 includes drive cycle procedure numbers 201 that correspond to the drive cycle procedure numbers 162 (shown in FIG. 8). The test drive status data 200 also includes drive cycle procedure statuses 202, i.e., a status for each drive cycle procedure of the test drive script 160. As an example, a drive cycle status can be "not started," "on-going," "stopped," or "completed." The test drive status data 200 includes PID parameters 203. The test drive status data 200 further includes monitors passed (M/P) status data 204, and monitors failed (M/F) status data 205. As shown in FIG. 12, all of the drive cycle procedures statuses 202 are "not started." Accordingly, no PID parameters have been received for the test drive script 160 and all of the M/P status data 204 and all of the M/F status data 205 indicates none, because none of the monitors have been checked yet.

Next, FIG. 13 shows test drive status data 206 pertaining to the test drive script 160. The test drive status data 206 can be stored in the TDS status 132. The test drive status data 206 is similar to the test drive status data 200 except that the status and PID parameter data for the DCP 1 have changed since the DCP 1 has begun and is on-going. As shown in FIG. 13, PID parameters have been received for PIDs 61, 77, 78, and 79, but none of the monitors 25, 27, 30, 33, and 34 have passed or failed. As shown in FIG. 8, those are the monitors that are to be checked for the DCP 1. Moreover, no PID parameters have been received for the DCPs 2 to 7, and passing or failing of monitors has not been determined for the DCPs 2 to 7, because DCPs 2 to 7 have not started. Although FIG. 13 shows only a single parameter for each of PIDs 61, 77, 78, and 79, the TDS status 132 can include multiple parameters for one or more PIDs for one or more of the drive cycle procedures that have been at least partially performed.

Next, FIG. 14 shows test drive status data 207 pertaining to the test drive script 160. The test drive status data 207 can be stored in the TDS status 132. Similar to the test drive status data 200, 206, the test drive status data 207 includes the drive cycle procedure numbers 201, the drive cycle procedure statuses 202, the PID parameters 203, the M/P status data 204, and the M/F status data 205. As shown in FIG. 14, the status of the DCP 1 is complete and the status of the DCP 2 is on-going. Additionally, FIG. 14 shows that the monitor associated with monitor ID 34 passed as a result of performing and/or during the performance of the DCP 1. FIG. 14 also shows that no PID parameters have been received for the DCPs 3 to 7, and passing or failing of monitors has not been determined for the DCPs 3 to 7, because DCPs 3 to 7 have not started.

Next, FIG. 15 shows test drive status data 208 pertaining to the test drive script 160. The test drive status data 208 can be stored in the TDS status 132. Similar to the test drive status data 200, 206, 207, the test drive status data 208 includes the drive cycle procedure numbers 201, the drive cycle procedure statuses 202, the PID parameters 203, the M/P status data 204, and the M/F status data 205. As shown in FIG. 15, the statuses of the DCP 1 and the DCP 2 are complete and the status of the DCP 3 is on-going. Additionally, FIG. 15 shows that the monitor associated with monitor ID 34 passed as a result of performing and/or during the performance of the DCP 1 and that the monitor associated with monitor ID 27 passed as a result of performing and/or during the performance of the DCP 2. FIG. 15 also shows that no PID parameters have been received for the DCPs 4 to 7, and passing or failing of monitors has not been determined for the DCPs 4 to 7, because DCPs 4 to 7 have not started.

C. Server Computing System

FIG. 16 is a block diagram of a system 250 in accordance with one or more example implementations. The system 250 includes the vehicle 412 with the vehicle system 20, the tool 414, a network 252, and a server 254. The network 252 can include a non-vehicle network or a multi-purpose network. The tool 414 within the system 250 can be arranged like the tool 100 shown in FIG. 7. The vehicle 412 can be arranged like the vehicle 440, the vehicle 460, or any other vehicle or mobile machine described in this description. The network 252 can include any wireless network and/or any wired network described in this description or another type of or combination of two or more types of networks that permit the server 254 and the tool 414 to communicate with one another.

The server 254 includes a processor 256, a transceiver 258, a memory 260, and a data bus 262. The data bus 262 operatively connects the processor 256, the transceiver 258, and/or the memory 260 to one another. In other words, the data bus 262 provides an operative connection between two or more of the processor 256, the transceiver 258, and/or the memory 260. In at least some implementations, the server 254 also includes a power supply 264 and a housing 266. The power supply 264 can supply electrical current to the processor 256, the transceiver 258, and/or the memory 260 using a power bus 268.

The description of a processor above refers to "any other processor discussed in this description. The processor 256 is such a processor and thus the aforementioned description pertains to the processor 256. Moreover, for the implementations in which the processor 256 is arranged like the INTEL® multicore microprocessor, the processor 256 can include one or more INTEL® XEON® processors having between four and twenty-eight cores. In at least some implementations of the server 254, the processor 256 can be programmed to perform any function(s) described in this description as being performed by the server 254.

The description of a transceiver above refers to "any other transceiver discussed in this description. The transceiver 258 is such a transceiver and thus the aforementioned description pertains to the transceiver 258.

The description of a memory above refers to "any other memory discussed in this description. The memory 260 is such a memory and thus the aforementioned description pertains to the memory 260.

The description of a power supply above refers to "any other power supply discussed in this description. The power supply 264 is such a power supply and thus the aforementioned description pertains to the power supply 264.

The housing 266 surrounds at least a portion of the following: the processor 256, the transceiver 258, the memory 260, the data bus 262, and/or the power supply 264. The housing 266 can support a substrate. In at least some example implementations, at least a portion of the following: the processor 256, the transceiver 258, the memory 260, the data bus 262, and/or the power supply 264 is/are mounted on and/or connected to a substrate of the housing 266. In at least some implementations, the housing 266 includes a rack and/or cabinet having one or more shelves.

The memory 260 includes the CRPI 124, the test drive script 126, the timer 128, the service status 130, the TDS status 132, the vehicle selection data 134, the vehicle scanner functions 136, the PID map 138, the monitor map 140, the application 142, the diagnosis and repair data 144, reports 146, and location data 148. The description of that computer-readable data stored in the memory 104 above is applicable to that computer readable data within the memory 260. The server 256 can receive location data generated at the tool 100 and then store that location data within the location data 148.

In at least some implementations, the network 252 includes satellites of a global navigation satellite system (GNSS) configured to transmit signals that can be used by a processor, such as the processor 102 or a processor within an ECU in the vehicle 412, 440, 460, to determine a location of a receiver that receives the signals from some of the GNSS satellites. The determined location can indicate a location of the vehicle 412, 440, 460, the tool 100, or both if the tool 100 is located within the vehicle 412, 440, 460.

In the implementations in which the application 142 in the tool 100 includes a browser, the processor 256 can output a GUI, such as any GUI shown in the drawings to the network 252 for transmission to the tool 100. The processor 256 can receive data indicating selection of a USC from within a GUI displayed on the display 116 and data the tool 100 receives from a vehicle connected to the tool 100 among other data so that the server 254 can include the service status data 130 and the TDS status 132. The processor 256 can use at least the service status 130 and/or the TDS data 132 to determine which GUI is to be provided to the tool 100 for displaying on the display 116.

III. Example Operation

Figure 17:
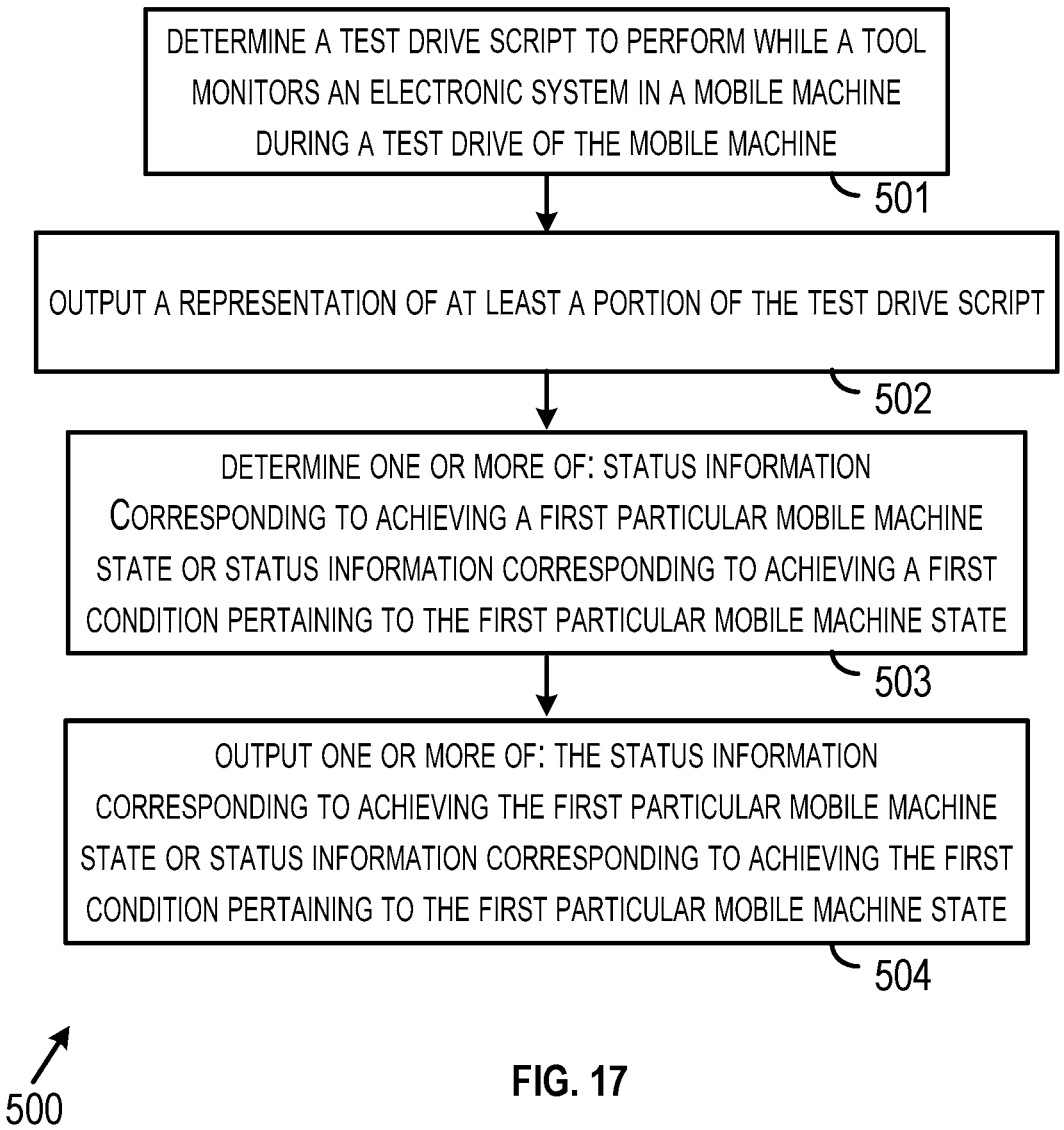
FIG. 17 depicts a flow chart showing an example method in accordance with the example implementations.

FIG. 17 shows a flowchart depicting a set of functions 500 of a method in accordance with one or more of the example implementations. Two or more functions and/or portions of two or more functions of the set of functions 500 may, but need not necessarily, be performed at the same time. The set of functions 500 can be performed by one or more processors. For example, the set of functions 500 can be performed by one or more processors described in this description.

Block 501 includes determining a test drive script to perform while a tool monitors an electronic system in a mobile machine during a test drive of the mobile machine. The test drive script includes an ordered sequence of drive cycle procedures. The ordered sequence of drive cycle procedures begins with an initial drive cycle procedure and ends with a final drive cycle procedure. Each drive cycle procedure is indicative of a respective mobile machine state. The test drive script includes a first particular drive cycle procedure associated with both a first mobile machine state and a first condition pertaining to the first particular mobile machine state.

As an example, determining the test drive script can include a processor determining one or more identifiers associated with a test drive script within the test drive script map 194, and then determining a test drive script associated with one or more identifiers, such as a test drive script identified within the test drive script map 194. In accordance with this example, the one or more identifiers can include a DTC. In some cases, the processor 102 can determine the DTC from a vehicle data message the vehicle 412 sends to the tool 100. In some other cases, the processor 102 can determine the DTC from a GUI, such as the GUI 602 shown in 19.

In accordance with at least some implementations, the first particular drive cycle procedure is the initial drive cycle procedure. In accordance with at least some other implementations, the first particular drive cycle procedure is the final drive cycle procedure. In accordance with still at least some other implementations, the first particular drive cycle procedure is a drive cycle procedure after the initial drive cycle procedure and before the final drive cycle procedure.

Next, block 502 includes outputting a representation of at least a portion of the test drive script (or more simply, TDS representation). Outputting the TDS representation can include the processor 102 outputting the TDS representation to the user interface 108. In at least some implementations, outputting the TDS representation includes the display 116, the aural output device 120, and/or the haptic feedback device 122 outputting the TDS representation. As an example, outputting the TDS representation using the haptic feedback device 122 can include activating the haptic feedback device 122 to produce a first particular output to indicate a success (e.g., a readiness monitor not failing) during a drive cycle procedure, a second particular output to indicate a failure (e.g., a readiness monitor failing) during a drive cycle procedure, a third particular output to indicate when a next drive cycle procedure is beginning or ending, and/or a fourth particular output to indicate an amount of time passed or remaining in a drive cycle procedure currently being performed (e.g., outputting a number of pulses to indicate a same number of minutes remain for the current drive cycle procedure).

In one respect, the TDS representation may include only be a portion of the test drive script due to a size of the test drive script and a size of the display 116. For instance, the display 116 may be limited to displaying up to three drive cycle procedures even though the test drive script includes more than three drive cycle procedures. In another respect, the TDS representation may include only a portion of the test drive script because some other portion of the test drive script is not needed currently. For instance, the TDS representation may include an audible portion indicating a TDS instruction of the test drive script that is to be performed after performance of a previously TDS instruction output by the aural output device 120 has just finished.

Next, block 503 includes determining one or more of: status information corresponding to achieving the first particular mobile machine state or status information corresponding to achieving the first condition pertaining to the first particular mobile machine state. The examples of status information described elsewhere in this description are applicable to the status information of block 503.

Next, block 504 includes outputting one or more of the status information corresponding to achieving the first particular mobile machine state or the status information corresponding to achieving the first condition pertaining to the first particular mobile machine state. Outputting either or both of the aforementioned status information can include the processor 102 providing the status information to the user interface 108. The status information can be displayed within a GUI, such as anyone or more of the GUIs shown in the drawings.

In accordance with a first further implementation that includes performing the set of functions 500, the first condition pertaining to the first particular mobile machine state includes a temporal condition. Determining the status information corresponding to achieving the first particular mobile machine state includes determining first status information. The first status information indicates whether the mobile machine is operating in the first particular mobile machine state. Determining the status information corresponding to achieving the first condition pertaining to the first particular mobile machine state includes determining second status information. The second status information corresponds to achieving the temporal condition.

In at least some instances of the first further implementation that includes performing the set of functions 500, determining the first status information includes the one or more processors determining that the mobile machine is operating in the first particular mobile machine state. Additionally, the second status information indicates one or more of: an amount of time the mobile machine has been operating in the first particular mobile machine state, an amount of additional time the mobile machine is to operate in the first particular mobile machine state, or a minimum amount of time that the mobile machine is to operate in the first particular mobile machine state.

In at least some other instances of the first further implementation that includes performing the set of functions 500, determining, by the one or more processors, that the mobile machine switched to the first particular mobile machine state from an operating state that is not the first particular mobile machine state. Additionally, initiating, by the one or more processors in response to determining that the mobile machine switched to the first particular mobile machine state from the operating state that is not the first particular mobile machine state, a timer for determining the second status information corresponding to achieving the temporal condition.

In at least some still other instances of the first further implementation that includes performing the set of functions 500, the method also includes outputting, by the one or more processors, a request to the electronic system in the mobile machine, and receiving, by the one or more processors in response to the request, a response from the electronic system in the mobile machine. Moreover, the response from the electronic system in the mobile machine includes a parameter identifier (PID) and a parameter value associated with the PID. Additionally, determining the first status information includes the one or more processors determining whether the parameter value associated with the PID exceeds a parameter value threshold associated with the first particular mobile machine state.

In accordance with a second further implementation that includes performing the set of functions 500, the first condition pertaining to the first particular mobile machine state includes a spatial condition. In addition, determining the status information corresponding to achieving the first particular mobile machine state includes determining first status information. Also, the first status information indicates whether the mobile machine is operating in the first particular mobile machine state. Furthermore, determining the status information corresponding to achieving the first condition pertaining to the first particular mobile machine state includes determining second status information. Furthermore still, the second status information corresponds to achieving the spatial condition.

In at least some instances of the second further implementation that includes performing the set of functions 500, determining the first status information includes the one or more processors determining that the mobile machine is operating in the first particular mobile machine state. Also, the second status information indicates one or more of: a distance the mobile machine has travelled while operating in the first particular mobile machine state, a further distance the mobile machine is to travel while operating in the first particular mobile machine state, or a minimum distance that the mobile machine is to travel while operating in the first particular mobile machine state.

In at least some still other instances of the second further implementation that includes performing the set of functions 500, the method includes determining, by the one or more processors, that the mobile machine switched to the first particular mobile machine state from an operating state that is not the first particular mobile machine state. Additionally, the method includes initiating, by the one or more processors in response to determining that the mobile machine switched to the first particular mobile machine state from the operating state that is not the first particular mobile machine state, an odometer for determining the second status information corresponding to achieving the spatial condition.

In at least some still other instances of the second further implementation that includes performing the set of functions 500, the method further comprises outputting, by the one or more processors, a request to the electronic system in the mobile machine. The method also includes receiving, by the one or more processors in response to the request, a response from the electronic system in the mobile machine. In addition, the response from the electronic system in the mobile machine includes a PID and a parameter value associated with the PID. Furthermore, determining the first status information includes the one or more processors determining whether the parameter value associated with the PID exceeds a parameter value threshold associated with the first particular mobile machine state.

In accordance with a third further implementation that includes performing the set of functions 500, the method further includes determining, by the one or more processors, a speed of the mobile machine. The method also includes determining, by the one or more processors, whether the speed of the mobile machine exceeds a threshold speed. In accordance with this implementation, a mode of outputting the status information is conditioned on whether the speed of the mobile machine exceeds the threshold speed. In one respect, the mode of outputting the status information is a restricted mode if the speed of the mobile machine exceeds the threshold speed. In another respect, the mode of outputting the status information is an unrestricted mode if the speed of the mobile machine does not exceed the threshold speed.

In accordance with a fourth further implementation that includes performing the set of functions 500, the test drive script includes a second particular drive cycle procedure associated with both a second particular mobile machine state and a second condition pertaining to the second particular mobile machine state. Moreover, the method for this implementation further includes determining, by the one or more processors, the first particular drive cycle procedure has ended, and outputting, by the one or more processors, in response to determining the first particular drive cycle procedure has ended, an indication that the second particular drive cycle procedure is a current drive cycle procedure to be performed. In at least some instances of the third further implementation, the first particular drive cycle procedure is the initial drive cycle procedure or the second particular drive cycle procedure is the final drive cycle procedure.

In accordance with a fifth further implementation that includes performing the set of functions 500, the test drive script is associated with a trouble code that was set active by the electronic system in the mobile machine, and outputting the representation of at least a portion of the test drive script includes displaying, on a display of the tool, a representation of the first particular drive cycle procedure. Moreover, the method for this implementation further includes displaying, on the display of the tool, a status indicator associated with a parameter identifier (PID) that the electronic system in the mobile machine is configured to output, and a status indicator associated with a readiness monitor that the electronic system in the mobile machine is configured to check for being in a ready state. Both the PID and the readiness monitor can be associated with the trouble code.

In at least some cases, the method of the fifth further implementation includes receiving, by the one or more processors, a first parameter value. The first parameter value is output by the electronic system in the mobile machine and is associated with the PID. The method also includes determining, by the one or more processors, whether the first parameter value is within a range of parameter values defined for the both the PID and the first particular drive cycle procedure. In one respect, if the one or more processors determine the first parameter value is within the range of parameter values, then displaying the status indicator for the PID includes displaying the PID, the first parameter value associated with the PID, and an indication the first parameter value associated with the PID is within the range of parameter values. In another respect, if the one or more processors determine the first parameter value is not within the range of parameter values, then displaying status indictor for the PID includes displaying the PID, the first parameter value associated with the PID, and an indication the first parameter value associated with the PID is not within the range of parameter values. The indication the first parameter value associated with the PID is within the range of parameter values is different than the indication the first parameter value associated with the PID is not within the range of parameter values.

In accordance with a sixth further implementation that includes performing the set of functions 500, the first particular mobile machine state includes a thermal state of a mobile machine component. Moreover, determining the status information corresponding to achieving one or both of the first particular mobile machine state and the first condition pertaining to the first particular mobile machine state includes determining a temperature pertaining to the mobile machine component. Also, outputting the status information corresponding to achieving one or both of the first particular mobile machine state and the first condition pertaining to the first particular mobile machine state includes outputting the temperature pertaining to the mobile machine component.

In accordance with a seventh further implementation that includes performing the set of functions 500, the method also includes outputting, by the one or more processors to the electronic system in the mobile machine before performance of the initial drive cycle procedure, a first message requesting the electronic system in the mobile machine to clear all trouble codes set by the electronic system in the mobile machine. Furthermore, the method includes receiving, by the one or more processors from the electronic system in the mobile machine in response to outputting the first message, a second message indicating a status of the electronic system in the mobile machine clearing trouble codes set by the electronic system in the mobile machine. Furthermore still, the method includes outputting, by the one or more processors, data indicating the status of the electronic system in the mobile machine clearing trouble codes set by the electronic system in the mobile machine.

In accordance with an eighth further implementation that includes performing the set of functions 500, the test drive script is associated with a readiness monitor the electronic system in the mobile machine is configured to check for being in a ready state. In addition, determining the status information corresponding to achieving the first particular mobile machine state includes the one or more processors determining the readiness monitor is in a ready state. Moreover, outputting the status information corresponding to achieving the first particular mobile machine state includes outputting an indication the readiness monitor is in a ready status so as notify a driver of the mobile machine the test drive of the mobile machine can be ended.

In at least some instances of the eighth further implementation that includes performing the set of functions 500, outputting the indication the readiness monitor is in a ready status occurs before completion of the final drive cycle procedure.

In accordance with a ninth further implementation that includes performing the set of functions 500, the test drive script is associated with a readiness monitor the electronic system in the mobile machine is configured to check for being in a ready state. Moreover, the readiness monitor is associated with a trouble code the electronic system in the mobile machine is configured to set active. Furthermore, determining the status information corresponding to achieving the first particular mobile machine state includes the one or more processors determining the electronic system in the mobile machine has set the trouble code active prior to the final drive cycle procedure being completed. Furthermore still, outputting the status information corresponding to achieving the first particular mobile machine state includes outputting an indication the electronic system in the mobile machine has set the trouble code active so as to notify a driver of the mobile machine the test drive of the mobile machine can be ended before completion of the final drive cycle procedure.

In accordance with a tenth further implementation that includes performing the set of functions 500, the first particular drive cycle procedure is the initial drive cycle procedure, the final drive cycle procedure, or an intermediate drive cycle procedure between the initial drive cycle procedure and the final drive cycle procedure.

In accordance with an eleventh further implementation that includes performing the set of functions 500, the one or more processors include: one or more processors located within the tool, one or more processors located within a server operatively connected to the tool, or one or more processors located within the tool and one or more processors located within the server operatively connected to the tool.

In accordance with a twelfth further implementation that includes performing the set of functions 500, outputting the representation of at least a portion of the test drive script and outputting one or more of: the status information corresponding to achieving the first particular mobile machine state or the status information corresponding to achieving the first condition pertaining to the first particular mobile machine state includes displaying, on a display, a graphical user interface that includes: the representation of at least a portion of the test drive script, the status information corresponding to achieving the first particular mobile machine state, and/or the status information corresponding to achieving the first condition pertaining to the first particular mobile machine state.

In accordance with a thirteenth further implementation that includes performing the set of functions 500, outputting the representation of at least a portion of the test drive script and outputting one or more of: the status information corresponding to achieving the first particular mobile machine state or the status information corresponding to achieving the first condition pertaining to the first particular mobile machine state includes outputting, using one or more speakers, audible sounds that indicate the representation of at least a portion of the test drive script, the status information corresponding to achieving the first particular mobile machine state, and/or the status information corresponding to achieving the first condition pertaining to the first particular mobile machine state.

In accordance with a fourteenth further implementation that includes performing the set of functions 500, the method includes determining, by the one or more processors, the mobile machine is a particular type of mobile machine. The method also includes determining, by the one or more processors, the tool is operating in a diagnostic mode. The method also includes displaying, on a display of the tool after determining the tool is operating in the diagnostic mode, a first GUI. The first GUI includes an indication that the tool is operating in the diagnostic mode. Moreover, the method includes determining, by the one or more processors, the tool changes from operating in the diagnostic mode to operating in a repair mode. Additionally, the method includes displaying, on the display of the tool after both displaying the first GUI and determining the tool changes from operating in the diagnostic mode to operating in the repair mode, a second GUI. The second GUI includes an indication that the tool is operating in the repair mode. The method also includes determining, by the one or more processors, the tool changes from operating in the repair mode to operating in a test drive mode. Furthermore, the method includes displaying, on the display after both displaying the second GUI and determining the tool changes from operating in the repair mode to operating in the test drive mode, a third GUI. The third GUI includes an indication that the tool is operating in the test drive mode, the representation of at least a portion of the test drive script, and one or more of: the status information corresponding to achieving the first particular mobile machine state or the status information corresponding to achieving the first condition pertaining to the first particular mobile machine state. Furthermore still, the method includes determining, by the one or more processors, the tool changes from operating in the test drive mode to operating in a post-repair report mode. Yet even further, the method includes displaying, on the display after both displaying the third GUI and determining the tool changes from operating in the test drive mode to operating in the post-repair report mode, a fourth GUI. The fourth GUI includes an indication that the tool is operating in the post-repair report mode. The first GUI, the second GUI, the third GUI, and the fourth GUI include information corresponding to particular type of mobile machine.

In accordance with a fifteenth further implementation that includes performing the set of functions 500, outputting one or more of: the status information corresponding to achieving the first particular mobile machine state or the status information corresponding to achieving the first condition pertaining to the first particular mobile machine state includes transmitting, by the tool, a data message including a request for an electronic control unit in the mobile machine to activate a haptic feedback component of the mobile machine with a particular signature correlated with the status information corresponding to achieving the first particular mobile machine state or the status information corresponding to achieving the first condition pertaining to the first particular mobile machine state. An advantage of providing haptic feedback using the haptic feedback component of the mobile machine is that a separate wearable haptic feedback device is not necessary for this implementation. Furthermore, providing haptic feedback via the haptic feedback component of the mobile machine or a wearable haptic feedback device during a test drive is beneficial because the haptic feedback does not require the driver to take his/her eyes off the road nor worry about noisy audible conditions during the test drive, such as audible noise from other mobile machines in proximity to the mobile machine, interfering with the either status information is output in an audible form.

In accordance with a sixteenth further implementation that includes performing the set of functions 500, outputting one or more of: the status information corresponding to achieving the first particular mobile machine state or the status information corresponding to achieving the first condition pertaining to the first particular mobile machine state includes transmitting, by the tool to a wearable haptic feedback device, a signal indicative of a request for the wearable haptic feedback device to activate a haptic feedback component with a particular signature correlated with the status information corresponding to achieving the first particular mobile machine state or the status information corresponding to achieving the first condition pertaining to the first particular mobile machine state.

IV. Example Graphical User Interfaces

Next, FIG. 18 to FIG. 33 show example graphical user interfaces (GUIs) 600 to 630. One or more of the GUIs in FIG. 18 to FIG. 33 can include a natural user interface (NUI) that includes one or more user interface elements that operate, in combination with another user interface component and a processor, using voice recognition, motion detection, gesture detection, and/or aural outputs. In one respect, the processor 102 is configured to output the GUIs 600 to 630 to the display 116. The display 116 is configured to display the GUIs 600 to 630. One or more of the GUIs 600 to 630 can include a user-selectable control (USC). The processor 102 is configured to detect selection of a USC and cause one or more functions to be performed in response to determining the USC has been selected. Selection of a USC can occur using the input device 118. For instance, a USC can be selected using a push button key of the input device 118 or by touching the display 116 configured as a touch screen display. In another respect, the processor 256 is configured to output the GUIs 600 to 630 to the network 252 for transmission in turn to a tool, such as the tool 100.

Each of GUIs 600 to 630 includes a GUI description 650. The GUI description 650 provides an indication of a theme of the GUI including that GUI description 650. Examples of the GUI theme are provided below when discussing particular GUIs. Each of the GUIs 600 to 630 also includes a vehicle identifier 666. As shown in FIG. 18, the vehicle identifier 666 uses the text "No Active Vehicle" to indicate that neither a vehicle type nor a particular vehicle has been selected. Other text or symbols could be used to make the same indication. As shown in FIG. 19 to FIG. 33, the vehicle identifier 666 indicates a type of vehicle selected for servicing using the tool 100. In at least some implementations, the vehicle identifier 666 can indicate a particular vehicle of the type of vehicle selected for servicing using the tool 100.

Each of the GUIs 600 to 630 also includes indicator 668 and indicator 670 to indicate a hardware status pertaining to the tool 100. As an example, the indicator 668 indicates whether or not the transceiver 106 is connected to a wireless communication network, such as a wireless vehicle network or a wireless non-vehicle network. As another example, the indicator 670 indicates whether or not the transceiver 106 is connected to a wired communication network, such as a wired vehicle network or a wired non-vehicle network. In at least some implementations, a backslash 672 through the indicator 668 indicates the tool 100 is not connected to a wireless communication network, and absence of the backslash 672 through the indicator 668 indicates the tool 100 is connected to a wireless communication network. Similarly, a backslash 674 through the indicator 670 indicates the tool 100 is not connected to a wired communication network, and absence of the backslash 674 through the indicator 670 indicates the tool 100 is connected to a wired communication network.

The GUIs 600 to 630 include some common GUI USCs. Those common USC include a back USC 652. In response to determining the back USC 652 is selected, the processor 102 can cause the display 116 to display a GUI that was displayed immediately prior to displaying the GUI which contained the back USC 652 that was selected. The back USC 652 can include an indicator indicative of the function performed upon and/or in response to selection of the back USC 652. As an example, the indicator can include text, such as "Back" or "Exit", and/or a symbol such as an arrow.

The common GUI USCs also include a home-screen USC 654. In response to determining the home-screen USC 654 is selected, the processor 102 can cause the display 116 to display a home-screen GUI instead of displaying the GUI which contained the home-screen USC 654 that was selected.

The common GUI USCs also include an expand menu USC 658. In response to determining the expand menu USC 658 is selected, the processor 102 is configured to display a menu in an expanded mode if a menu is currently available for a current displayed GUI and is not currently expanded. The common GUI USCs also include a contract menu USC 656. In response to determining the contract menu USC 656 is selected, the processor 102 is configured to display a menu in a contracted mode if a menu is currently available for a currently displayed GUI and is currently expanded.

The common GUI USCs also include a technical service bulletin (TSB) USC 660. In response to determining the TSB USC 660 is selected, the processor 102 is configured to search for and/or request TSBs regarding an identified vehicle type or particular vehicle. In at least some implementations, the TSB USC 660 is un-selectable if no vehicle has been identified and/or if no TSB regarding the identified vehicle type or particular vehicle is available. The processor 102 can cause the request for TSBs to be sent over the network 252 to the server 254. The server 254 can search the memory 260 for TSB(s) to return to the tool 100 in response to the request for TSBs.

The common GUI USCs also include a change vehicle USC 662. The change vehicle USC 662 is selectable to display a U/I screen with a vehicle selection data 134 for entering one or more identifiers of a type of vehicle and/or one or more identifiers of a particular vehicle. For instance, the processor 102 may cause the display 116 to display the GUI 600 in response to determining the change vehicle USC 662 has been selected.

The common GUI USCs also include a view record USC 664. In some implementations, the view record USC 664 is un-selectable if a particular vehicle has not yet been identified and/or if a vehicle record regarding the identified particular vehicle is not available. A vehicle record regarding an identified particular vehicle can indicate information regarding prior instances of servicing the identified particular vehicle. The processor 102 may need identifiers beyond a year, make, and mode of a vehicle to identify a particular vehicle. As an example, the additional identifiers can include a customer name, a complete VIN, a license plate number, among others additional identifiers.

The GUI 600 can include a cursor 676 movable to point to a USC or another item of the GUI 600. The processor 102 can detect the USC or the other item of the GUI 600 is selected when the cursor 676 is disposed on the USC or the other item of the GUI 600. A GUI shown in FIG. 19 to FIG. 33 can also include a cursor, similar to the cursor 676, for use in selecting an item of that GUI. For implementations in which the display 116 includes a touch screen display, the GUIs shown in FIG. 18 to FIG. 33 may or may not include a cursor.

Next, FIG. 18, in particular, shows the GUI description 650 indicates that the GUI 600 pertains to selecting a vehicle type or a particular vehicle. As shown in FIG. 18, the GUI 600 includes a year selection menu 680 in which a year selector 692 representing the year 2014 has been selected. The GUI 600 includes a make selection menu 682 in which a make selector 694 representing the make Chevrolet has been selected. The GUI 600 includes a model selection menu 684 in which a model selector 696 representing the model Tahoe has been selected. The year selection menu 680 includes a scroll bar 686 to cause the year selection menu 680 to display year(s) not currently shown in the year selection menu 680. Similarly, the make selection menu 682 includes a scroll bar 688 to cause the make selection menu 682 to display make(s) not currently shown in the make selection menu 682. Likewise, the model selection menu 684 includes a scroll bar 690 to cause the model selection menu 684 to display model(s) not currently shown in the model selection menu 684.

In at least some implementations, the make selection menu 682 is populated with vehicle makes after a year is selected from the year selection menu 680. Similarly, in at least some implementations, the model selection menu 684 is populated with vehicle models after a year is selected from the year selection menu 680 and after a make is selected from the make selection menu 682. In alternative embodiments, the year selection menu 680 is in a GUI without the make selection menu 682 and without the model selection menu 684, and the make selection menu 682 is in a GUI without the year selection menu 680 and without the model selection menu 684, and the model selection menu 684 is in a GUI without the year selection menu 680 and without the make selection menu 682.

In at least some implementations, the GUI 600 or a separate GUI includes feature selection menus to select other characteristics of a vehicle type or a particular vehicle being selected. As an example, the other characteristics of the vehicle type can include a drive type (e.g., 2-wheel drive (2WD), 4-wheel drive (4WD) or all-wheel drive (AWD)), an engine displacement (e.g., 3.8 liters (L) or 5.7 L), or a transmission type (e.g., automatic, automatic with overdrive, 3-speed manual, or 4-speed manual).

In still other implementations, the other characteristics of the vehicle type can be selected using a previous USC 691, a Yes USC 693, and a next USC 695. After selecting a set of characteristics, such as a year, make, and model, the GUI 600 can display a vehicle type identifier 689, such as 2014 Chevrolet Tahoe (4WD), where "4WD" is a supplemental characteristic that can be selected by use of the Yes USC 693. The previous USC 691 can be used to cause the GUI 600 to display a different vehicle type identifier, such as 2014 Chevrolet Tahoe (2WD) and the next USC 695 can be used to cause the GUI 600 to display yet a different vehicle type identifier, such as 2014 Chevrolet Tahoe (AWD). Selecting the previous USC 691 or the next USC 695 can cause the vehicle type identifier 689 to change to the different vehicle type identifier.

The GUI 600 also includes a VIN USC 678 for entering an identifier of a particular vehicle. As an example, the VIN USC 678 can be used to type or key-in a vehicle identification number (VIN) associated with the particular vehicle. As another example, the VIN USC 678 can be used to cause the vehicle communications transceiver 152 to request a VIN from an ECU in the vehicle 412. The processor 102 can receive the requested VIN and determine at least a year, make, model, and a serial number of the particular vehicle from the VIN.

The GUI 600 includes a vehicle selector USC 677 for capturing a visual indication of a particular vehicle. As an example, in response to selection of the vehicle selector USC 677, the processor 102 can cause the camera 98 to capture an image, such as an image of a code 681 representing a VIN, and to cause a GUI, such as the GUI or a different GUI, to display a window 679 showing the image of code 681 and to display a representation of the alpha-numeric representation of the VIN 683 as determined by the processor 102 decoding the code 681. As yet another example, in response to selection of the vehicle selector USC 677, the processor 102 can cause the scanner 154 to generate an image, such as an image of the code 681, and to cause a GUI, such as the GUI or a different GUI, to display the window 679 showing the image of the code 681 and to display a representation of the alpha-numeric representation of the VIN 683 as determined by the processor 102 decoding the code 681. In at least some implementations, the processor 102 can display the window 679 on a different GUI.

Next, FIG. 19 shows the GUI 602. The GUI description 650 indicates that the GUI 602 pertains to selecting a test drive script. As shown in FIG. 19, the GUI 602 includes a symptom selection menu 700. In at least some implementations, the symptom selection menu 700 includes one or more vehicle system selectors, such as the vehicle system selector 702. As an example, the vehicle system selector 702 can represent an engine system. The GUI 602 also includes one or more component selectors, such as the component selector 704. As an example, the component selector 704 can represent a component of the engine system such as an oxygen sensor. The GUI 602 also includes one or more DTC selectors, such as the DTC selector 706. As an example, the DTC selector can represent a P0171 DTC representative of an engine system fault in which an exhaust bank is emitting exhaust that indicates the engine is running lean.

FIG. 19 also shows that the GUI 602 can include a complaint USC 708 for entering a customer complaint regarding a type of vehicle or a particular vehicle. As an example, the complaint USC 708 can be used to type or key-in a customer complaint regarding the particular vehicle. As an example, a customer complaint entered via the complaint USC 708 can indicate "vehicle failed emissions testing." In accordance with this example, the processor 102 can refer to the test drive script map 194 shown in FIG. 11 to determine a test drive script for the vehicle type or a particular vehicle and the customer complaint, such as the test drive script 52 for vehicle type A, engine system (since the complaint pertains to engine emissions), and all components (since the complaint doesn't identify any particular component). The GUI 602 includes an OK USC 710 to indicate approval of the system/component/DTC or customer complaint. The GUI 602 includes a Cancel USC 712. The Cancel USC 712 can be used to clear out any selections previously made via the GUI 602.

Figure 20:
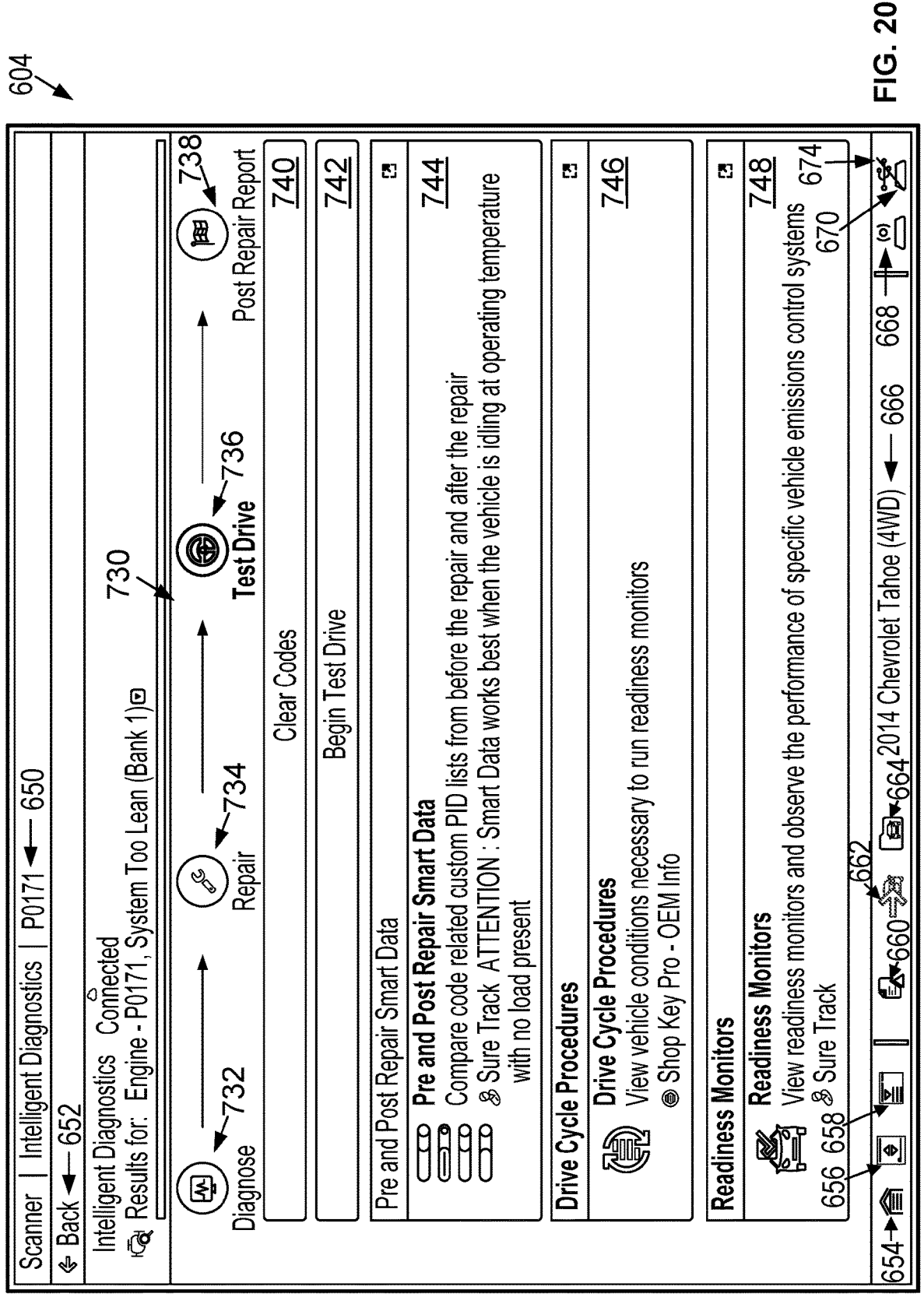

Next, FIG. 20 shows the GUI 604. As an example, the GUI description 650 in FIG. 20, as well as in FIG. 21 to FIG. 33, indicates that the GUI is for performing intelligent diagnostics with respect to a symptom (e.g., a DTC) using a scanner mode of the tool 100 (e.g., a mode in which the processor 102, 256 is configured to perform a vehicle scanner function from among the vehicle scanner functions 136). Alternatively, the GUI description 650 in any one or more of the GUIs shown in FIG. 20 to FIG. 33 can indicate a different GUI theme while the other content of any one of those GUI is displayed on the display 116. In at least some implementations, performing intelligent diagnostics can include the processor 102, 236 searching the diagnosis and repair data 144 to determine data to populate within a GUI shown in FIG. 20 to FIG. 33 to so as to guide a user in servicing a vehicle.

The GUI 604, as well each of the GUIs numbered between and including GUI 606 and GUI 630, includes a set of vehicle service mode indicators 730 including four vehicle service mode indicators. The set of vehicle service mode indicators 730 includes a first vehicle service mode indicator 732 indicative of a diagnose service mode, a second vehicle service mode indicator 734 indicative of a repair service mode, a third vehicle service mode indicator 736 indicative of a test drive service mode, and a fourth vehicle service mode indicator 738 indicative of a post-repair report service mode (i.e., an after-repair report service mode). In FIG. 20, the third vehicle service mode indicator 736 is highlighted to indicate that the tool 100 is currently operating in the test drive service mode. The third vehicle service mode indicator 736 is also highlighted in FIG. 21 to FIG. 30, whereas the fourth vehicle service mode indicator 738 is highlighted in FIG. 31 to FIG. 33.

The GUI 604 also includes a DTC function USC 740, a begin test drive USC 742, a smart data USC 744, a drive cycle procedure 746 USC, and a monitors USC 748. In response to determining the DTC function USC 740 is selected from the GUI 604, the processor 102 sends a VDM to an ECU in the vehicle 412 with a request to clear DTC within the ECU. In response to determining the begin test drive USC 742 is selected, the processor 102 determines a TDS to be performed for the vehicle type identified by the vehicle identifier 666 and outputs a representation of at least a portion of the determined TDS. In response to determining the smart data USC 744 is selected, the processor 102 outputs a GUI showing pre-repair and post-repair data. The pre-repair data can include data the processor 102 receives from the vehicle while the tool is operating in the diagnose service mode. The post-repair data can include data the processor 102 receives from the vehicle while the tool is operating in the test drive service mode. Example GUIs displaying pre-repair data and post-repair data are shown in FIG. 31 to FIG. 33. In response to determining the drive cycle procedure 746 USC is selected, the processor 102 can output a GUI to show vehicle conditions necessary to run a readiness monitor. In response to determining the monitors USC 748 is selected, the processor 102 can output a GUI to view readiness monitors and observe the performance of specific vehicle emissions control systems.

The GUI description 650 further indicates a DTC P0171. The tool 100 may have determined the DTC P0171 while the tool 100 was operating in the diagnose service mode. For example, during the diagnose service mode, a GUI may include the DTC function USC 740 to request DTC. In response to selecting that version of the DTC function USC 740, the processor 102 sends a VDM to an ECU in the vehicle 412 requesting data indicating which DTC are set in the ECU.

Figure 21:
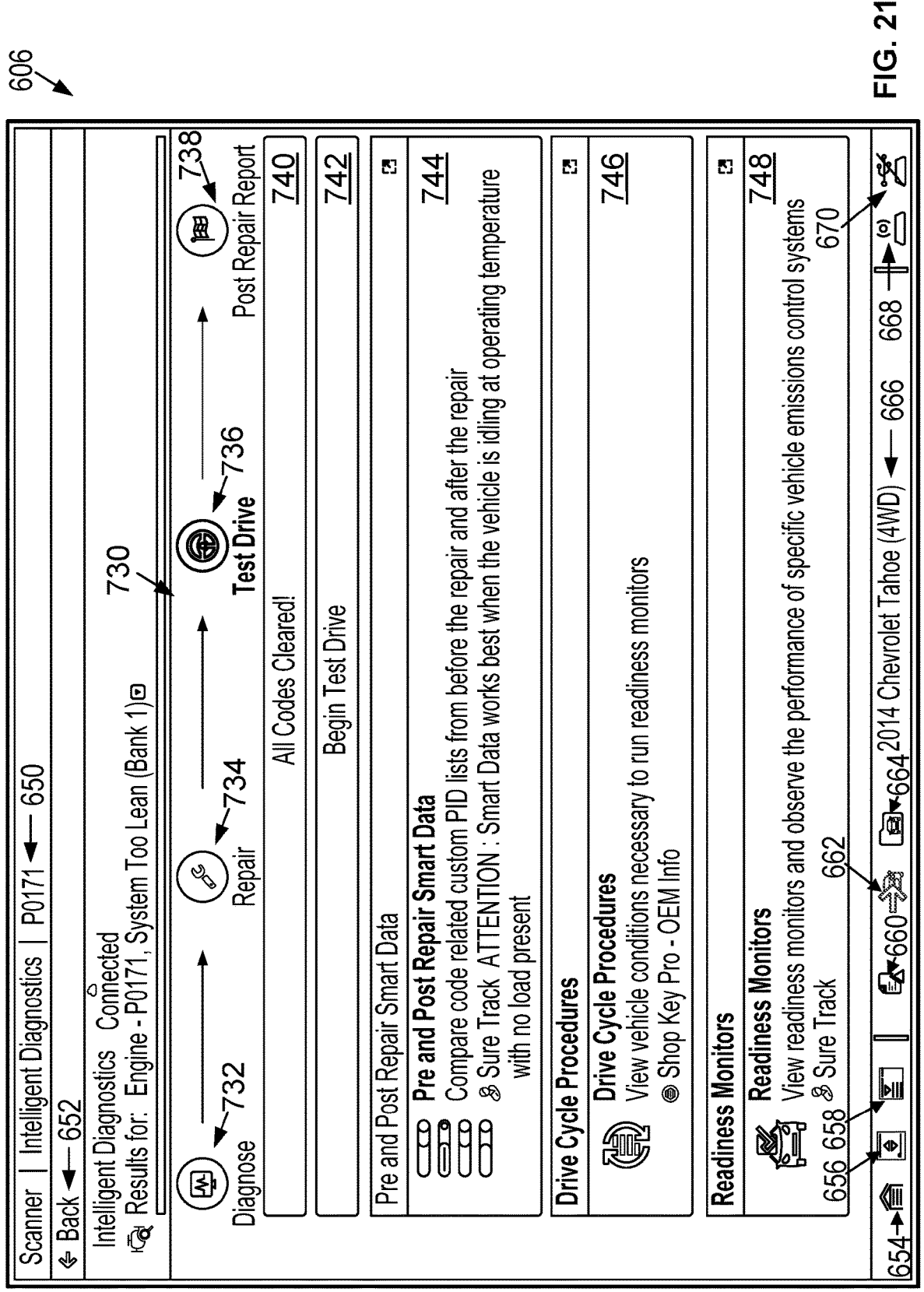

Next, FIG. 21 shows the GUI 606. The GUI 606 is the same as the GUI 604 except that the DTC function USC 740 indicates that all DTC in the ECU have been cleared (i.e., "All codes cleared!"). The GUI 606 can be displayed in response to the processor 102 receiving a VDM (from the ECU that the tool 100 requested clear its codes) indicating all DTC in the ECU have been cleared.

Figure 22:
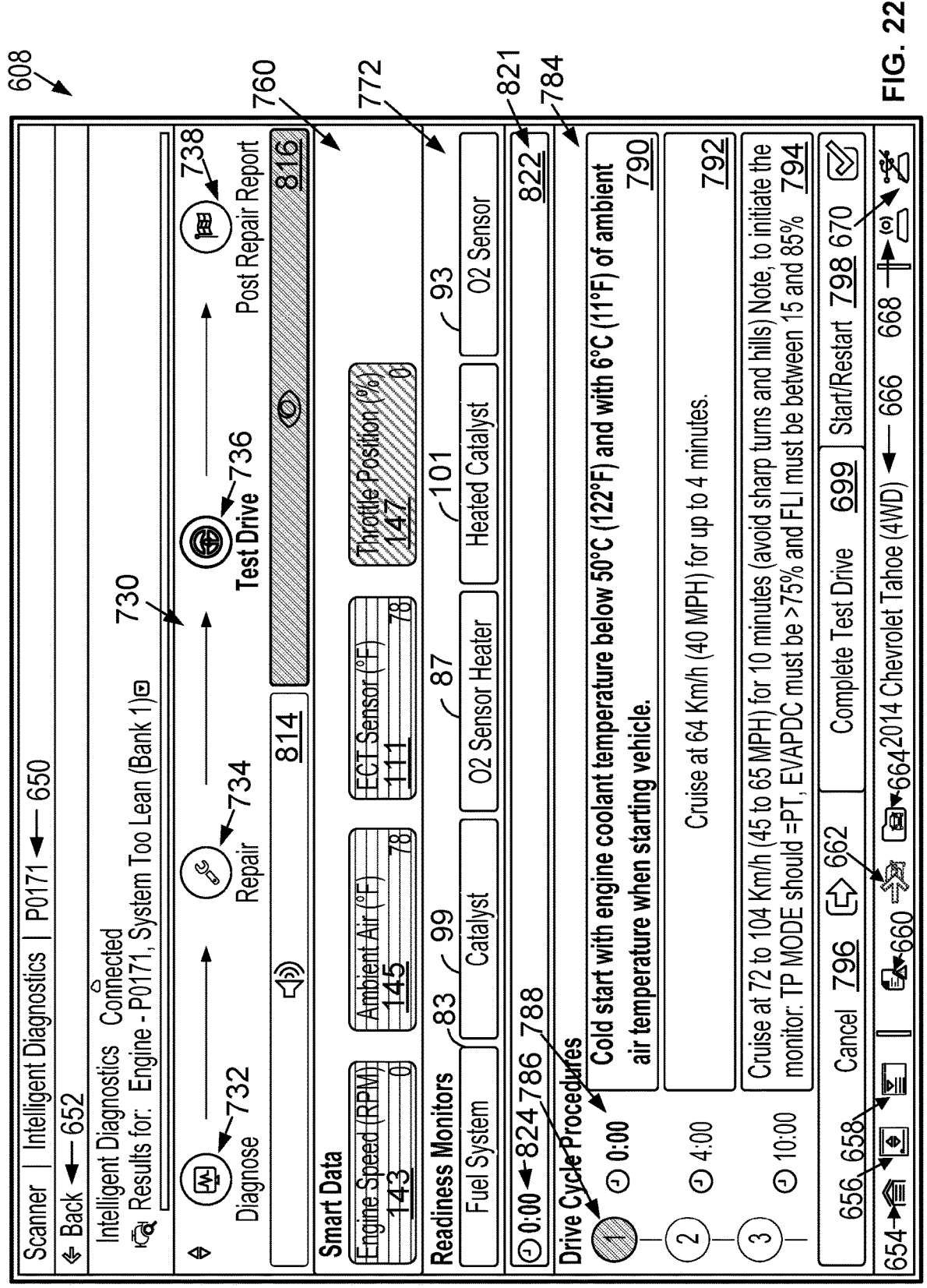

Next, FIG. 22 shows the GUI 608. The GUI 608 includes a parameter display section 760, a readiness monitor display section 772, and a TDS display section 784.

Each parameter display section 760 shown in the drawings includes one or more PID and PID parameter indicators (PPI). Each PPI includes a textual representation of a PID and a parameter indicator associated with the PID. In some cases, a parameter indicator is blank or null to indicate that a parameter associated with the PID has not been received. In other cases, a parameter indicator contains a numeric value. In still other cases, a parameter indicator contains a non-numeric textual value, such as "ON" or "OFF." If applicable, a PPI can include a unit symbol, such as "° F." for degrees Fahrenheit, "° C. for degrees Celsius," "kPa" for kilopascals, "PSI" for pounds per square inch, "V" for volts, "%" for percentage, or "RPM" for revolutions per minute," among unit symbols. Each PPI is displayed using a number of pixels of the display 116. In accordance with the example implementations, the parameter display section 760 contained within any GUI can include any number of PPIs that fit within the parameter display section 760.

In FIG. 22, the parameter display section 760 includes a PPI 143 pertaining to an engine speed PID of the vehicle 412, a PPI 145 pertaining to an ambient air temperature PID of the vehicle 412, a PPI 111 pertaining to an engine coolant temperature PID of the vehicle 412, and a PPI 147 pertaining to a throttle position PID of the vehicle 412. The parameter display section 760 of a GUI can include more or fewer PPIs and/or PPIs pertaining to different PIDs. A processor, such as the processor 102 or 256, can determine which PPI to include within the parameter display section 760 by determining which PIDs are associated with the current drive cycle procedure of the TDS 160 that is being performed and which PPI are associated with those PIDs.

Referring to FIG. 8, the PIDs 311 include four PIDs (i.e., PIDs 61, 77, 78, 79) that are associated with the DCP 1, which is a current DCP to be performed while the GUI 608 is displayed. The PID map 180 shown in FIG. 9 shows that PPIs 143, 145, 111, 147 are associated with PIDs 61, 77, 78, 79, respectively. A processor, such as the processor 102, 256 can populate the GUI 608 with the PPIs 143, 145, 111, 147 after referring to the TDS 160 and the PID map 180.

In the drawings, a PPI with a parameter determined to be within a predetermined range for the associated PID is represented using cross-hatched lines at forty-five degrees with respect to a top to bottom of at least a portion of the PPI, such as the PPI 147 shown in FIG. 22. In the drawings, a PPI with a parameter determined to be outside of the predetermined range for the associated PID is represented using horizontal shade lines from left to right of the PPI, such as the PPI 143 shown in FIG. 22. In at least some implementations, the GUIs can show PPIs with shading to represent different colors to indicate whether the parameter displayed within a particular PPI is within or outside of the predetermined ranged for the associated PID. For instance, a green PPI can indicate the parameter within that PPI is within the predetermined range, and a red PPI can indicate the parameter within that PPI is outside of the predetermined range. A PPI without shading can, but need not necessarily, indicate that a predetermined range or threshold value is not associated with a PID for that PPI and/or that the PID associated with the PPI is not checked by the vehicle to determine whether a readiness monitor passes or fails during a current drive cycle procedure.

In FIG. 22, the readiness monitor display section 772 includes an RMI 83 pertaining to a fuel system monitor of the vehicle 412, an RMI 99 pertaining to a catalyst monitor of the vehicle 412, an RMI 87 pertaining to an oxygen sensor heater monitor of the vehicle 412, an RMI 101 pertaining to a heated catalyst monitor of the vehicle 412, and an RMI 93 pertaining to an oxygen sensor monitor of the vehicle 412. The readiness monitor display section 772 of a GUI can include more or fewer RMIs and/or RMIs pertaining to different combination of monitors. Each RMI is displayed using a number of pixels of the display 116.

Referring to FIG. 8, the monitor IDs 309 include five monitor IDs (i.e., monitor IDs 25, 27, 30, 33, 34) that are associated with the DCP 1, which is a current DCP to be performed while the GUI 608 is displayed. The monitor map 189 shown in FIG. 10 shows that RMIs 83, 99, 87, 101, 93 are associated with monitor IDs 25, 27, 30, 33, 34, respectively. A processor, such as the processor 102, 256 can populate the GUI 608 with the RMIs 83, 99, 87, 101, 93 after referring to the TDS 160 and the monitor map 189.

Each readiness monitor display section 772 shown in the drawings includes one or more readiness monitor indicators (RMI). Each RMI includes a textual representation of a vehicle monitor and a status of the vehicle monitor. As an example, the status of a vehicle monitor can be "not started or on-going," "passed," or "failed." In the drawings, the not started or in process status is represented using an RMI without horizontal shade lines and without cross-hatched lines, such as an RMI 83 shown in FIG. 22. In the drawings, the passed status for an RMI is represented using cross-hatched lines at forty-five degrees with respect to a top to bottom of the RMI, such as the RMI 101 shown in FIG. 24. In the drawings, the failed status of an RMI is represented using horizontal shade lines from left to right of the RMI, such as used in an RMI 83 shown in FIG. 24. In at least some implementations, the GUIs can show RMIs with different colors to indicate whether the monitor status is "not started or on-going," "passed," or "failed." For instance, a white RMI can indicate that the status of a monitor associated with that RMI is not started or on-going. A green RMI can indicate that the status of a monitor associated with that RMI is passed. A red RMI can indicate that the status of a monitor associated with that RMI is failed. In accordance with the example implementations, the readiness monitor display section 772 contained within any GUI can include any number of RMIs that fit within the readiness monitor display section 772.

Each TDS display section 784 in a GUI includes one or more drive cycle procedures. As shown in FIG. 22, the TDS display section 784 includes drive cycle procedures 790, 792, 794. Each DCP is displayed using a number of pixels of the display 116. In at least some implementations, a current DCP procedure to be performed is highlighted in some manner. As shown in FIG. 22, the DCP 790 is highlighted. The TDS display section 784 includes drive cycle procedure numbers 786 and timer displays 788. As shown in FIG. 22, the DCP number and timer associated with the DCP 790 are highlighted to indicate that DCP 790 is the current DCP to be performed. In accordance with the example implementations, the TDS display section 784 contained within any GUI can include any number of DCPs that fit within the TDS display section 784.

Referring to FIG. 8 and FIG. 22, the DCP 790 for DCP 1 includes a TDS instruction that matches the TDS instruction 161 and a timer value that matches the timer value 175. Similarly, the DCP 792 for DCP 2 includes a TDS instruction that matches the TDS instruction 163 and a timer value that matches the timer value 177. Likewise, the DCP 794 for DCP 3 includes a TDS instruction that matches the TDS instruction 165 and a timer value that matches the timer value 179.

The GUI 608 includes a complete test drive script USC 699, a start/restart USC 798, and a cancel USC 796. In at least some implementations, in response to determining the complete test drive script USC 699 is selected, the processor 102 can cause the display 116 to display a GUI in the post-repair report service mode. In some implementation, the complete test drive script USC 699 is active any time while a drive cycle procedure is being performed. In other implementations, the complete test drive script USC 699 is active after a readiness monitor has failed during performance of a test drive script or after all drive cycle procedures of the TDS have been performed. In at least some implementations, the processor 102 can be configured to automatically switch from a GUI showing a drive cycle procedure to a GUI in the post-repair report service mode without requiring a user to select the complete test drive script USC 699.

Additionally, in at least some implementations, in response to determining the start/restart USC 798 is selected, the processor 102, 256 can start an action with respect to the GUI that includes the start/restart USC 798. For example, starting the action include starting or restarting a timer associated with a DCP currently being performed, and/or starting or restarting requesting of PID parameters for a PPI.

Furthermore, in at least some implementations, in response to determining the cancel USC 796 is selected, the processor 102, 256 can stop an action with respect to the GUI that includes the cancel USC 796. For example, stopping the action can include stopping a timer associated with a drive cycle procedure, stopping the request for PID parameter values such that parameter values in a PPI stop changing, and/or switching to a different GUI, such as a GUI that does not show a TDS.

The GUI 610, 612, 614, 618, 620, 622 shown in FIG. 23, 24, 25, 27, 28, 29, respectively, also show the complete test drive script USC 699, the cancel USC 796, and the start/restart USC 798. The description of the complete test drive script USC 699, the cancel USC 796, and the start/restart USC 798 above is applicable to the GUI 610, 612, 614, 618, 620, 622.

The GUI 608 includes an audio mode icon 814 and a visual mode icon 816. In at least some implementations, the audio mode icon 814 is highlighted in some manner if the selected TDS is to be output using the aural output device 120, whereas the visual mode icon 816 is highlighted some manner if the selected TDS is to be output using the display 116. In those or in other implementations, the audio mode icon 814 is configured as an audio mode selection USC and the visual mode icon is configured as a visual mode selection USC. In response to determining the audio mode selection USC is selected while the tool 100 is outputting the TDS using the display 116, a processor, such as the processor 102, 256, is configured to switch the tool 100 to outputting the TDS using the aural output device 120. In response to determining the visual mode selection USC is selected while the tool 100 is outputting the TDS using the aural output device 120, a processor, such as the processor 102, 256, is configured to switch the tool 100 to outputting the TDS using the display 116.

The GUI 608 includes a progress meter 821. In some implementations, the progress meter 821 is configured as a timer bar 822. The timer progress indicator can include a timer value 824 (i.e., a numeric value pertaining to an output of the timer 128, such as an elapsed time since a DCP was initiated and/or an amount of time until the DCP is completed).

Figure 23:
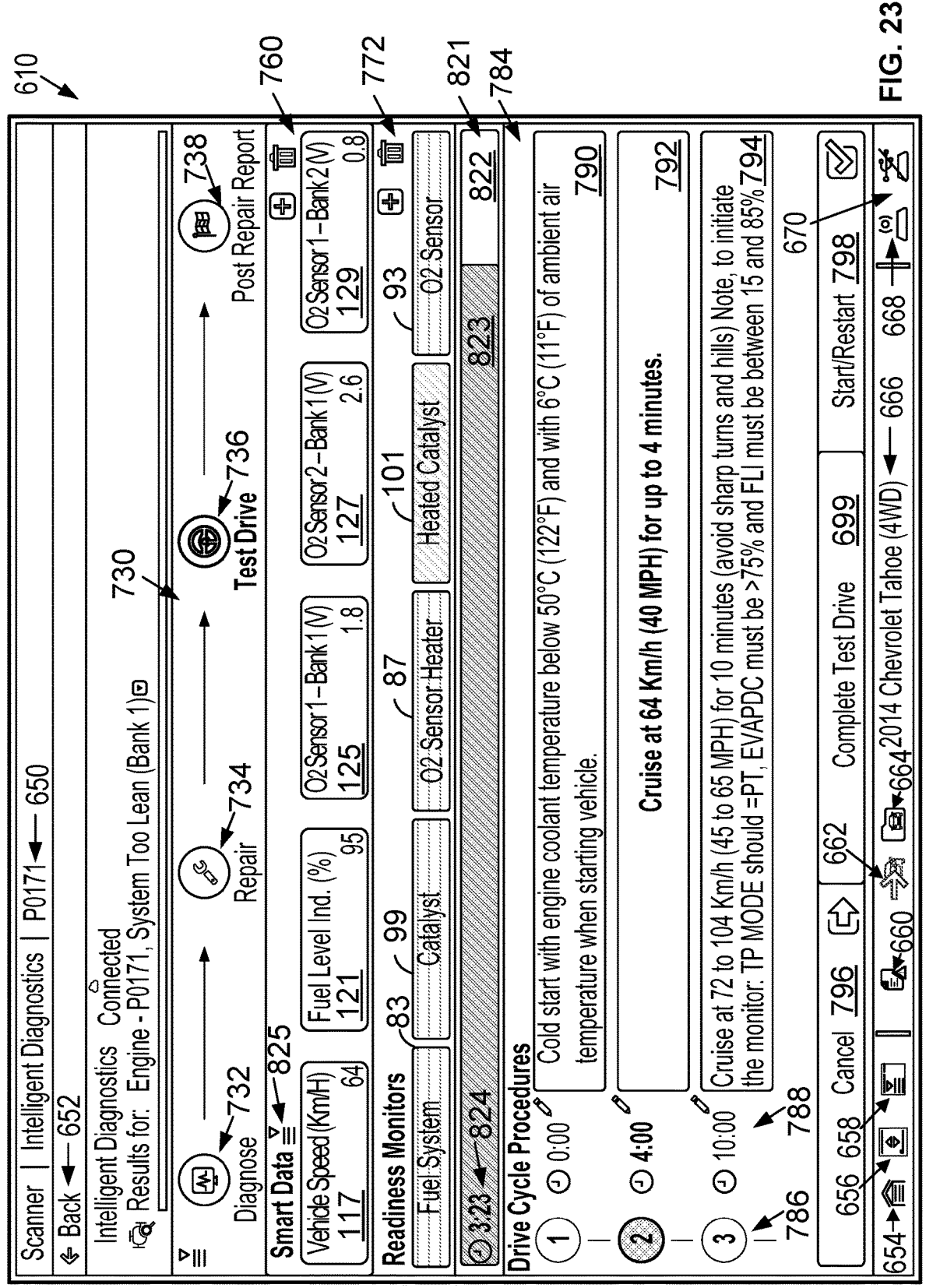

Next, FIG. 23 shows the GUI 610. The GUI 610 includes the parameter display section 760, the readiness monitor display section 772, and the TDS display section 784.

As shown in FIG. 23, the TDS display section 784 includes drive cycle procedures 790, 792, 794, and the DCP 792 is highlighted to indicate that it is a current DCP to be performed. The DCP number and timer associated with the DCP 792 are also highlighted to indicate that it is the current DCP to be performed. In accordance with implementations in which the display 116 changes from displaying the GUI 606 to displaying the GUI 608, FIG. 22 and FIG. 23 thus illustrate an example of two DCP in an ordered sequence of a DCP being performed according to the test drive script that contains those two DCP.

Referring to FIG. 8 and FIG. 23, the DCP 792 for DCP 2 includes a TDS instruction that matches the TDS instruction 163 and a timer value that matches the timer value 177. Similarly, the DCP 792 for DCP 1 includes a TDS instruction that matches the TDS instruction 161 and a timer value that matches the timer value 175. Likewise, the DCP 794 for DCP 3 includes a TDS instruction that matches the TDS instruction 165 and a timer value that matches the timer value 179.

In FIG. 23, the parameter display section 760 includes a PPI 117 pertaining to a vehicle speed of the vehicle 412, a PPI 121 pertaining to a fuel level indicator PID of the vehicle 412, a PPI 125 pertaining to a first oxygen sensor in a first bank of oxygen sensors PID of the vehicle 412, a PPI 127 pertaining to a second oxygen sensor in the first bank of oxygen sensors PID of the vehicle 412, and a PPI 129 pertaining to a first oxygen sensor in a second bank of oxygen sensors PID of the vehicle 412.

The GUI 610 includes an expand display section USC 825 within the parameter display section 760. In response to determining an expand display section USC is selected, a processor, such as the processor 102, 256, can cause the display section to expand such that additional indicators and/or other information is displayed within that display section. For instance, in response to determining the expand display section USC 825 is selected, a processor, such as the processor 102, 256, can cause the parameter display section 760 to expand such that a PPI 131 pertaining to a second oxygen sensor in a second bank of oxygen sensors PID of the vehicle 412, and a PPI 141 pertaining to a catalyst monitor PID of the vehicle 412 are displayed in the parameter display section 760 along with the PPIs shown in FIG. 23. The processor can determine which further PPI(s) to display in the parameter display section 760 by referring to the current DCP being performed within the TDS 160 shown in FIG. 8.

Referring to FIG. 8, the PIDs 313 include seven PIDs (i.e., PIDs 64, 66, 68, 69, 70, 71, 76) that are associated with the DCP 2, which is the current DCP to be performed while the GUI 610 is displayed. The PID map 180 shown in FIG. 9 shows that PPIs 117, 121, 125, 127, 129, 131, 141 are associated with PIDs 64, 66, 68, 69, 70, 71, 76, respectively. A processor, such as the processor 102, 256 can populate the GUI 610 with the PPIs 117, 121, 125, 127, 129 after referring to the TDS 160 and the PID map 180, and with the PPIs 117, 121, 125, 127, 129, 131, 141 after the expand display section USC 825 is selected while the GUI 610 is displayed.

In FIG. 23, similar to the GUI 608 shown in FIG. 22, the readiness monitor display section 772 includes the RMI 83 pertaining to the fuel system monitor of the vehicle 412, the RMI 99 pertaining to the catalyst monitor of the vehicle 412, the RMI 87 pertaining to the oxygen sensor heater monitor of the vehicle 412, the RMI 101 pertaining to the heated catalyst monitor of the vehicle 412, and the RMI 93 pertaining to the oxygen sensor monitor of the vehicle 412. Each RMI is displayed using a number of pixels of the display 116.

Referring to FIG. 8, the monitor IDs 315 include four monitor Ds (i.e., monitor IDs 25, 27, 30, 33) that are associated with the DCP 2, which is a current DCP to be performed while the GUI 610 is displayed. The monitor map 189 shown in FIG. 10 shows that RMIs 83, 99, 87, 93 are associated with monitor IDs 25, 27, 30, 33, respectively. A processor, such as the processor 102, 256 can populate the GUI 610 with the RMIs 83, 99, 87, 93 after referring to the TDS 160 and the monitor map 189. The GUI 610 shows highlighting in the RMIs 83, 99, 87, 93 to indicate the status (such as the failed status) of monitors with the monitor IDs 25, 27, 30, 33.

In at least some implementations, only the monitors associated with the current TDS are displayed in the readiness monitor display section 772. In at least some other implementations, however, the readiness monitor display section 772 displays one or more other RMI(s) besides those associated with the current TDS. The tool 100 may use the latter implementations in order to show the state of an RMI that was tested during a prior DCP of the TDS. For instance, the GUI 610 shows the RMI 101 highlighted to indicate that the heated catalyst monitor within monitor ID 34 performed for DCP 1 has passed. In accordance with the latter implementation, the readiness monitor display section 772 can display RMIs for all monitors to be checked during performance of the TDS.

The GUI 610 includes the audio mode icon 814 and the visual mode icon 816. As shown in FIG. 23, the visual mode icon 816 is highlighted to indicate the selected TDS is to be output using the display 116.

The GUI 610 includes the progress meter 821. In some implementations, the progress meter 821 is configured as a timer bar 822. The timer progress indicator can include a timer value 824 (i.e., a numeric value pertaining to an output of the timer 128, such as an elapsed time since a DCP was initiated and/or an amount of time until the DCP is completed). In FIG. 23, the progress meter 821 also includes an indicator 823 within the timer bar 822 to indicate how far the timer for DCP has progressed (i.e., 3:23 of 4:00). In at least some implementations, the timer value 824 increments one second every second while the DCP 2 is being performed and the indicator 823 fills an additional $1/240^{th}$ portion of the timer bar 822 for every one second while the DCP 2 is being performed.

Figure 24:
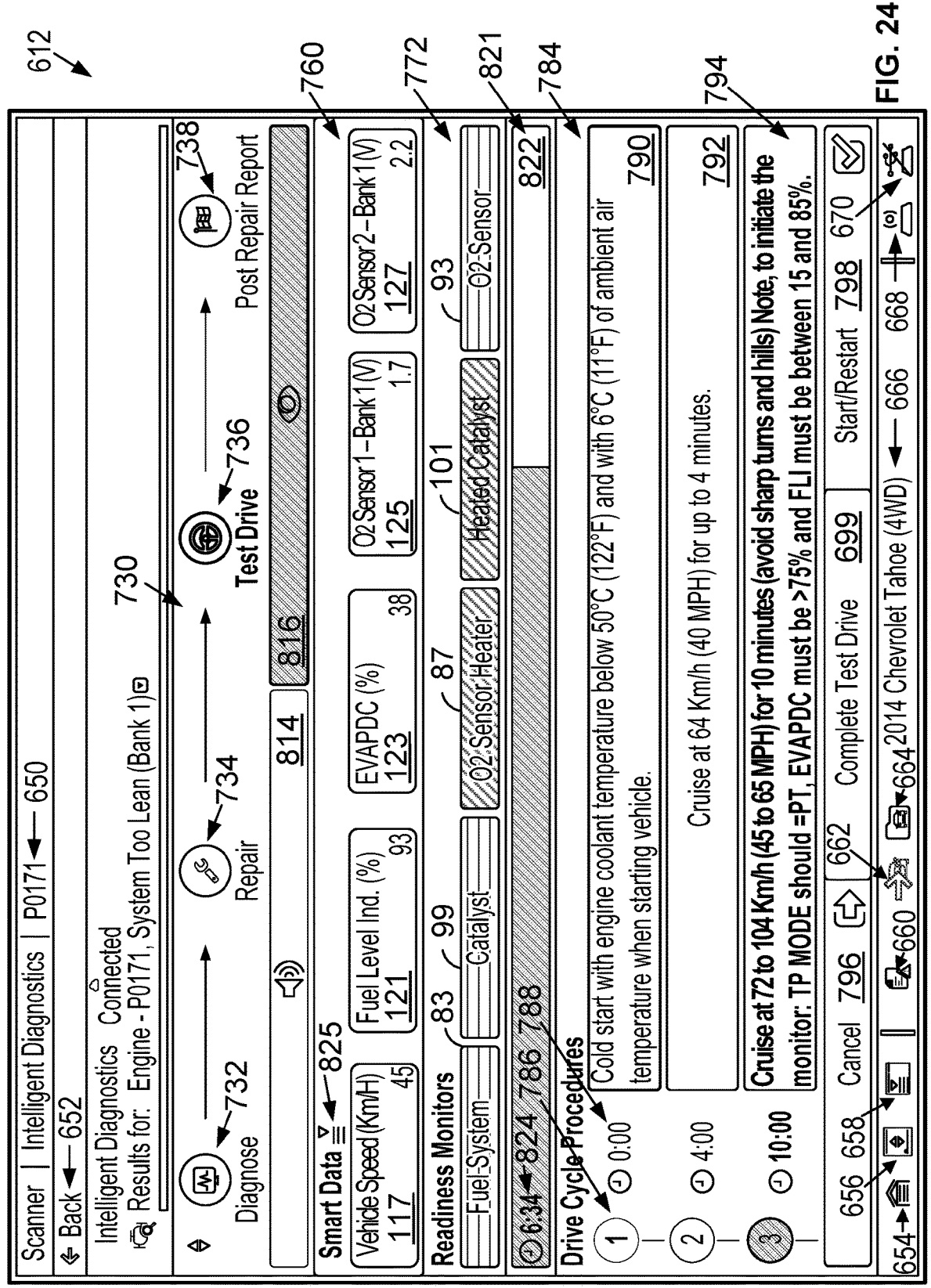

Next, FIG. 24 shows the GUI 612. The GUI 612 includes the parameter display section 760, the readiness monitor display section 772, and the TDS display section 784.

As shown in FIG. 24, the TDS display section 784 includes drive cycle procedures 790, 792, 794, and the DCP 794 is highlighted to indicate that it is a current DCP to be performed. The DCP number and timer associated with the DCP 794 are also highlighted to indicate that it is the current DCP to be performed.

Referring to FIG. 8 and FIG. 24, the DCP 794 for DCP 3 includes a TDS instruction that matches the TDS instruction 165 and a timer value that matches the timer value 179. Similarly, the DCP 792 for DCP 1 includes a TDS instruction that matches the TDS instruction 161 and a timer value that matches the timer value 175. Likewise, the DCP 794 for DCP 2 includes a TDS instruction that matches the TDS instruction 163 and a timer value that matches the timer value 177.

In FIG. 24, the parameter display section 760 includes the PPI 117 pertaining to a vehicle speed of the vehicle 412, the PPI 121 pertaining to a fuel level indicator PID of the vehicle 412, a PPI 123 pertaining to an evaporator emissions purge valve duty cycle PID of the vehicle 412, a PPI 125 pertaining to a first oxygen sensor in a first bank of oxygen sensors PID of the vehicle 412, and the PPI 127 pertaining to a second oxygen sensor in the first bank of oxygen sensors PID of the vehicle 412.

The GUI 612 includes the expand display section USC 825 within the parameter display section 760. In response to determining the expand display section USC 825 is selected from within the GUI 612, a processor, such as the processor 102, 256, can cause the parameter display section 760 to expand such that the PPI 129 pertaining to a first oxygen sensor in the second bank of oxygen sensors PID of the vehicle 412, the PPI 131 pertaining to the second oxygen sensor in the second bank of oxygen sensors PID of the vehicle 412, and the PPI 141 pertaining to the catalyst monitor PID of the vehicle 412 are displayed in the parameter display section 760 along with the PPIs shown in FIG. 24.

Referring to FIG. 8, the PIDs 317 include eight PIDs (i.e., PIDs 64, 66, 67, 68, 69, 70, 71, 76) that are associated with the DCP 3, which is the current DCP to be performed while the GUI 612 is displayed. The PID map 180 shown in FIG. 9 shows that PPIs 117, 121, 123, 125, 127, 129, 131, 141 are associated with PIDs 64, 66, 67, 68, 69, 70, 71, 76, respectively. A processor, such as the processor 102, 256 can populate the GUI 612 with the PPIs 117, 121, 123, 125, 127, 129 after referring to the TDS 160 and the PID map 180, and with the PPIs 117, 121, 123, 125, 127 displayed after the expand display section USC 825 is selected while the GUI 612 is displayed.

In FIG. 24, similar to the GUI 608 shown in FIG. 22, the readiness monitor display section 772 includes the RMI 83 pertaining to the fuel system monitor of the vehicle 412, the RMI 99 pertaining to the catalyst monitor of the vehicle 412, the RMI 87 pertaining to the oxygen sensor heater monitor of the vehicle 412, the RMI 101 pertaining to the heated catalyst monitor of the vehicle 412, and the RMI 93 pertaining to the oxygen sensor monitor of the vehicle 412.

Referring to FIG. 8, the monitor IDs 319 include three monitor IDs (i.e., monitor IDs 25, 30, 33) that are associated with the DCP 3, which is a current DCP to be performed while the GUI 612 is displayed. The monitor map 189 shown in FIG. 10 shows that RMIs 83, 99, 93 are associated with monitor IDs 25, 30, 33, respectively. A processor, such as the processor 102, 256 can populate the GUI 612 with the RMIs 83, 99, 93 after referring to the TDS 160 and the monitor map 189. The GUI 612 shows highlighting in the RMIs 83, 99, 93 to indicate the status (such as the failed status) of monitors with the monitor IDs 25, 30, 33.

Although monitors with monitor IDs 25, 30, 33 are associated with the DCP 3, as indicated previously, the tool 100 may to show the state of an RMI that was tested during a prior DCP of the TDS. In this case shown in FIG. 24, the GUI 614 shows the RMI 87 highlighted to indicate that the oxygen sensor heater monitor with monitor ID 27 performed for DCP 2, and the RMI 101 highlighted to indicate that the heated catalyst monitor with monitor ID 34 performed for DCP 1 have both passed.

The GUI 612 includes the audio mode icon 814 and the visual mode icon 816. As shown in FIG. 24, the visual mode icon 816 is highlighted to indicate the selected TDS is to be output using the display 116.

The GUI 612 includes the progress meter 821. In FIG. 24, the progress meter 821 includes the timer value 824, and the indicator 823 within the timer bar 822 to indicate how far the timer for DCP has progressed (i.e., 6:34 of 10:00). In at least some implementations, the timer value 824 increments one second every second while the DCP 3 is being performed and the indicator 823 fills an additional $1/600^{th}$ portion of the timer bar 822 for every one second while the DCP 3 is being performed.

Figure 25:
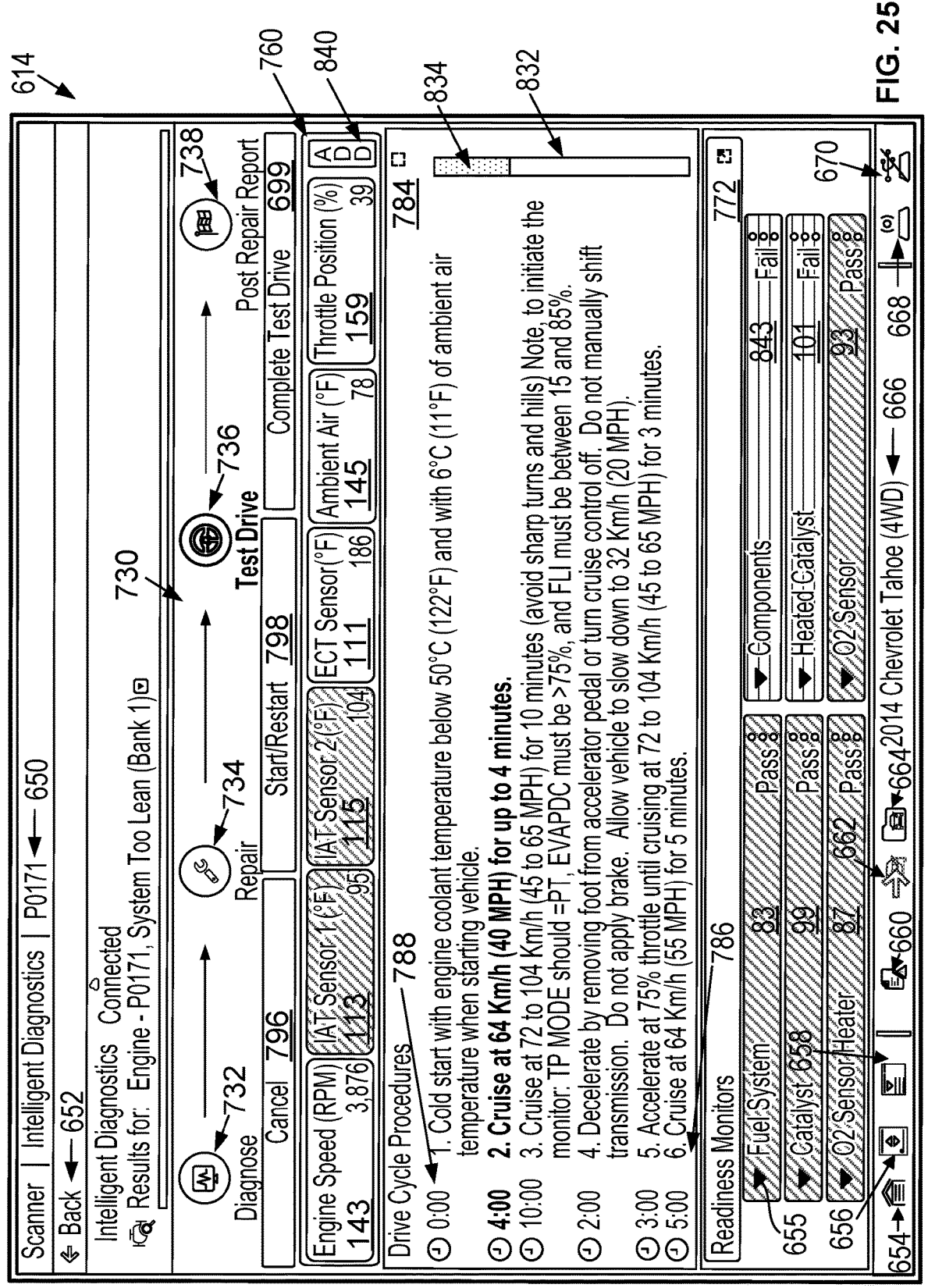
Figure 30:
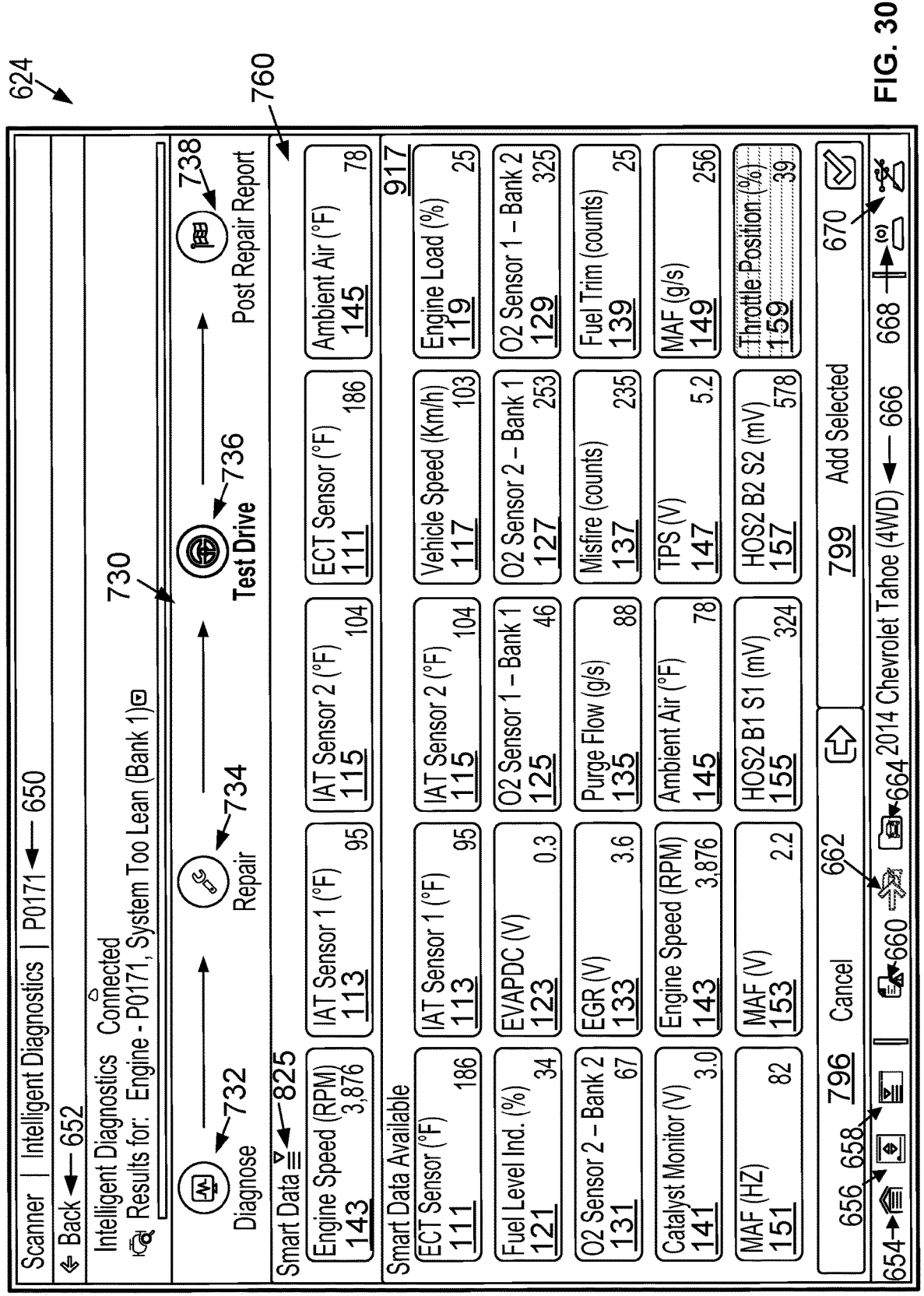

Next, FIG. 25 shows the GUI 614. The GUI 614 includes the parameter display section 760, the readiness monitor display section 772, and the TDS display section 784. The parameter display section 760 includes an add USC 840. In response to selection of the add USC 840, a processor, such as the processor 102, 256, outputs a GUI to allow a user to add one or more PPI to the parameter display section 760. An example of the aforementioned GUI, i.e., GUI 624, is shown in FIG. 30. The PPI 159 shown in FIG. 25 may be shown in the GUI 614 as a result of selecting to add the PPI 159 from the GUI 624.

The TDS display section 784 includes the drive cycle procedure numbers 786, timer displays 788, a scroll bar 832, and a selector 834 within the scroll bar 832. The selector 834 can be moved within the scroll bar 832. In response to determining the selector 834 has been moved, a processor, such as the processor 102, 256, can cause the GUI 614 to display a different combination of drive cycle procedures of a test drive script as compared to a combination of drive cycle procedures from that test drive script that were displayed before the selector 834 was moved. The drive cycle procedure numbers 786 displayed within the TDS display section 784 include DCP 1 to 6. In accordance with at least some implementations, a current drive cycle procedure to be performed is highlighted to assist a user of the tool 100. As shown in FIG. 25, a timer value and TDS instructions for a DCP 2 is highlighted.

In FIG. 25, each of the RMIs within the readiness monitor display section 772 include a graph mode selector, such as a graph mode selector 655 within the RMI 83. The graph mode selector 655 can be used to increase a size of the RMI 83. The display 116 can display the RMI 83, increased in size, such that the RMI 83 includes a graph. The graph mode selectors for other RMIs can also be used to increase a size of the RMI that includes the graph mode selector. For readiness monitor states that can be indicated via only two values, such as pass or fail, a graph in the increased size window can display an indication of the current value associated with the readiness monitory pertaining to the RMI. An RMI can also include a graph mode selector when the RMI is increased in size. Selection of the graph mode selector when an RMI is increased in size can cause the RMI to decrease in size, such as the size of the RMI before the graph mode selector was selected to increase the size of the RMI.

The readiness monitor section 772 includes the RMIs 83, 87, 93, 99, 101, and an RMI 843. The RMI 843 is associated with a comprehensive components readiness monitor that is performed on some vehicles. In at least some implementations, the comprehensive components readiness monitor is performed any time the vehicle is operating and does not require any drive cycle procedure to be performed. Accordingly, the comprehensive components readiness monitor, unlike many other readiness monitors, can cause a DTC to be set and a malfunction indicator lamp to turn on without having to perform a drive cycle procedure.

Figure 26:
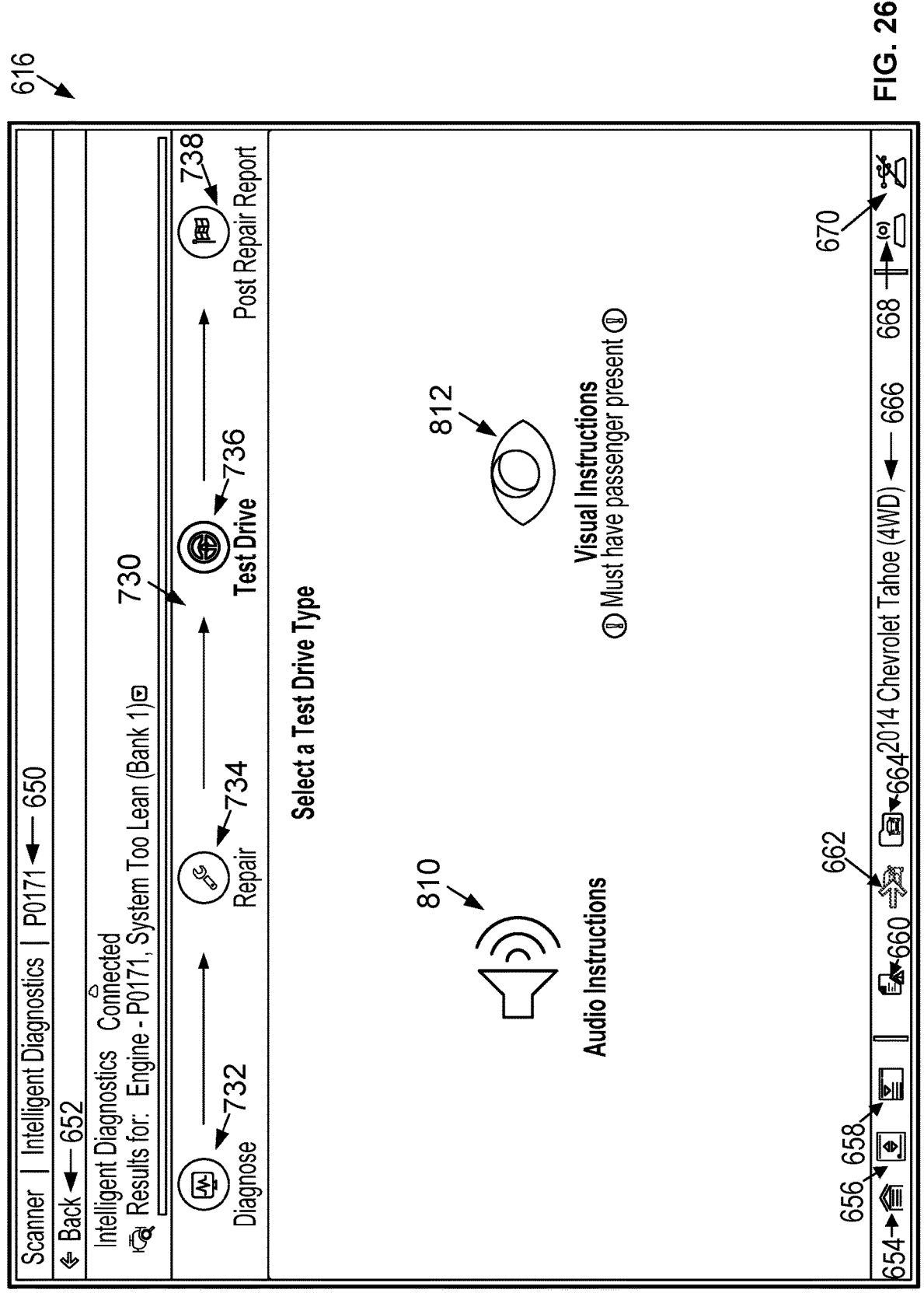

Next, FIG. 26 shows the GUI 616. The GUI 616 includes an audio TDS USC 810 and a visual TDS USC 812. In response to determining the audio TDS USC 810 is selected, the processor 102 switches to a mode in which the processor 102 outputs a representation of at least a portion of a TDS using the aural output device 120. Additionally, the processor 102 can output a GUI with a limited visual representation of the TDS as compared to a fuller visual representation of the TDS that is contained in GUI output in response to determining the visual TDS USC 812 is selected. Each of FIG. 27 to FIG. 29 shows an example GUI with a limited visual representation of the TDS. In response to determining the visual TDS USC 812 is selected, the processor 102 switches to a mode in which the processor 102 outputs a representation of at least a portion of a TDS using the display 116. Each of FIG. 24 to FIG. 26 shows an example GUI with a fuller visual represent description of a test drive script. In at least some implementations, a limited visual representation of the TDS does not include a textual representation of a DCP of that TDS, whereas a fuller visual representation of the TDS includes a textual representation of at least one DCP of the TDS.

Next, FIG. 27 shows the GUI 618. The GUI 618 includes an icon 850 indicative that the tool 100 is operating in a mode in which a TDS and/or a drive cycle procedure of the TDS is output aurally using the aural output device 120. The GUI 618 also includes the audio mode icon 814 and a visual mode icon 816, which are configured as described above. The GUI 618 also includes a begin USC 852 and a cancel USC 854. For at least some implementations, in response to determining the begin USC 852 is selected, the processor 102 aurally outputs a first or a next drive cycle procedure of a TDS. For those or at least some other implementations, in response to determining the cancel USC 854 is selected, the processor 102 the cancels aurally outputting a drive cycle procedure of a TDS and/or the TDS. Moreover, in response to determining the cancel USC 854 is selected, the processor 102 may switch from displaying the GUI 618 to a different GUI, such as the GUI 606 shown in FIG. 21.

Next, FIG. 28 shows the GUI 620. The GUI 620 includes a progress meter 866 to show progress of completing a TDS, such as the TDS 160. The progress meter 866 includes drive cycle procedure announcement icons 868, 870, 872, 874, 876, 878, 880, a TDS completion announcement icon 882, and drive cycle procedure timing icons 884, 886, 888, 890, 892, 894. The drive cycle procedure timing icons 884, 886, 888, 890, 892, 894 represent the timer values 177, 179, 181, 183, 185, 187 of the TDS 160. The progress meter 866 does not show a drive cycle procedure timing icon that pertains to the timer value 175, because the timer value 175 has a value of 0:00. In an alternative embodiment, the progress meter 866 can include a drive cycle procedure timing icon corresponding to any timer value having a value of 0:00, such as the timer value 175.

In at least some example implementations, progress of completing the TDS is shown within the progress meter 866 using highlighting. The highlighting within the progress meter 866 can be correlated with an output of the timer 128 and/or the timer values 166. Example highlighting 896 is shown in FIG. 28 (using shading). In accordance with these implementations, the highlighting 896 of the drive cycle procedure announcement icon 868 indicates that the TDS instruction 161 has been output by the aural output device 120, and the highlighting 896 of the drive cycle procedure announcement icon 870 indicates that the TDS instruction 163 has been output by the aural output device 120.

In at least some implementations, a dimension of a drive cycle procedure timing icon is indicative of a length of time associated with a drive cycle procedure as compared to other dimensions of other drive cycle procedure timing icons indicative of other lengths of times associated with other drive cycle procedures. For example, a longer drive cycle procedure timing icon indicates a first amount of time greater than a second amount of time indicated by a shorter drive cycle procedure timing icon. In particular, the times indicated by the drive cycle procedure timing icon 884 and the drive cycle procedure timing icon 886 can be four and ten minutes, respectively.

The processor 102 can cause highlighting within the drive cycle procedure timing icons 884, 886, 888, 890, 892, 894 to be added as an associated TDS instruction is being completed in relation to a percentage of completing the associated TDS instruction. In at least some implementations, the highlighting starts filling the drive cycle procedure timing icons 884, 886, 888, 890, 892, 894 from a left-most portion of those icons. For an implementation in which a drive cycle procedure timing icon correlates to a four minute DCP, the highlighting 896 can increase within that drive cycle procedure timing icon by $1/240^{th}$ for each second counted by the timer 128 and the uncompleted segment indicator 827 can decrease by $\frac{1}{240}^{th}$ for each second counted by the timer 128. For instance, the highlighting 896 within the drive cycle procedure timing icon 884 extends eighty percent of the total length of the drive cycle procedure timing icon 884 to indicate that the DCP 2 within the TDS 160 is eighty percent complete. A portion 919 of the drive cycle procedure timing icon 884 that is shown without the highlighting 896 is twenty percent of the total length of the drive cycle procedure timing icon 884 to indicate that twenty percent of the time required performing the DCP 2 remains yet to be performed.

The GUI 620 includes an icon 891 to notify a user of the tool 100 that a word or words in the vocabulary of the tool 100 can be spoken to cause a TDS instruction to be output by the aural output device 120. As an example, the icon 891 includes the text "Say 'Repeat' to replay TDS instruction" and the text "Say 'Next' to play next TDS instruction." While the display 116 is displaying a GUI with the icon 891, such as the GUI 620 or the GUI 622 shown in FIG. 29, the processor 102 can detect sound waves representing the word "Repeat" was received by a microphone of the input device 118. In response to that detection, a processor, such as the processor 102, 256, can cause a TDS instruction of a DCP currently being performed to be played using the aural output device 120. While the display 116 is displaying a GUI with the icon 891, such as the GUI 620 or the GUI 622 shown in FIG. 29, a processor, such as the processor 102, 256, can detect sound waves representing the word "Next" was received by a microphone of the input device 118. In response to that detection, a processor, such as the processor 102, 256, can cause a TDS instruction for a next DCP scheduled to be performed to be played using the aural output device 120.

Configuring the tool 100 to be able to repeat the most-recently output TDS instruction using the tool 100 is advantageous because the a user of the tool 100 can be provided with an instruction to continue operating a vehicle as required for a DCP currently being performed in a TDS. In some respects, it is even more advantageous to be able to repeat outputting the most-recently output TDS instruction in response to a voice command, because the user of the tool 100 is likely to be driving the vehicle 412 and can keep his or her eyes on the road rather than looking at the display 116 to have to read the TDS instruction from the display 116. Moreover, in case the user of the tool 100 driving the vehicle did not yet change an operating state of the vehicle to meet the requirements of the most-recently output TDS instruction and cannot recall the most-recently output TDS instruction, repeating the most-recently output TDS instruction using the aural output device 120 can remind the user of how to change the operating state of the vehicle to meet the requirements of the most-recently output TDS instruction.

Configuring the tool 100 to output a TDS instruction for a next DCP scheduled (i.e., a next-scheduled DPS) to be performed is advantageous because a user of the tool can be provided with new operating state information regarding how the vehicle 412 is required to be operated for the next-scheduled DPS. The user of the tool 100 can consider the new operating state information to plan out a future portion of a route on which the TDS instruction for the next-scheduled DPS is to be performed.

The GUI 620 includes a repeat instruction USC 893 and a next instruction USC 895. In response to the determining the repeat instruction USC 893 has been selected, the processor 102, 256 is configured to cause the aural output device 120 to output the TDS instruction most-recently output by the aural output device 120. In response to the determining the next instruction USC 895 has been selected, the processor 102, 256 is configured to cause the aural output device 120 to output a TDS instruction that the processor 102, 256 is scheduled to output using the aural output device 120 upon completion of the DCP currently being performed.

Similar to the GUI 608 shown in FIG. 22, the GUI 620 includes the audio mode icon 814 and the visual mode icon 816. The description of the operation of those icons is described above with respect to the GUI 608 and is applicable to the GUI 620. Moreover, similar to the GUI 608 shown in FIG. 22, the GUI 620 includes the start/restart USC 798 and the cancel USC 796. The description of the operation of those USCs is described above with respect to the GUI 608 and is applicable to the GUI 620.

Next, FIG. 29 shows the GUI 622. The GUI 622 includes a progress meter 831 to show progress of completing a DCP of a TDS, such as the DCP 2 of the TDS 160. The progress meter 831 includes a meter start/end indicator 833, a completed-segment indicator 835, an uncompleted-segment indicator 837, a timer value 839, and a DCP indicator 841. In FIG. 29, the DCP indicator 841 indicates that the second DCP of seven DCPs (i.e., DCP 2) of the TDS 160 is being performed. As shown in FIG. 8, the DCP 2 includes a timer value of four minutes. The timer value 839 can indicate an output of the timer 128. That timer value 839 can, for example, indicate an amount of time remaining to complete the DCP indicated by the DCP indicator 841.

The completed-segment indicator 835 and the uncompleted-segment indicator 837, in combination, can represent one hundred percent of the timer value correlated with the DCP indicated by the DCP indicator 841. For an implementation in which the timer value correlated with the DCP is four minutes and while the timer 128 is counting that timer value, the completed-segment indicator 835 can increase by $\frac{1}{240}^{th}$ of the progress meter 831 for each second counted by the timer 128 and the uncompleted-segment indicator 837 can decrease by $\frac{1}{240}^{th}$ percent of the progress meter 831 for each second counted by the timer 128. In accordance with that implementation, with three minutes and twenty-three seconds out of four minutes remaining, the completed-segment indicator 835 covers about fifteen percent of the progress meter 821 and the uncompleted-segment indicator 837 covers about eighty-five percent of the progress meter 831.

The GUI 622 includes the icon 891 to notify a user of the tool 100 that a voice command can be spoken to cause a TDS instruction to be output by the aural output device 120. The description of the operation of using the icon 891 described above with respect to FIG. 28 is applicable to use of the icon 891 shown in FIG. 29. The GUI 622 also includes the repeat instruction USC 893 and the next instruction USC 895. The description of the operation of using the repeat instruction USC 893 and the next instruction USC 895 described above with respect to FIG. 28 is applicable to use of the repeat instruction USC 893 and the next instruction USC 895 shown in FIG. 29.

In at least some implementations, a GUI includes a progress meter to show progress of completing a TDS and a progress meter to show progress of completing a DCP of the TDS. As an example, that GUI can be arranged like the GUI 620 except that the GUI also includes a progress meter to show progress of completing a DCP of the TDS, such as the progress meter 821.

A benefit of displaying a GUI with a progress meter, such as the progress meter 821, 866 is to provide a way for a user of the tool to quickly determine how close a DCP currently being performed is to being completed so that a user can anticipate needing to change an operating state of the vehicle 412. To determine how the operating state of the vehicle 412 needs to change upon completion of the DCP currently being performed, the user can request the tool 100 to play the next TDS instruction in response to selection of the next instruction USC 895 or wait for the tool 100 to play the next TDS instruction upon completion of the DCP currently being performed. A benefit of displaying a GUI with a progress meter, such as the progress meter 866 is to provide a way for a user of the tool to quickly determine how close a TDS currently being performed is to being completed.

Next, FIG. 30 shows the GUI 624. As discussed above, the GUI 624 allows a user add one or more PPI to the parameter display section 760 of a GUI. In at least some implementations, the processor 102, 256 is configured to output the GUI 624 in response to selection of an add USC, such as the add USC 840 shown in FIG. 25.

The GUI 624 includes the parameter display section 760 including the PPI 143, 113, 115, 111, 145. The GUI 624 also includes a PPI selection menu 917 including PPI 111, 113, 115, 117, 119, 121, 123, 125, 127, 129, 131, 133, 135, 137, 139, 141, 143, 145, 147, 149, 151, 153, 155, 157, 159. Each of those PPI is selectable. In at least some implementations, the processor 102, 256 is configured to highlight a PPI that has been selected from within the PPI selection menu 917. FIG. 30 shows the PPI 159 highlighted to represent that the PPI 159 has been selected. In at least some implementations, the processor 102, 256 can add the PPI(s) selected from the PPI selection menu 917 into the parameter display section 760 upon determining the PPI(s) have been selected. In those or in other implementations, the processor 102, 256 can add the PPI(s) selected from the PPI selection menu 917 in response to determining an add-selected USC 799 within the GUI 624 has been selected. Other ways to cause adding a PPI to the parameter display section 760 are also possible.

Next, FIG. 31, FIG. 32, FIG. 33 show the GUI 626, 628, 630, respectively. The GUI 626, 628, 630 show that the tool 100 is operating in the post-repair report service mode. The GUI 626, 628, 630 show a report 897, 898, 899, respectively. Each report 897, 898, 899 includes a report-selection USC 900, 902, 904. In at least some implementations, the report-selection USC 900 includes text and/or symbols to select a report, such as the report 897 that is tailored for a customer. The report 897 can thus be considered a customer post-repair report. Likewise, the report-selection USC 902 includes text and/or symbols to indicate that the report 898 is tailored for a service writer. The report 898 can thus be considered a service writer post-repair report. The report-selection USC 904 includes text and/or symbols to indicate that the report 899 is tailored for a technician. The report 899 can thus be considered a technician post-repair report.

In response to selection of the report-selection USC 900 while the display 116 is displaying the report 898, 899, the processor 102, 256 can cause the display 116 to begin displaying the report 897 instead of the report 898, 899. In response to selection of the report-selection USC 902 while the display 116 is displaying the report 897, 899, the processor 102, 256 can cause the display 116 to begin displaying the report 898 instead of the report 897, 899. In response to selection of the report-selection USC 904 while the display 116 is displaying the report 897, 898, the processor 102, 256 can cause the display 116 to begin displaying the report 899 instead of the report 897, 898.

The GUI 626, 628, 630 include a symptom section 906. The symptom section 906 includes a description of the symptom that was diagnosed while the tool 100 was operated in the diagnose service mode. As an example, the symptom displayed in the symptom section 906 can include a DTC identifier, such as the P0171 DTC identifier.

The GUI 626, 628, 630 include a monitors section 908. The monitors section 908 includes an indicator that indicates whether the readiness monitors tested during the test drive service mode passed or failed. As shown in FIG. 32, the GUI 630 includes RMI 83, 87, 93, 99, 101 to provide the indication whether the readiness monitors tested during the test drive service mode passed or failed.

The GUI 626, 628, 630 include a vehicle data section 910. In at least some implementations, the vehicle data section 910 includes pre-repair vehicle data captured while the tool 100 operated in the diagnose service mode and post-repair data captured while the tool 100 operated in the test drive service mode or the post-repair report service mode. As an example, the vehicle data section 910 include a PPI 912 pertaining to a mass air flow sensor voltage PID of the vehicle 412. The PPI 912 includes a pre-repair parameter 914 and a post-repair parameter 916 that correspond to the mass air flow sensor voltage PID. As another example, the vehicle data section 910 include a PPI 918 pertaining to a mass air flow sensor frequency PID of the vehicle 412. The PPI 918 includes a pre-repair parameter 920 and a post-repair parameter 922 that correspond to the mass air flow sensor frequency PID. As yet another example, the vehicle data section 910 includes a PPI 924 pertaining to a mass air flow sensor mass/time PID of the vehicle 412. The PPI 924 includes a pre-repair parameter 926 and a post-repair parameter 928 that correspond to the mass air flow sensor mass/time PID. The pre-repair parameter 914, 920, 926 can include a parameter captured while a parameter display section 760 was displayed on a GUI during diagnose vehicle service mode.

The GUI 626, 628, 630 include a repair data section 930. The repair data section 930 includes data pertaining to a repair made to the vehicle. As shown in FIG. 31, the repair data section 930 can include a textual description 936 describing the repair made to the vehicle 412 and a visual description 938 pertaining to the repair made to the vehicle 412. As shown in FIG. 31 and FIG. 32, the repair data section 930 can include a top repairs graph 940 and a cost summary 942. The top repairs graph 940 can indicate whether the repair made to the vehicle 412 to overcome the symptom experienced by the vehicle 412 is among the highest frequency repairs made to the particular type of vehicle corresponding to the vehicle 412 or to the highest frequency repairs made to all types of vehicles. The cost summary 942 can include cost information regarding parts, labor, supplies and taxes associated with repairing the vehicle 412.

The GUI 626, 628, 630 include a download USC 932 and a print USC 934. In at least some implementations, in response to determining the download USC 932 is selected, the processor 102 can request the server 254 to transmit a version of the report 897, 898, 899 for storing in the memory 104. In at least some implementations, in response to determining the print USC 934 is selected, the processor 102, 256 can cause the report 897, 898, 899 to be sent to a printer.

V. Diagnostics and Repair

Figure 34:
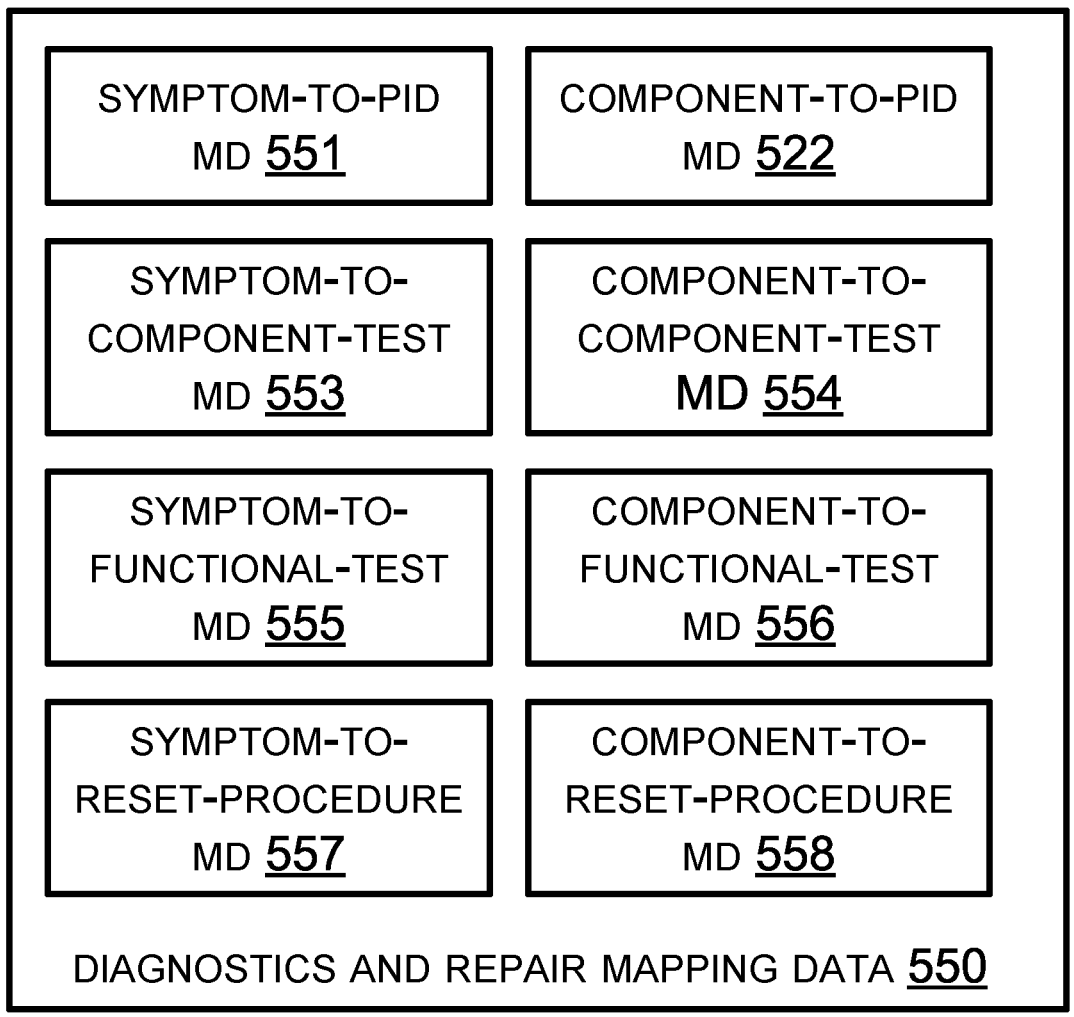
FIG. 34 is a diagram showing diagnostic and repair mapping data in accordance with the example implementations.

Next, FIG. 34 shows examples of diagnostics and repair mapping data 550. As shown, the diagnostics and repair mapping data 550 can comprise symptom-to-PID mapping data (MD) 551, component-to-PID MD 552, symptom-to-component test MD 553, component-to-component-test MD 554, symptom-to-functional-test MD 555, component-to-functional-test MD 556, symptom-to-reset-procedure MD 557, and component-to-reset-procedure MD 558. More particular examples of the foregoing mapping data are discussed below.

Figure 35:
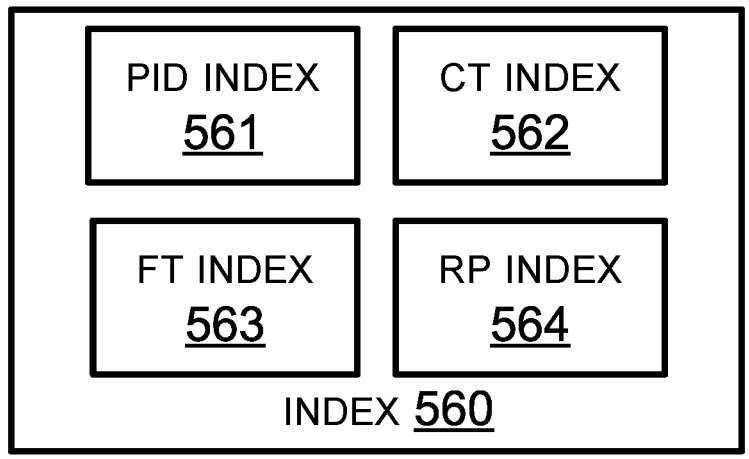
FIG. 35 is a diagram showing indices in accordance with the example implementations.

Next, FIG. 35 shows examples of different indices that can be stored within the index 560. As shown, the index 560 can comprise a PID index 561, a component test index (CTI) 562, a functional test index (FTI) 563, and a reset procedure index (RPI) 564. Two or more of those indices can be combined and stored as a single index. More particular examples of the foregoing indices are discussed below.

Next, FIG. 36 shows examples of the diagnostics and repair mapping data 550. In particular, FIG. 36 shows examples of the symptom-to-PID MD 551 for four symptoms: symptom 1 is mapped to sixteen PIDs, symptom 2 is mapped to three PIDs, symptom 3 is mapped to two PIDs, and symptom 4 is mapped to two PIDs. FIG. 36 also shows examples of the symptom-to-component-test MD 553 for four symptoms: symptom 1 is mapped to two component tests, symptom 2 is mapped to two component tests, symptom 3 is mapped to zero component tests, and symptom 4 is mapped to two component tests. FIG. 36 also shows examples of the symptom-to-functional-test MD 555 for four symptoms: symptom 1 is mapped to four functional tests, symptom 2 is mapped to four functional tests, symptom 3 is mapped to four functional tests, and symptom 4 is mapped to four functional tests. FIG. 36 also shows examples of the symptom-to-reset-procedure MD 557 for five symptoms: symptom 1 is mapped to one reset procedure, symptom 2 is mapped to one reset procedure, symptom 3 is mapped to zero reset procedures, symptom 4 is mapped to one reset procedure, and symptom 5 is mapped to two reset procedures. In FIG. 36, the example symptoms are shown in parenthesis and the PIDs, component tests, functional tests, and reset procedures are listed after the colons.

Next, FIG. 37 shows an example component test index (CTI) 570. The CTI 570 comprises an ordered list of component tests. FIG. 37 shows three example representations of component tests within the CTI 570. As shown in FIG. 37, the CTI 570 can represent component tests using component test numbers 571, index values 572, and component test names 573 (i.e., at least one word describing a component test). A different CTI (for use with the example embodiments) may represent component tests using only one of those three example representations, a combination of any two of those three example representations, or with a different example component test representation. The index values 572 can, for example, comprise decimal, hexadecimal, or numbers of some other base to represent the component tests within the CTI 570. The CTI 562 (shown in FIG. 35) can comprise multiple component test indices, such as a separate CTI for each of multiple different set of particular identifying information (e.g., a separate CTI for each Y/M/M or Y). Those separate CTI can be arranged like the CTI 570 or in another manner. The CTI 570 can comprise or be associated with particular vehicle identifying information.

Figure 38:
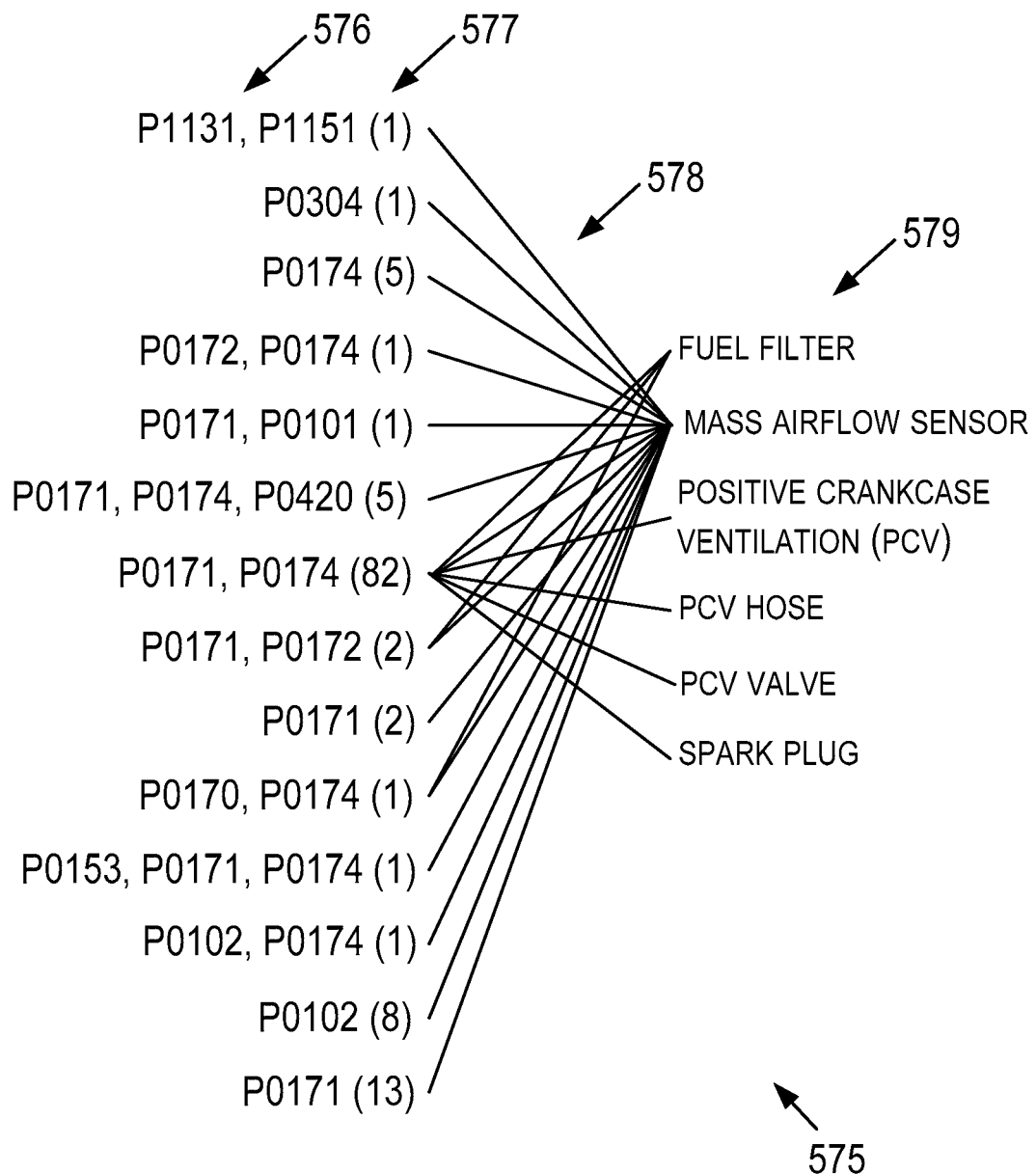
FIG. 38 is a diagram showing example symptom-to-component mapping data in accordance with the example implementations.

Next, FIG. 38 is a diagram showing example symptom-to-component mapping data 575 that can be stored in the diagnostics and repair mapping data 550. The symptoms 576 in FIG. 38 are shown as DTCs, but as shown in FIG. 36, a mapped symptom can comprise a symptom other than a DTC. FIG. 38 shows a symptom count 577 within parenthesis for each symptom. The server 254 can determine the symptom counts 577 based on repair order data that was generated other instances of the type of vehicle identified by the vehicle identifier 666.

The DTCs shown in FIG. 38 can be referred to a "P-codes" from a powertrain controller ECU. As shown in FIG. 38, one symptom (such as the symptom P01551 and P01552) can be mapped to multiple components. The mapping between the symptom and component(s) is represented in FIG. 38 by the mapping lines 578.

Next, FIG. 39 shows additional examples of the diagnostics and repair mapping data 550. In particular, FIG. 39 shows examples of the component-to-PID MD 552 for four components: component 1 is mapped to three PIDs, component 2 is mapped to three PIDs, component 3 is mapped to two PIDs, and component 4 is mapped to one PID. FIG. 39 also shows examples of the component-to-component-test MD 554 for five components: component 1 is mapped to two component tests, component 2 is mapped to three component tests, component 3 is mapped to three component tests, component 4 is mapped to two component tests, and component 5 is mapped to one component test. FIG. 39 also shows examples of the component-to-functional-test MD 556 for six components: component 1 is mapped to two functional tests, component 2 is mapped to zero functional tests, component 3 is mapped to two functional tests, component 4 is mapped to zero functional tests, component 5 is mapped to zero tests, and component 6 is mapped to one functional test. FIG. 39 also shows examples of the component-to-reset-procedure MD 558 for eight components: components 1, 2, 3, 4, 5, and 6 are each mapped to zero reset procedures, component 7 is mapped to two reset procedures, and component 8 is mapped to two reset procedures. In FIG. 39, the example symptoms are shown in parenthesis and the PIDs, component tests, functional tests, and reset procedures are listed after the colons.

Figure 40:
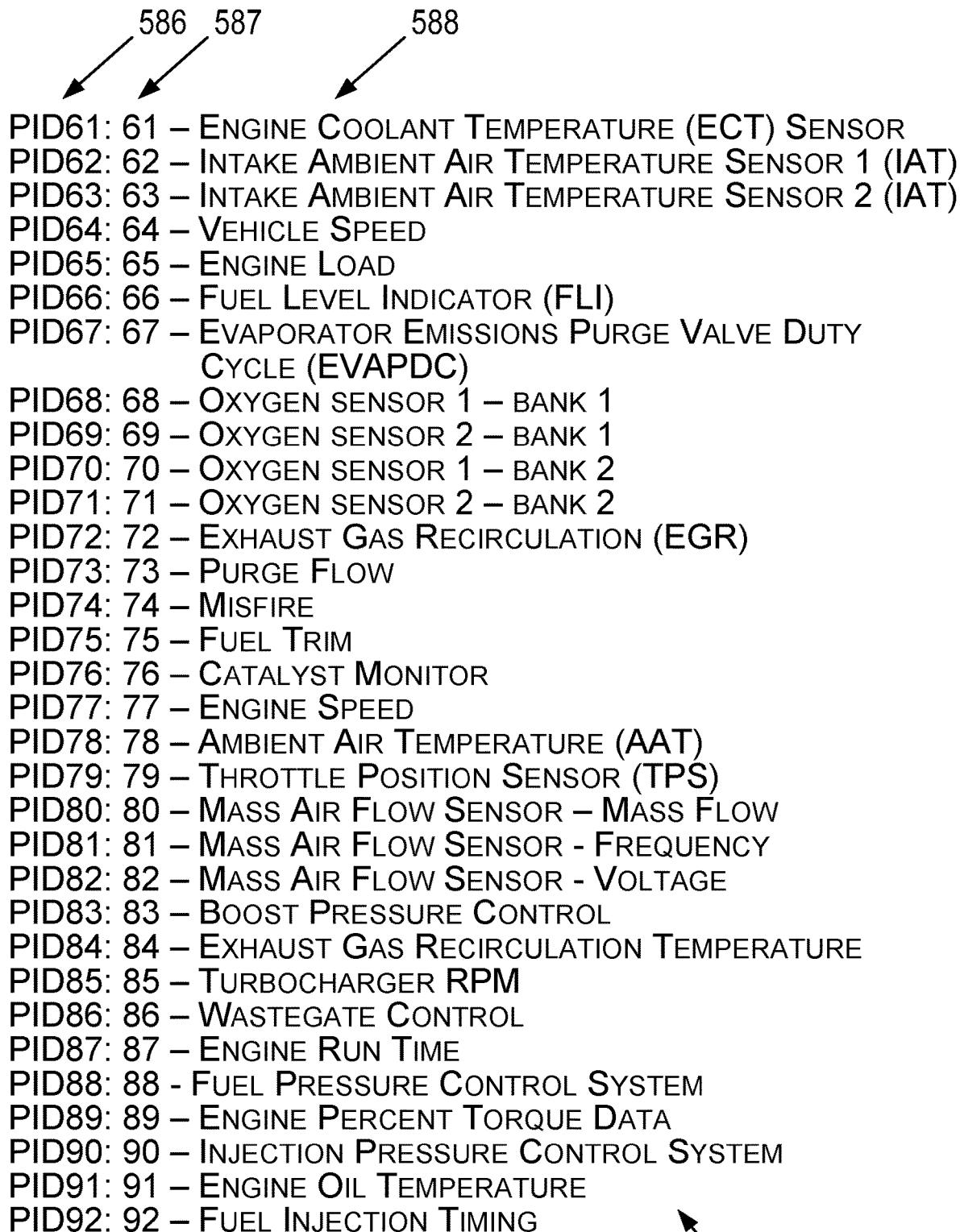
FIG. 40 shows a PID index in accordance with the example implementations.

Next, FIG. 40 shows an example PID index 585. The PID index 585 comprises an ordered list of PIDs. FIG. 40 shows three example representations of PIDs within the PID index 585. As shown in FIG. 40, the PID index 585 can represent the PIDs using PID numbers 586, index values 587, and PID names 588 (i.e., at least one word describing a PID). A different PID index (for use with the example embodiments) may represent PIDs using only one of those three example representations, a combination of any two of those three example representations, or with a different example PID representation. The index values 587 can, for example, comprise decimal, hexadecimal, or numbers of some other base to represent the PIDs within the PID index 585. The PID index 561 (shown in FIG. 35) can comprise multiple PID indices, such as a separate PID index for each of multiple different set of particular identifying information (e.g., a separate PID index for each Y/M/M or Y/M/M/E). Those separate PID index can be arranged like the PID index 585 or in another manner. The PID index 585 can comprise or be associated with a particular type of vehicle.

Next, FIG. 41 shows an example functional test index (FTI) 590. The FTI 590 comprises an ordered list of functional tests. FIG. 41 shows three example representations of functional tests within the FTI 590. As shown in FIG. 41, the FTI 590 can represent functional test using functional test numbers 591, index values 592, and functional test names 593 (i.e., at least one word describing a functional test). A different FTI (for use with the example embodiments) may represent functional tests using only one of those three example representations, a combination of any two of those three example representations, or with a different example functional test representation. The index values 592 can, for example, comprise decimal, hexadecimal, or numbers of some other base to represent the functional tests within the FTI 590. The FTI 563 (shown in FIG. 35) can comprise multiple functional test indices, such as a separate FTI for each of multiple different set of particular identifying information (e.g., a separate FTI for each Y/M/M or Y/M/M/E). Those separate FTI can be arranged like the FTI 590 or in another manner. The FTI 590 can comprise or be associated with particular vehicle identifying information.

Next, FIG. 42 shows an example reset procedure index (RPI) 595. The RPI 595 comprises an ordered list of reset procedures. FIG. 42 shows three example representations of reset procedures within the RPI 595. As shown in FIG. 42, the RPI 595 can represent reset procedures using reset procedures numbers 596, index values 597, and reset procedures names 598 (i.e., at least one word describing a reset procedure). A different RPI (for use with the example embodiments) may represent reset procedures using only one of those three example representations, a combination of any two of those three example representations, or with a different example reset procedure representation. The index values 597 can, for example, comprise decimal, hexadecimal, or numbers of some other base to represent the reset procedures within the RPI 595. The RPI 564 (shown in FIG. 35) can comprise multiple reset procedure indices, such as a separate RPI for each of multiple different set of particular identifying information (e.g., a separate RPI for each Y/M/M or Y/M/M/E). Those separate RPI can be arranged like the RPI 595 or in another manner. The RPI 595 can comprise or be associated with particular vehicle identifying information. The index values 597 can be different than the index values of other indices (such as the PID index 585, the CTI 570, and the FTI 590) so that a single index using the index numbers of multiple indices can be formed without any overlap of the index numbers.

VI. Example Vehicle

A vehicle is a mobile machine that can be used to transport a person, people, and/or cargo. A vehicle can be driven and/or otherwise guided along a path (e.g., a paved road or otherwise) on land, in water, in the air, and/or outer space. A vehicle can be wheeled, tracked, railed, and/or skied. A vehicle can include an automobile, a motorcycle (e.g., a two or three wheel motorcycle), an all-terrain vehicle (ATV) defined by ANSI/SVIA-1-2007, a snowmobile, a watercraft (e.g., a JET SKI® personal watercraft), a light-duty truck, a medium-duty truck, a heavy-duty truck, a semi-tractor, a drone, and/or a farm machine. A vehicle can include and/or use any appropriate voltage and/or current source, such as a battery, an alternator, a fuel cell, and the like, providing any appropriate current and/or voltage, such as about 12 volts, about 42 volts, and the like. A vehicle can, but need not necessarily, include and/or use any system and/or engine to provide its mobility. Those systems and/or engines can include vehicle components that use fossil fuels, such as gasoline, natural gas, propane, and the like, electricity, such as that generated by a battery, magneto, fuel cell, solar cell and the like, wind and hybrids and/or combinations thereof. A vehicle can, but need not necessarily, include an electronic control unit (ECU), an OBDC, and a vehicle network that connects the OBDC to the ECU. A vehicle can be configured to operate as an autonomous vehicle.

Some vehicles and types of vehicles can be identified by characteristics of the vehicle such as characteristics indicative of when the vehicle was built (e.g., a vehicle year), who built the vehicle (e.g., a vehicle make), marketing names associated with vehicle (e.g., a vehicle model name, or more simply "model"), and features of the vehicle (e.g., an engine type). This description uses an abbreviation YMME and/or Y/M/M/E, where each letter in the order shown represents a model year, vehicle make, vehicle model name, and engine type, respectively. This description uses an abbreviation YMM and/or Y/M/M, where each letter in the order shown represents a model year, vehicle make, and vehicle model name, respectively. An example Y/M/M/E is 2020/Toyota/Camry/4Cyl, in which "2020" represents the model year the vehicle was built, "Toyota" represents the name of the vehicle manufacturer Toyota Motor Corporation, Aichi Japan, "Camry" represents a vehicle model built by that manufacturer, and "4Cyl" represents a an engine type (i.e., a four cylinder internal combustion engine) within the vehicle. A person skilled in the art will understand that other features in addition to or as an alternative to "engine type" can be used to identify a vehicle. These other features can be identified in various manners, such as a regular production option (RPO) code, such as the RPO codes defined by the General Motors Company LLC, Detroit Michigan.

Some vehicles, such as automobiles, are associated with a unique VIN. Some VINs include seventeen alpha-numeric characters. For at least some seventeen character VINs, the last six characters represent a unique serial number associated with a particular type of vehicle represented by the first eleven alpha-numeric characters of those VINs. The first eleven alpha-numeric characters typically represent at least a YMME or a YMM. In some instances, a vehicle includes a one dimensional bar code indicative of a VIN associated with that vehicle.

A vehicle network, such as the vehicle network 32 can include one or more conductors (e.g., copper wire conductors) and/or can be wireless. As an example, a vehicle network can include one or two conductors for carrying vehicle data messages in accordance with a vehicle data message (VDM) protocol, such as a bi-directional VDM protocol. A bi-directional VDM protocol can include a SAE® J1850 (PWM or VPW) VDM protocol, an SAE® J1939 VDM protocol based on the SAE® J1939_201808 serial control and communications heavy duty vehicle network—top level document, and/or any other core J1939 standard, an ISO® 15764-4 controller area network (CAN) VDM protocol, an ISO® 9141-2 K-Line VDM protocol, an ISO® 14230-4 KWP2000 K-Line VDM protocol, an ISO® 17458 (e.g., parts 1-5) FlexRay VDM protocol, an ISO® 17987 local interconnect network (LIN) VDM protocol, a CAN 2.0 VDM protocol, standardized in part using an ISO® 11898-1:2015 road vehicle—CAN—Part I: data link layer and physical signaling protocol, a CAN FD VDM protocol (i.e., CAN with flexible data rate VDM protocol), a MOST® Cooperation VDM protocol (such as the MOST Specification Rev. 3.0 E2, or the MOST® Dynamic Specification, Rev. 3.0.2), an Ethernet VDM protocol (e.g., an Ethernet 802.3 protocol using a BROADR-REACH® physical layer transceiver specification for Automotive Applications by Broadcom Inc., San Jose, California), or some other VDM protocol defined for performing communications with or within the vehicle 412, 440, 460. Each and every VDM discussed in this description is arranged according to a VDM protocol.

Instead of being bidirectional, a VDM protocol can be a unidirectional. For example, a SENT VDM protocol (i.e., a single-edge nibble transmission VDM protocol) is a unidirectional VDM protocol. The SENT VDM protocol has been standardized as the SAE J2716 VDM protocol. A sensor in a vehicle can include a transmitter configured to communicate using the SENT VDM protocol (i.e., a SENT VDM transmitter). A vehicle communication bus can operatively connect the SENT VDM transmitter and an ECU within the vehicle. The transceiver 106 (e.g., the vehicle communications transceiver 152) can include a SENT VDM receiver connectable to the vehicle communication bus operatively connected to the SENT VDM transmitter. The SENT VDM receiver can receive SENT VDM protocol messages representing sensor values output by the sensor with the SENT VDM transmitter.

An OBDC, such as the OBDC 422, 452 can include an on-board diagnostic (OBD) connector, such as an OBD II connector. An OBD II connector can include slots for retaining up to sixteen connector terminals, but can include a different number of slots or no slots at all. As an example, an OBDC can include an OBD II connector that meets the SAE J1962 specification such as a connector 16M, part number 12110252, available from Aptiv LLC of Dublin, Ireland. An OBDC can include conductor terminals that connect to a conductor in a vehicle. For instance, an OBDC can include connector terminals that connect to conductors that respectively connect to positive and negative terminals of a battery or battery pack. An OBDC can include one or more conductor terminals that connect to a conductor of a vehicle communication bus such that the OBDC is operatively connected to one or more ECUs. A tool, such as the tool 414, can operatively connect to an OBDC in order to receive VDM from the vehicle including that OBDC. A VDM can carry VDM data. The VDM data can, but need not necessarily, include a parameter identifier (PID) and data (PID data) parameters associated with the PID. The VDM data can, but need not necessarily, include a DTC.

An ECU can control various aspects of vehicle operation and/or components within a vehicle system. For example, an ECU can include a powertrain (PT) system ECU, an engine control module (ECM) ECU, a supplemental inflatable restraint (SIR) system (i.e., an air bag system) ECU, an entertainment system ECU, or some other ECU. An ECU can receive an electrical or optical input from an ECU-connected input device (e.g., a sensor input), control an ECU-connected output device (e.g., a solenoid) via an electrical or optical signal output by the ECU, generate a vehicle data message (VDM) (such as a VDM based on a received input or a controlled output), and set a diagnostic trouble code (DTC) to a state (such as active or history). An ECU can perform a functional test in response to receiving a VDM requesting performance of the functional test. The functional test can be used to test an ECU-connected output device.

VII. Conclusion

It should be understood that the arrangements described herein and/or shown in the drawings are for purposes of example only and are not intended to be limiting. As such, those skilled in the art will appreciate that other arrangements and elements (e.g., machines, interfaces, functions, orders, and/or groupings of functions) can be used instead, and some elements can be omitted altogether. Furthermore, various functions described and/or shown in the drawings as being performed by one or more elements can be carried out by a processor executing computer-readable program instructions or by a combination of hardware, firmware, and/or software. For purposes of this description, execution of CRPI contained in a computer-readable medium to perform some function can include executing all of the program instructions of those CRPI or only a portion of those CRPI.

While various aspects and implementations are described herein, other aspects and implementations will be apparent to those skilled in the art. The various aspects and implementations disclosed herein are for purposes of illustration and are not intended to be limiting, with the true scope being indicated by the claims, along with the full scope of equivalents to which such claims are entitled. It is also to be understood that the terminology used herein for the purpose of describing implementations only, and is not intended to be limiting.

In this description, the articles "a," "an," and "the" are used to introduce elements and/or functions of the example implementations. The intent of using those articles is that there is one or more of the introduced elements and/or functions.

In this description, the intent of using the term "and/or" within a list of at least two elements or functions and the intent of using the terms "at least one of," "at least one of the following," "one or more of," and "one or more of the following" immediately preceding a list of at least two components or functions is to cover each implementation including a listed component or function independently and each implementation including a combination of the listed components or functions. For example, an implementation described as including A, B, and/or C, or at least one of A, B, and C, or at least one of: A, B, and C, or at least one of A, B, or C, or at least one of: A, B, or C, or one or more of A, B, and C, or one or more of: A, B, and C, or one or more of A, B, or C, or one or more of: A, B, or C is intended to cover each of the following possible implementations: (i) an implementation including A, but not B and not C, (ii) an implementation including B, but not A and not C, (iii) an implementation including C, but not A and not B, (iv) an implementation including A and B, but not C, (v) an implementation including A and C, but not B, (v) an implementation including B and C, but not A, and/or (vi) an implementation including A, B, and C. For the implementations including component or function A, the implementations can include one A or multiple A. For the implementations including component or function B, the implementations can include one B or multiple B. For the implementations including component or function C, the implementations can include one C or multiple C. The use of ordinal numbers such as "first," "second," "third" and so on is to distinguish respective elements rather than to denote an order of those elements unless the context of using those terms explicitly indicates otherwise. The use of the symbol "$" as prefix to a number indicates the number is a hexadecimal number.

Implementations of the present disclosure may thus relate to one of the enumerated example embodiments (EEEs) listed below.

EEE 1 is a method comprising: determining, by one or more processors, a test drive script to perform while a tool monitors an electronic system in a mobile machine during a test drive of the mobile machine, wherein the test drive script includes an ordered sequence of drive cycle procedures, wherein the ordered sequence of drive cycle procedures begins with an initial drive cycle procedure and ends with a final drive cycle procedure, wherein each drive cycle procedure is indicative of a respective mobile machine state, and wherein the test drive script includes a first particular drive cycle procedure associated with both a first particular mobile machine state and a first condition pertaining to the first particular mobile machine state; outputting, by the one or more processors, a representation of at least a portion of the test drive script; determining, by the one or more processors, one or more of: status information corresponding to achieving the first particular mobile machine state or status information corresponding to achieving the first condition pertaining to the first particular mobile machine state; and outputting, by the one or more processors, one or more of: the status information corresponding to achieving the first particular mobile machine state or the status information corresponding to achieving the first condition pertaining to the first particular mobile machine state.

EEE 2 is the method of EEE 1, wherein the first condition pertaining to the first particular mobile machine state includes a temporal condition, wherein determining the status information corresponding to achieving the first particular mobile machine state includes determining first status information, wherein the first status information indicates whether the mobile machine is operating in the first particular mobile machine state, wherein determining the status information corresponding to achieving the first condition pertaining to the first particular mobile machine state includes determining second status information, and wherein the second status information corresponds to achieving the temporal condition.

EEE 3 is the method of EEE 2, wherein determining the first status information includes the one or more processors determining that the mobile machine is operating in the first particular mobile machine state, and wherein the second status information indicates one or more of: an amount of time the mobile machine has been operating in the first particular mobile machine state, an amount of additional time the mobile machine is to operate in the first particular mobile machine state, or a minimum amount of time that the mobile machine is to operate in the first particular mobile machine state.

EEE 4 is the method of any one of EEE 2 to 3, further comprising: determining, by the one or more processors, that the mobile machine switched to the first particular mobile machine state from an operating state that is not the first particular mobile machine state; and initiating, by the one or more processors in response to determining that the mobile machine switched to the first particular mobile machine state from the operating state that is not the first particular mobile machine state, a timer for determining the second status information corresponding to achieving the temporal condition.

EEE 5 is the method of EEE 4, further comprising: outputting, by the one or more processors, on a display, a graphical user interface including a representation of the timer.

EEE 6 is the method of EEE 5, wherein the representation of the timer is arranged as a progress meter including multiple drive cycle procedure announcement icons, multiple drive cycle procedure timing icons, and/or a test drive script completion announcement icon.

EEE 7 is the method of EEE 6, wherein the progress meter uses highlighting to indicate progress of completing the test drive script.

EEE 8 is the method of any one of EEEs 6 or 7, wherein a dimension of a first drive cycle procedure timing icon is indicative of a length of time associated with a first drive cycle procedure as compared to other dimensions of other drive cycle procedure timing icons indicative of other lengths of times associated with other drive cycle procedures.

EEE 9 is the method of EEE 5, wherein the representation of the timer is arranged as a progress meter including a meter start/end indicator, a completed-segment indicator, and an uncompleted segment indicator if the drive cycle procedure has started, but not completed.

EEE 10 is the method of EEE 9, wherein the progress meter further includes a timer value and a drive cycle procedure indicator.

EEE 11 is the method of EEE 10, wherein the drive cycle procedure indicator includes a first number indicating how many drive cycle procedures of the test drive script have been started since the test drive script was initiated and a total number of drive cycle procedures in the test drive script.

EEE 12 is the method of any one of EEE 2 to 11, further comprising: outputting, by the one or more processors, a request to the electronic system in the mobile machine, and receiving, by the one or more processors in response to the request, a response from the electronic system in the mobile machine, wherein the response from the electronic system in the mobile machine includes a parameter identifier (PID) and a parameter value associated with the PID, and wherein determining the first status information includes the one or more processors determining whether the parameter value associated with the PID exceeds a parameter value threshold associated with the first particular mobile machine state.

EEE 13 is method of EEE 1, wherein the first condition pertaining to the first particular mobile machine state includes a spatial condition, wherein determining the status information corresponding to achieving the first particular mobile machine state includes determining first status information, wherein the first status information indicates whether the mobile machine is operating in the first particular mobile machine state, wherein determining the status information corresponding to achieving the first condition pertaining to the first particular mobile machine state includes determining second status information, and wherein the second status information corresponds to achieving the spatial condition.

EEE 14 is the method of EEE 13, wherein determining the first status information includes the one or more processors determining that the mobile machine is operating in the first particular mobile machine state, and wherein the second status information indicates one or more of: a distance the mobile machine has travelled while operating in the first particular mobile machine state, a further distance the mobile machine is to travel while operating in the first particular mobile machine state, or a minimum distance that the mobile machine is to travel while operating in the first particular mobile machine state.

EEE 15 is the method of any one of EEE 13 to 14, further comprising: determining, by the one or more processors, that the mobile machine switched to the first particular mobile machine state from an operating state that is not the first particular mobile machine state; and initiating, by the one or more processors in response to determining that the mobile machine switched to the first particular mobile machine state from the operating state that is not the first particular mobile machine state, an odometer for determining the second status information corresponding to achieving the spatial condition.

EEE 16 is the method of any one of EEE 13 to 15, further comprising: outputting, by the one or more processors, a request to the electronic system in the mobile machine, and receiving, by the one or more processors in response to the request, a response from the electronic system in the mobile machine, wherein the response from the electronic system in the mobile machine includes a parameter identifier (PID) and a parameter value associated with the PID, and wherein determining the first status information includes the one or more processors determining whether the parameter value associated with the PID exceeds a parameter value threshold associated with the first particular mobile machine state.

EEE 17 is the method of any one of EEE 1 to 16, further comprising: determining, by the one or more processors, a speed of the mobile machine; and determining, by the one or more processors, whether the speed of the mobile machine exceeds a threshold speed, wherein a mode of outputting the status information is conditioned on whether the speed of the mobile machine exceeds the threshold speed, wherein the mode of outputting the status information is a restricted mode if the speed of the mobile machine exceeds the threshold speed, and wherein the mode of outputting the status information is an unrestricted mode if the speed of the mobile machine does not exceed the threshold speed.

EEE 18 is the method of any one of EEE 1 to 17, wherein the test drive script includes a second particular drive cycle procedure associated with both a second particular mobile machine state and a second condition pertaining to the second particular mobile machine state, the method further comprising: determining, by the one or more processors, the first particular drive cycle procedure has ended; and outputting, by the one or more processors in response to determining the first particular drive cycle procedure has ended, an indication that the second particular drive cycle procedure is a current drive cycle procedure to be performed, and, optionally, wherein the first particular drive cycle procedure is the initial drive cycle procedure or the second particular drive cycle procedure is the final drive cycle procedure.

EEE 19 is the method of any one of EEE 1 to 18, wherein the test drive script is associated with a trouble code that was set active by the electronic system in the mobile machine, wherein outputting the representation of at least a portion of the test drive script includes displaying, on a display of the tool, a representation of the first particular drive cycle procedure, and wherein the method further comprises: displaying, on the display of the tool, a status indicator associated with a parameter identifier (PID) that the electronic system in the mobile machine is configured to output, and a status indicator associated with a readiness monitor that the electronic system in the mobile machine is configured to check for being in a ready state, wherein both the PID and the readiness monitor are associated with the trouble code.

EEE 20 is the method of EEE 19, further comprising: receiving, by the one or more processors, a first parameter value, wherein the first parameter value is output by the electronic system in the mobile machine and is associated with the PID; and determining, by the one or more processors, whether the first parameter value is within a range of parameter values defined for the both the PID and the first particular drive cycle procedure; wherein if the one or more processors determine the first parameter value is within the range of parameter values, then displaying the status indicator for the PID includes displaying the PID, the first parameter value associated with the PID, and an indication the first parameter value associated with the PID is within the range of parameter values, wherein if the one or more processors determine the first parameter value is not within the range of parameter values, then displaying status indictor for the PID includes displaying the PID, the first parameter value associated with the PID, and an indication the first parameter value associated with the PID is not within the range of parameter values, and wherein the indication the first parameter value associated with the PID is within the range of parameter values is different than the indication the first parameter value associated with the PID is not within the range of parameter values.

EEE 21 is the method of any one of EEE 1 to 20, wherein the first particular mobile machine state includes a thermal state of a mobile machine component, wherein determining the status information corresponding to achieving one or both of the first particular mobile machine state and the first condition pertaining to the first particular mobile machine state includes determining a temperature pertaining to the mobile machine component, and wherein outputting the status information corresponding to achieving one or both of the first particular mobile machine state and the first condition pertaining to the first particular mobile machine state includes outputting the temperature pertaining to the mobile machine component.

EEE 22 is the method of any one of EEE 1 to 21, further comprising: outputting, by the one or more processors to the electronic system in the mobile machine before performance of the initial drive cycle procedure, a first message requesting the electronic system in the mobile machine to clear all trouble codes set by the electronic system in the mobile machine; receiving, by the one or more processors from the electronic system in the mobile machine in response to outputting the first message, a second message indicating a status of the electronic system in the mobile machine clearing trouble codes set by the electronic system in the mobile machine; and outputting, by the one or more processors, data indicating the status of the electronic system in the mobile machine clearing trouble codes set by the electronic system in the mobile machine.

EEE 23 is the method of any one of EEE 1 to 22, wherein the test drive script is associated with a readiness monitor the electronic system in the mobile machine is configured to check for being in a ready state, wherein determining the status information corresponding to achieving the first particular mobile machine state includes the one or more processors determining the readiness monitor is in a ready state, and wherein outputting the status information corresponding to achieving the first particular mobile machine state includes outputting an indication the readiness monitor is in a ready status so as notify a driver of the mobile machine the test drive of the mobile machine can be ended.

EEE 24 is the method of EEE 23, wherein outputting the indication the readiness monitor is in a ready status occurs before completion of the final drive cycle procedure.

EEE 25 is the method of any one of EEE 1 to 22, wherein the test drive script is associated with a readiness monitor the electronic system in the mobile machine is configured to check for being in a ready state, wherein the readiness monitor is associated with a trouble code the electronic system in the mobile machine is configured to set active, wherein determining the status information corresponding to achieving the first particular mobile machine state includes the one or more processors determining the electronic system in the mobile machine has set the trouble code active prior to the final drive cycle procedure being completed, and wherein outputting the status information corresponding to achieving the first particular mobile machine state includes outputting an indication the electronic system in the mobile machine has set the trouble code active so as to notify a driver of the mobile machine the test drive of the mobile machine can be ended before completion of the final drive cycle procedure.

EEE 26 is the method of any one of EEE 1 to 25, wherein the first particular drive cycle procedure is the initial drive cycle procedure, the final drive cycle procedure, or an intermediate drive cycle procedure between the initial drive cycle procedure and the final drive cycle procedure.

EEE 27 is the method of EEE 1, wherein the one or more processors include: one or more processors located within the tool, one or more processors located within a server operatively connected to the tool, or one or more processors located within the tool and one or more processors located within the server operatively connected to the tool.

EEE 28 is the method of any one of EEE 1 to 27, wherein outputting the representation of at least a portion of the test drive script and outputting one or more of: the status information corresponding to achieving the first particular mobile machine state or the status information corresponding to achieving the first condition pertaining to the first particular mobile machine state includes displaying, on a display, a graphical user interface that includes: the representation of at least a portion of the test drive script, the status information corresponding to achieving the first particular mobile machine state, and/or the status information corresponding to achieving the first condition pertaining to the first particular mobile machine state.

EEE 29 is the method of any one of EEE 1 to 28, wherein outputting the representation of at least a portion of the test drive script and outputting one or more of: the status information corresponding to achieving the first particular mobile machine state or the status information corresponding to achieving the first condition pertaining to the first particular mobile machine state includes outputting, using one or more speakers, audible sounds that indicate the representation of at least a portion of the test drive script, the status information corresponding to achieving the first particular mobile machine state, and/or the status information corresponding to achieving the first condition pertaining to the first particular mobile machine state.

EEE 30 is the method of any one of EEE 1 to 29, further comprising: determining, by the one or more processors, the mobile machine is a particular type of mobile machine; determining, by the one or more processors, the tool is operating in a diagnostic mode; displaying, on a display of the tool after determining the tool is operating in the diagnostic mode, a first graphical user interface (GUI), wherein the first GUI includes an indication that the tool is operating in the diagnostic mode; determining, by the one or more processors, the tool changes from operating in the diagnostic mode to operating in a repair mode; displaying, on the display of the tool after both displaying the first GUI and determining the tool changes from operating in the diagnostic mode to operating in the repair mode, a second GUI, wherein the second GUI includes an indication that the tool is operating in the repair mode; determining, by the one or more processors, the tool changes from operating in the repair mode to operating in a test drive mode; displaying, on the display after both displaying the second GUI and determining the tool changes from operating in the repair mode to operating in the test drive mode, a third GUI, wherein the third GUI includes an indication that the tool is operating in the test drive mode, the representation of at least a portion of the test drive script, and one or more of: the status information corresponding to achieving the first particular mobile machine state or the status information corresponding to achieving the first condition pertaining to the first particular mobile machine state; determining, by the one or more processors, the tool changes from operating in the test drive mode to operating in a post-repair report mode; and displaying, on the display after both displaying the third GUI and determining the tool changes from operating in the test drive mode to operating in the post-repair report mode, a fourth GUI, wherein the fourth GUI includes an indication that the tool is operating in the post-repair report mode, wherein the first GUI, the second GUI, the third GUI, and the fourth GUI include information corresponding to particular type of mobile machine.

EEE 31 is the method of any one of EEEs 1 to 30, wherein outputting one or more of: the status information corresponding to achieving the first particular mobile machine state or the status information corresponding to achieving the first condition pertaining to the first particular mobile machine state includes transmitting, by the tool, a data message including a request for an electronic control unit in the mobile machine to activate a haptic feedback component within the mobile machine with a particular signature correlated with the status information corresponding to achieving the first particular mobile machine state or the status information corresponding to achieving the first condition pertaining to the first particular mobile machine state.

EEE 32 is the method of any one of EEEs 1 to 30, wherein outputting one or more of: the status information corresponding to achieving the first particular mobile machine state or the status information corresponding to achieving the first condition pertaining to the first particular mobile machine state includes transmitting, by the tool to a wearable haptic feedback device, a signal indicative of a request for the wearable haptic feedback device to activate a haptic feedback component with a particular signature correlated with the status information corresponding to achieving the first particular mobile machine state or the status information corresponding to achieving the first condition pertaining to the first particular mobile machine state.

EEE 33 is the method of any one of EEEs 1 to 32, further comprising: initiating the particular drive cycle procedure of the test drive script a first time and then a second time before initiating a next drive cycle procedure in the ordered sequence of drive cycle procedures, and outputting, by the one or more processors, an indication the particular drive cycle procedure initiates the second time.

EEE 34 is the method of any one of EEEs 1 to 33, further comprising: determining, by the one or more processors, a location of the mobile machine or the tool using location data from a global navigation satellite system, and outputting, by the one or more processors, an instruction for guiding the mobile machine along a path with characteristics compatible with achieving the first particular mobile machine state and/or achieving the first condition pertaining to the first particular mobile machine state.

EEE 35 is the method of any one of EEEs 1 to 34, wherein the mobile machine is a vehicle configured as an automobile, a motorcycle, an all-terrain vehicle (ATV), a snowmobile, a watercraft, a light-duty truck, a medium-duty truck, a heavy-duty truck, a semi-tractor, a drone, or a farm machine.

EEE 36 is the method of any of EEEs 1 to 35, wherein determining the test drive script includes determining one or more identifiers within a test drive script map and that the test drive script is associated with the one or more identifiers.

EEE 37 is the method of EEE 36, wherein the one or more identifiers include one or more diagnostic trouble codes.

EEE 38 is the method of any one of EEEs 36 or 37, wherein the one or more identifiers include a vehicle identifier, a vehicle system identifier, and a vehicle component identifier.

EEE 39 is the method of any one of EEE 36 to 38, wherein the one or more identifiers include a textual customer complaint.

EEE 40 is the method of any one of EEEs 1 to 39, wherein the ordered sequence of drive cycle procedures is specified by an original equipment manufacturer that built the mobile machine.

EEE 41 is the method of any one of EEEs 1 to 39, wherein the ordered sequence of drive cycle procedures is specified by an aftermarket supplier of service information regarding the vehicle.

EEE 42 is the method of any one of EEEs 1 to 41, wherein the electronic system in the mobile machine includes an electronic control unit for a powertrain system in the mobile machine, and wherein the electronic control unit is programmed for controlling mobile machine emissions that meet European onboard diagnostics regulations.

EEE 43 is the method of any one of EEEs 1 to 41, wherein the electronic system in the mobile machine includes an electronic control unit for a powertrain system in the mobile machine, and wherein the electronic control unit is programmed for controlling mobile machine emissions that meet United States onboard diagnostic II regulations.

EEE 44 is the method of any one of EEEs 1 to 41, wherein the electronic system in the mobile machine includes an advanced driver-assistance system.

EEE 45 is a computing system comprising: one or more processors; and computer readable data storage storing executable instructions, wherein execution of the executable instructions by the one or more processors causes computing system to perform functions comprising: determining a test drive script to perform while a tool monitors an electronic system in a mobile machine during a test drive of the mobile machine, wherein the test drive script includes an ordered sequence of drive cycle procedures, wherein the ordered sequence of drive cycle procedures begins with an initial drive cycle procedure and ends with a final drive cycle procedure, wherein each drive cycle procedure is indicative of a respective mobile machine state, and wherein the test drive script includes a first particular drive cycle procedure associated with both a first particular mobile machine state and a first condition pertaining to the first particular mobile machine state; outputting a representation of at least a portion of the test drive script; determining one or more of: status information corresponding to achieving the first particular mobile machine state or status information corresponding to achieving the first condition pertaining to the first particular mobile machine state; and outputting one or more of: the status information corresponding to achieving the first particular mobile machine state or the status information corresponding to achieving the first condition pertaining to the first particular mobile machine state.

EEE 46 is the computing system of EEE 45, further comprising: the tool.

EEE 47 is a computer readable medium having stored therein instructions executable by one or more processors to cause a computing system to perform functions comprising: determining a test drive script to perform while a tool monitors an electronic system in a mobile machine during a test drive of the mobile machine, wherein the test drive script includes an ordered sequence of drive cycle procedures, wherein the ordered sequence of drive cycle procedures begins with an initial drive cycle procedure and ends with a final drive cycle procedure, wherein each drive cycle procedure is indicative of a respective mobile machine state, and wherein the test drive script includes a first particular drive cycle procedure associated with both a first particular mobile machine state and a first condition pertaining to the first particular mobile machine state; outputting a representation of at least a portion of the test drive script; determining one or more of: status information corresponding to achieving the first particular mobile machine state or status information corresponding to achieving the first condition pertaining to the first particular mobile machine state; and outputting one or more of: the status information corresponding to achieving the first particular mobile machine state or the status information corresponding to achieving the first condition pertaining to the first particular mobile machine state.

EEE 48 is a computing system comprising: one or more processors, and computer readable data storage storing executable instructions, wherein execution of the executable instructions by the one or more processors causes computing system to perform the method of any one of EEE 1 to EEE 44.

EEE 49 is a non-transitory computer readable medium having stored therein instructions executable by one or more processors to cause a computing system to perform the method of any one of EEE 1 to EEE 44.

EEE 50 is a computing system comprising: means for determining a test drive script to perform while a tool monitors an electronic system in a mobile machine during a test drive of the mobile machine, wherein the test drive script includes an ordered sequence of drive cycle procedures, wherein the ordered sequence of drive cycle procedures begins with an initial drive cycle procedure and ends with a final drive cycle procedure, wherein each drive cycle procedure is indicative of a respective mobile machine state, and wherein the test drive script includes a first particular drive cycle procedure associated with both a first particular mobile machine state and a first condition pertaining to the first particular mobile machine state; means for outputting a representation of at least a portion of the test drive script; means for determining one or more of: status information corresponding to achieving the first particular mobile machine state or status information corresponding to achieving the first condition pertaining to the first particular mobile machine state; and means for outputting one or more of: the status information corresponding to achieving the first particular mobile machine state or the status information corresponding to achieving the first condition pertaining to the first particular mobile machine state.

What is claimed is:

1. A method comprising:
    determining, by a processor, a test drive script to perform while a tool monitors an electronic system in a vehicle during a test drive of the vehicle, wherein:
    the test drive script includes an ordered sequence of drive cycle procedures,
    the test drive script is associated with a first readiness monitor,
    the electronic system is configured to check whether the first readiness monitor passed or failed during the test drive,
    the ordered sequence of drive cycle procedures begins with an initial drive cycle procedure and ends with a final drive cycle procedure, and includes a first drive cycle procedure and a second drive cycle procedure,
    the second drive cycle procedure is ordered immediately after the first drive cycle procedure,
    the first drive cycle procedure corresponds to a first set of parameter identifiers requestable from the electronic system,
    the second drive cycle procedure corresponds to a second set of parameter identifiers requestable from the electronic system, and
    at least one of the first set of parameter identifiers or the second set of parameter identifiers contains one or more particular parameter identifiers not contained in the other of the first set of parameter identifiers or the second set of parameter identifiers,
    outputting, by the processor on a display during a performance of the first drive cycle procedure, a representation of at least a first portion of the test drive script, wherein the representation of at least the first portion of the test drive script includes an indicator for each parameter identifier of the first set of parameter identifiers;

determining, by the processor, status information corresponding to whether the first readiness monitor has passed or failed during the test drive;

outputting, by the processor on the display, the status information corresponding to whether the first readiness monitor has passed or failed during the test drive;

determining, by the processor, the performance of the first drive cycle procedure is complete; and outputting, by the processor on the display in response to determining the performance of the first drive cycle procedure is complete, a representation of at least a second portion of the test drive script instead of the representation of at least the first portion of the test drive script, wherein the representation of at least the second portion of the test drive script includes a parameter indicator for each parameter identifier of the second set of parameter identifiers.

2. The method of claim 1, wherein:
the initial drive cycle procedure is the first drive cycle procedure, and/or
the final drive cycle procedure is the second drive cycle procedure.

3. The method of claim 1, wherein the electronic system includes multiple electronic systems in the vehicle.

4. The method of claim 1, wherein:
each drive cycle procedure is indicative of a respective vehicle state, and
the respective vehicle state for one or more of the drive cycle procedures includes a speed of the vehicle being greater than zero miles or kilometers per hour.

5. The method of claim 1, wherein the indicator for each parameter identifier of the first set of parameter identifiers includes a textual representation of a respective parameter identifier and a parameter corresponding to the respective parameter identifier.

6. The method of claim 1, wherein determining the performance of the first drive cycle procedure is complete includes determining the vehicle has operated in a particular vehicle state corresponding to the first drive cycle procedure for a specific amount of time or while the vehicle has traveled a specific distance.

7. The method of claim 1, wherein mobility of the vehicle is provided by a system in the vehicle that generates electricity using a battery and/or a fuel cell.

8. The method of claim 1, wherein the electronic system in the vehicle includes an advanced driver-assistance system.

9. The method of claim 1, further comprising:
transmitting, by the processor before performing the first drive cycle procedure, a first vehicle data message to the vehicle to request data indicating which diagnostic trouble codes are set by the electronic system in the vehicle; and
receiving, by the processor, a second data message from the electronic system, the second data message including data that indicates no diagnostic trouble codes are set by the electronic system in the vehicle.

10. The method of claim 1, wherein performing a drive cycle procedure of the test drive script includes checking a temperature of one or more vehicle components and confirming the temperature does not breach a temperature threshold.

11. The method of claim 1, further comprising:
determining, by the processor, the electronic system in the vehicle sets a diagnostic trouble code active during a performance of the test drive script; and
outputting, by the processor in response to determining the electronic system in the vehicle sets the diagnostic trouble code active during the performance of the test drive script, an indication the test drive of the vehicle can be ended before completion of the final drive cycle procedure.

12. The method of claim 1, further comprising:
transmitting, by the processor to the electronic system in the vehicle, a vehicle data message including a parameter identifier; and
determining, by the processor, a status of performing the test drive script based on a parameter value corresponding to the parameter identifier received in response to transmitting the vehicle data message.

13. The method of claim 12, wherein:
determining the status of performing the test drive script includes determining the parameter value breaches a threshold value corresponding to the parameter identifier; and
the status of performing the test drive script includes stopped or completed.

14. A computing system comprising:
a processor; and
non-transitory computer-readable memory storing executable instructions, wherein execution of the executable instructions by the processor causes the computing system to:
determine a test drive script to perform while a tool monitors an electronic system in a vehicle during a test drive of the vehicle, wherein:
the test drive script includes an ordered sequence of drive cycle procedures,
the test drive script is associated with a first readiness monitor,
the electronic system is configured to check whether the first readiness monitor passed or failed during the test drive,
the ordered sequence of drive cycle procedures begins with an initial drive cycle procedure and ends with a final drive cycle procedure, and includes a first drive cycle procedure and a second drive cycle procedure,
the second drive cycle procedure is ordered immediately after the first drive cycle procedure,
the first drive cycle procedure corresponds to a first set of parameter identifiers requestable from the electronic system,
the second drive cycle procedure corresponds to a second set of parameter identifiers requestable from the electronic system, and
at least one of the first set of parameter identifiers or the second set of parameter identifiers contains one or more particular parameter identifiers not contained in the other of the first set of parameter identifiers or the second set of parameter identifiers,
output, on a display during a performance of the first drive cycle procedure, a representation of at least a first portion of the test drive script, wherein the representation of at least the first portion of the test drive script includes an indicator for each parameter identifier of the first set of parameter identifiers;

determine status information corresponding to whether the first readiness monitor has passed or failed during the test drive;

output, on the display, the status information corresponding to whether the first readiness monitor has passed or failed during the test drive;

determine the performance of the first drive cycle procedure is complete; and output, on the display in response to determining the performance of the first drive cycle procedure is complete, a representation of at least a second portion of the test drive script instead of the representation of at least the first portion of the test drive script, wherein the representation of at least the second portion of the test drive script includes a parameter indicator for each parameter identifier of the second set of parameter identifiers.

15. The computing system of claim 14,
wherein execution of the executable instructions by the processor further causes the computing system to:
transmit, before performing the first drive cycle procedure, a first vehicle data message to the vehicle to request data indicating which diagnostic trouble codes are set by the electronic system in the vehicle; and
receive a second data message from the electronic system, the second data message including data that indicates no diagnostic trouble codes are set by the electronic system in the vehicle.

16. The computing system of claim 14,
wherein execution of the executable instructions by the processor further causes the computing system to:
determine the electronic system in the vehicle sets a diagnostic trouble code active during a performance of the test drive script; and
output, in response to determining the electronic system in the vehicle sets the diagnostic trouble code active during the performance of the test drive script, an indication the test drive of the vehicle can be ended before completion of the final drive cycle procedure.

17. The computing system of claim 14,
wherein execution of the executable instructions by the processor further causes the computing system to:
transmit, to the electronic system in the vehicle, a vehicle data message including a parameter identifier; and
determine a status of performing the test drive script based on a parameter value corresponding to the parameter identifier received in response to transmitting the vehicle data message.

18. A non-transitory computer readable memory having stored therein instructions executable by a processor to cause a computing system to perform functions comprising:
determining, by the processor, a test drive script to perform while a tool monitors an electronic system in a vehicle during a test drive of the vehicle, wherein:
the test drive script includes an ordered sequence of drive cycle procedures,
the test drive script is associated with a first readiness monitor,
the electronic system is configured to check whether the first readiness monitor passed or failed during the test drive,
the ordered sequence of drive cycle procedures begins with an initial drive cycle procedure and ends with a final drive cycle procedure, and includes a first drive cycle procedure and a second drive cycle procedure,
the second drive cycle procedure is ordered immediately after the first drive cycle procedure, the first drive cycle procedure corresponds to a first set of parameter identifiers requestable from the electronic system,
the second drive cycle procedure corresponds to a second set of parameter identifiers requestable from the electronic system, and
at least one of the first set of parameter identifiers or the second set of parameter identifiers contains one or more particular parameter identifiers not contained in the other of the first set of parameter identifiers or the second set of parameter identifiers,
outputting, by the processor on a display during a performance of the first drive cycle procedure, a representation of at least a first portion of the test drive script, wherein the representation of at least the first portion of the test drive script includes an indicator for each parameter identifier of the first set of parameter identifiers;
determining, by the processor, status information corresponding to whether the first readiness monitor has passed or failed during the test drive;
outputting, by the processor, the status information corresponding to whether the first readiness monitor has passed or failed during the test drive;
determining, by the processor, the performance of the first drive cycle procedure is complete; and
outputting, by the processor on the display in response to determining the performance of the first drive cycle procedure is complete, a representation of at least a second portion of the test drive script instead of the representation of at least the first portion of the test drive script, wherein the representation of at least the second portion of the test drive script includes a parameter indicator for each parameter identifier of the second set of parameter identifiers.

19. The computing system of claim 14, wherein:
the initial drive cycle procedure is the first drive cycle procedure, and/or
the final drive cycle procedure is the second drive cycle procedure.

20. The non-transitory computer readable memory of claim 18 wherein:
the initial drive cycle procedure is the first drive cycle procedure, and/or
the final drive cycle procedure is the second drive cycle procedure.

* * * * *